(12) United States Patent
Wolcott et al.

(10) Patent No.: US 9,826,424 B2
(45) Date of Patent: Nov. 21, 2017

(54) NETWORK IMPLEMENTATION OF SPECTRUM ANALYSIS

(71) Applicant: Comcast Cable Communications, LLC, Philadelphia, PA (US)

(72) Inventors: Lawrence Wolcott, Denver, CO (US); Justin Riggert, Denver, CO (US); David Leach, Centennial, CO (US); Thomas Emerson Bach, Englewood, CO (US); James Russell, Highlands Ranch, CO (US); Edward David Monnerat, Parker, CO (US); Todd Szuter, Glauchester, MA (US); Bryan Thomas, Castle Rock, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/167,349

(22) Filed: May 27, 2016

(65) Prior Publication Data
US 2017/0055167 A1 Feb. 23, 2017

Related U.S. Application Data

(63) Continuation of application No. 13/834,962, filed on Mar. 15, 2013, now Pat. No. 9,380,475.

(60) Provisional application No. 61/773,138, filed on Mar. 5, 2013.

(51) Int. Cl.
*H04W 72/04* (2009.01)
*H04W 24/08* (2009.01)
*H04B 17/345* (2015.01)

(52) U.S. Cl.
CPC .......... *H04W 24/08* (2013.01); *H04B 17/345* (2015.01)

(58) Field of Classification Search
None
See application file for complete search history.

(56) References Cited

U.S. PATENT DOCUMENTS

| | | |
|---|---|---|
| 5,311,546 A | 5/1994 | Paik et al. |
| 5,881,108 A | 3/1999 | Herzberg et al. |
| 6,377,810 B1 | 4/2002 | Geiger et al. |
| 6,434,193 B1 | 8/2002 | Fukuoka |
| 6,556,239 B1 | 4/2003 | Al-Araji et al. |
| 6,671,334 B1 | 12/2003 | Kuntz et al. |
| 6,728,887 B1 | 4/2004 | Dziekan et al. |
| 6,862,315 B1 | 3/2005 | Garg et al. |
| 6,880,170 B1 | 4/2005 | Kauffman et al. |
| 6,947,502 B2 | 9/2005 | Taylor et al. |

(Continued)

FOREIGN PATENT DOCUMENTS

JP 04208707 B2 1/2009

OTHER PUBLICATIONS

"VSWR, or Voltage Standing Wave Ratio", available at http://emc.loprudder.com/vswr.pdf (last visited Nov. 22, 2010).

(Continued)

*Primary Examiner* — Fan Ng
(74) *Attorney, Agent, or Firm* — Banner & Witcoff, Ltd.

(57) ABSTRACT

Access devices may receive signals over a network and calculate a frequency spectrum of the received signals. An analyzer system may collect the frequency spectrum data from multiple access devices, and based on the collected data, detect, identify, and locate sources of anomalies in a communication network.

27 Claims, 35 Drawing Sheets

(56) References Cited

U.S. PATENT DOCUMENTS

| | | |
|---|---|---|
| 6,947,741 B2 | 9/2005 | Beech et al. |
| 7,142,609 B2 | 11/2006 | Terreault et al. |
| 7,574,492 B2 | 8/2009 | Karaoguz et al. |
| 7,742,777 B2 | 6/2010 | Strater et al. |
| 7,843,847 B2 | 11/2010 | Quigley et al. |
| 8,143,900 B2 | 3/2012 | Shimp et al. |
| 8,284,828 B2 | 10/2012 | Cooper et al. |
| 8,416,697 B2 | 4/2013 | Wolcott et al. |
| 8,458,759 B2 | 6/2013 | Zinevich |
| 8,576,705 B2 | 11/2013 | Thibeault et al. |
| 8,650,602 B2 | 2/2014 | Pond et al. |
| 8,787,223 B2 | 7/2014 | Watson et al. |
| 8,829,916 B2 | 9/2014 | Defoort et al. |
| 2001/0017904 A1 | 8/2001 | Pukkila et al. |
| 2003/0058786 A1 | 3/2003 | Sato et al. |
| 2003/0109999 A1 | 6/2003 | Stein et al. |
| 2003/0191856 A1 | 10/2003 | Lewis et al. |
| 2003/0217122 A1 | 11/2003 | Roese et al. |
| 2004/0100881 A1 | 5/2004 | Wakabayashi et al. |
| 2004/0145470 A1 | 7/2004 | Fager et al. |
| 2004/0153898 A1 | 8/2004 | Hidaka |
| 2004/0222908 A1 | 11/2004 | MacDonald et al. |
| 2005/0207346 A1 | 9/2005 | Chu et al. |
| 2005/0226421 A1 | 10/2005 | Briancon et al. |
| 2006/0007997 A1 | 1/2006 | Jones |
| 2006/0121946 A1 | 6/2006 | Walton et al. |
| 2006/0135907 A1* | 6/2006 | Remde ............... A61M 5/142 604/67 |
| 2006/0142976 A1* | 6/2006 | Bonanni ............ G05B 23/0281 702/189 |
| 2006/0271986 A1 | 11/2006 | Vogel |
| 2007/0109995 A1 | 5/2007 | Quigley et al. |
| 2007/0211618 A1 | 9/2007 | Cooper et al. |
| 2007/0288982 A1 | 12/2007 | Donahue |
| 2008/0080607 A1 | 4/2008 | Shah |
| 2008/0089224 A1 | 4/2008 | Kim et al. |
| 2008/0129421 A1 | 6/2008 | Ninan et al. |
| 2008/0192816 A1 | 8/2008 | Momtaz |
| 2008/0276111 A1 | 11/2008 | Jacoby et al. |
| 2009/0007210 A1 | 1/2009 | Nishide et al. |
| 2009/0268799 A1 | 10/2009 | Wang et al. |
| 2009/0304065 A1 | 12/2009 | Choi et al. |
| 2010/0095360 A1 | 4/2010 | Pavlovski et al. |
| 2010/0142608 A1 | 6/2010 | Kim et al. |
| 2010/0158093 A1 | 6/2010 | Thompson et al. |
| 2010/0183258 A1 | 7/2010 | Chow et al. |
| 2010/0185865 A1 | 7/2010 | Yeap et al. |
| 2010/0223650 A1 | 9/2010 | Millet et al. |
| 2011/0026577 A1 | 2/2011 | Primo et al. |
| 2011/0110415 A1 | 5/2011 | Cooper et al. |
| 2015/0318937 A1 | 11/2015 | Ruth et al. |

OTHER PUBLICATIONS

Melissa Ray Weimer, "Waveform Analysis Using The Fourier Transform", DATAQ Instruments, Inc., available at http:!/www.dataq.com/applicat/articles/an11.htm (last visited Nov. 22, 2010).

Rob Thompson, et al., "Optimizing Upstream Throughput Using Equalization Coefficient Analysis", National Cable & Telecommunications Association (NCTA) Technical Papers, Apr. 2009.

Robert L. Howald et al., "Characterizing and Aligning the HFC Return Path for Successful DOCSIS 3.0 Rollouts", SCTE Cable-Tee Expo, Denver, Co, Oct. 28-30, 2009.

Robert L. Howald et al., "Docsis 3.0 Upstream: Readiness & Qualification," SCTE Cable-Tec Expo, Oct. 2009.

DOCSIS® Best Practices and Guidelines Proactive Network Maintenance Using Pre-equalization CM-GL-PNMP-V01-100415;Apr. 15, 2010.

CableLabs invention disclosure titled "Pre-Equalization based proactive network maintenance process model"; prior to Nov. 1, 2010.

Hranac, R., "Linear Distortions part 1,"downloaded Apr. 22, 2010.

Qureshi, S.U.H., "Adaptive Equalization," Proceedings of the IEEE, Sep. 1985.

CableLabs invention disclosure titled "A Simple algorithm for fault localization using naming convention and micro-reflection signature"; prior to Nov. 1, 2010.

* cited by examiner

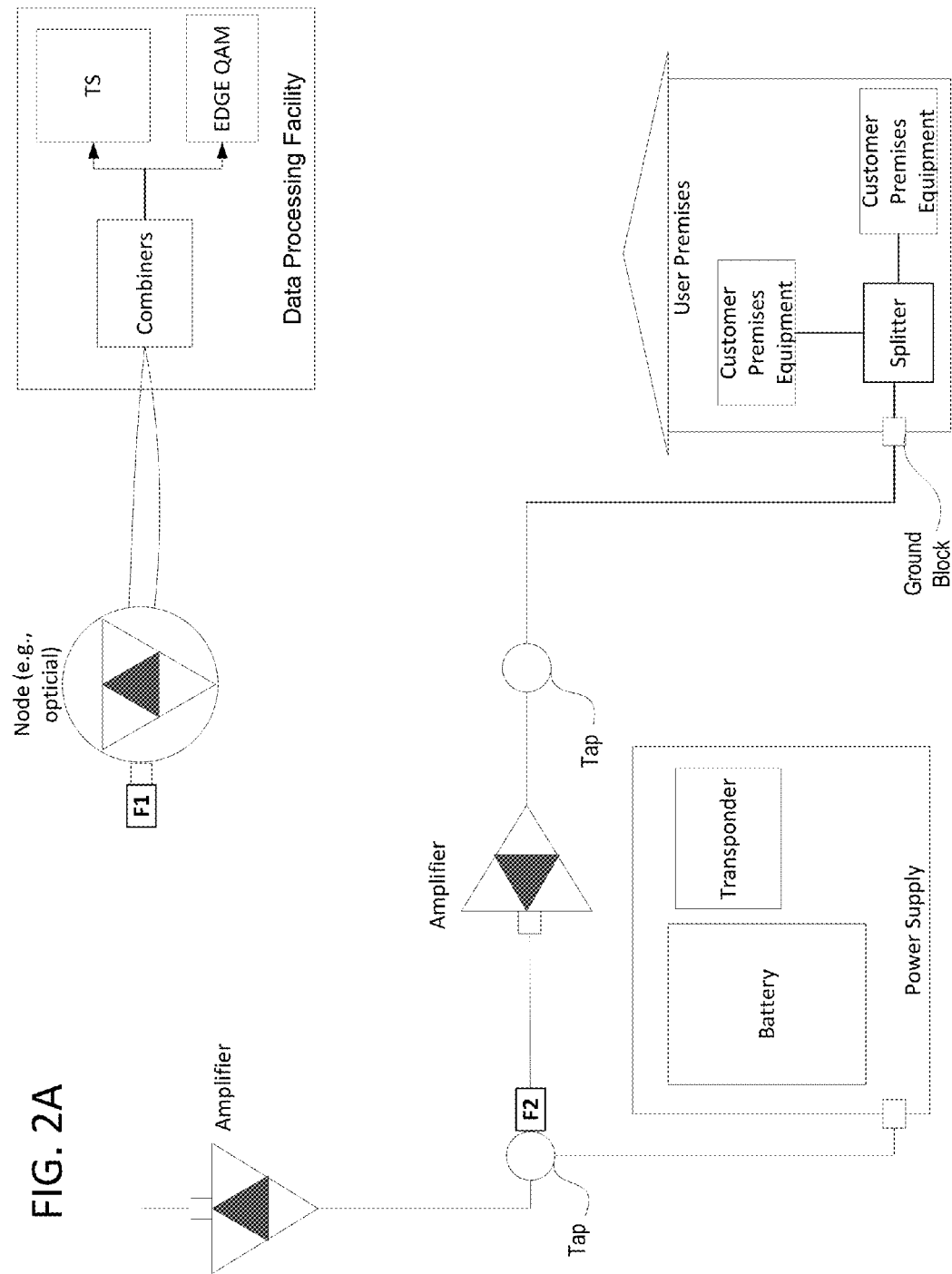

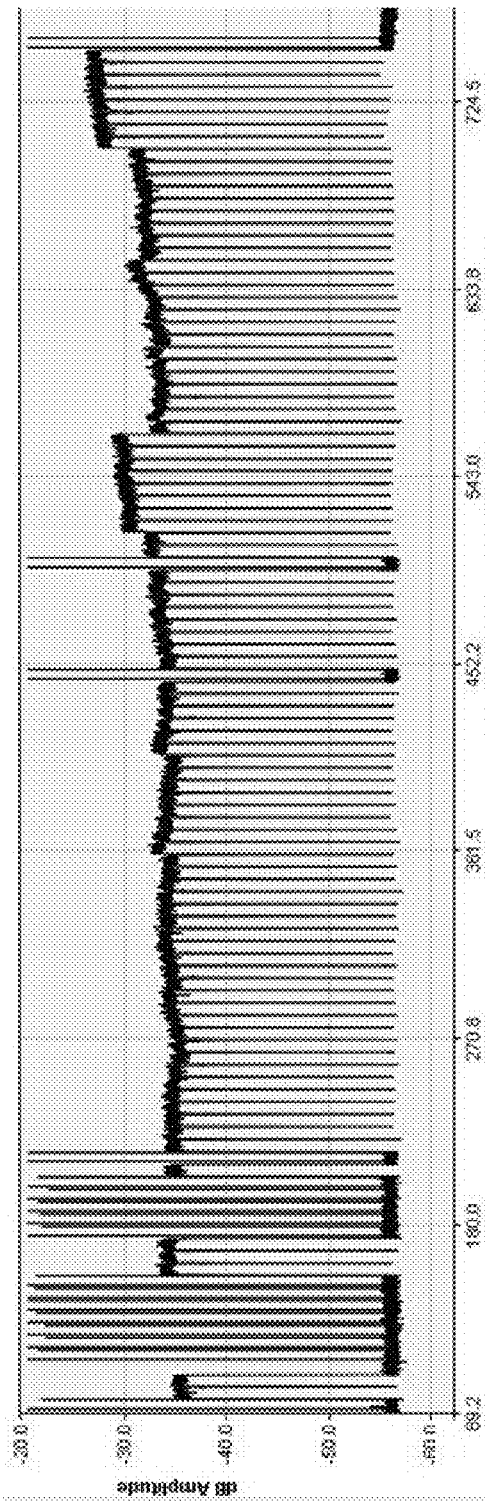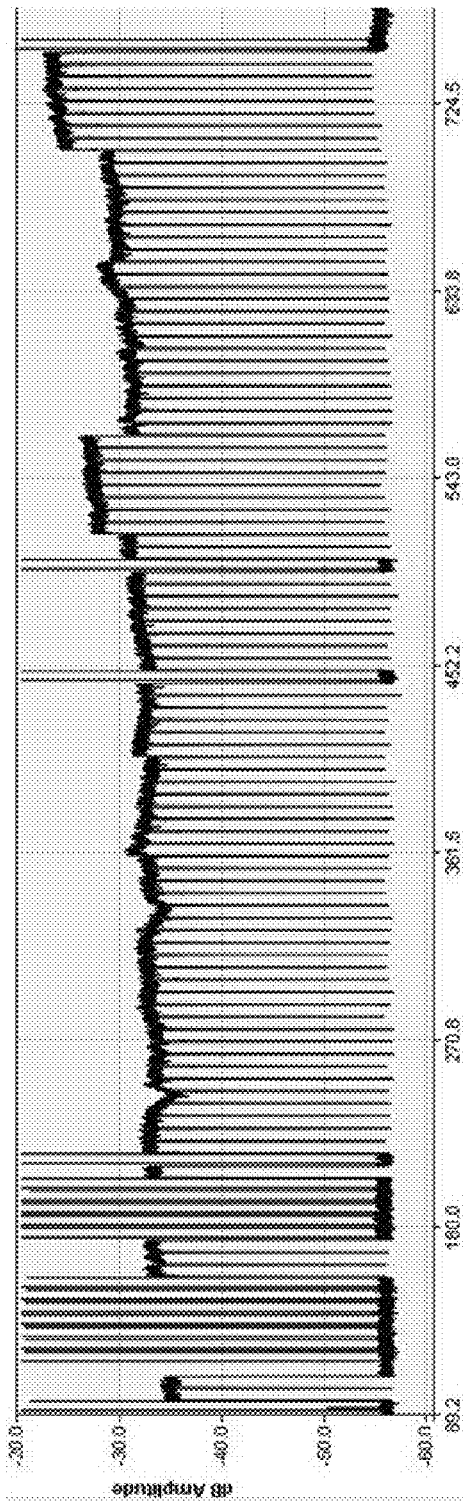
FIG. 4K
FIG. 4L

| Index | AD Identifier | f 1 | | f 2 | | ... | f N | | ... |
|---|---|---|---|---|---|---|---|---|---|
| | | r | i | r | i | | r | i | |
| 00001 | <MAC addr. for AD1> | <r> | <i> | <r> | <i> | ... | <r> | <i> | ... |
| 00002 | <MAC addr. for AD2> | <r> | <i> | <r> | <i> | ... | <r> | <i> | ... |
| 00003 | <MAC addr. for AD3> | <r> | <i> | <r> | <i> | ... | <r> | <i> | ... |
| ⋮ | ⋮ | ⋮ | ⋮ | ⋮ | ⋮ | | ⋮ | ⋮ | |
| N | <MAC addr. for ADn> | <r> | <i> | <r> | <i> | ... | <r> | <i> | ... |

FIG. 6A

| Index | AD Identifier | Iteration 1 | | Iteration 2 | | ... | Iteration T | |
|---|---|---|---|---|---|---|---|---|
| | | t | p | t | p | | t | p |
| 00001 | <MAC addr. for AD1> | <t> | <p> | <t> | <p> | ... | <t> | <p> |
| 00002 | <MAC addr. for AD2> | <t> | <p> | <t> | <p> | ... | <t> | <p> |
| 00003 | <MAC addr. for AD3> | <t> | <p> | <t> | <p> | ... | <t> | <p> |
| ⋮ | ⋮ | ⋮ | ⋮ | ⋮ | ⋮ | | ⋮ | ⋮ |
| N | <MAC addr. for ADn> | <t> | <p> | <t> | <p> | ... | <t> | <p> |

FIG. 6B

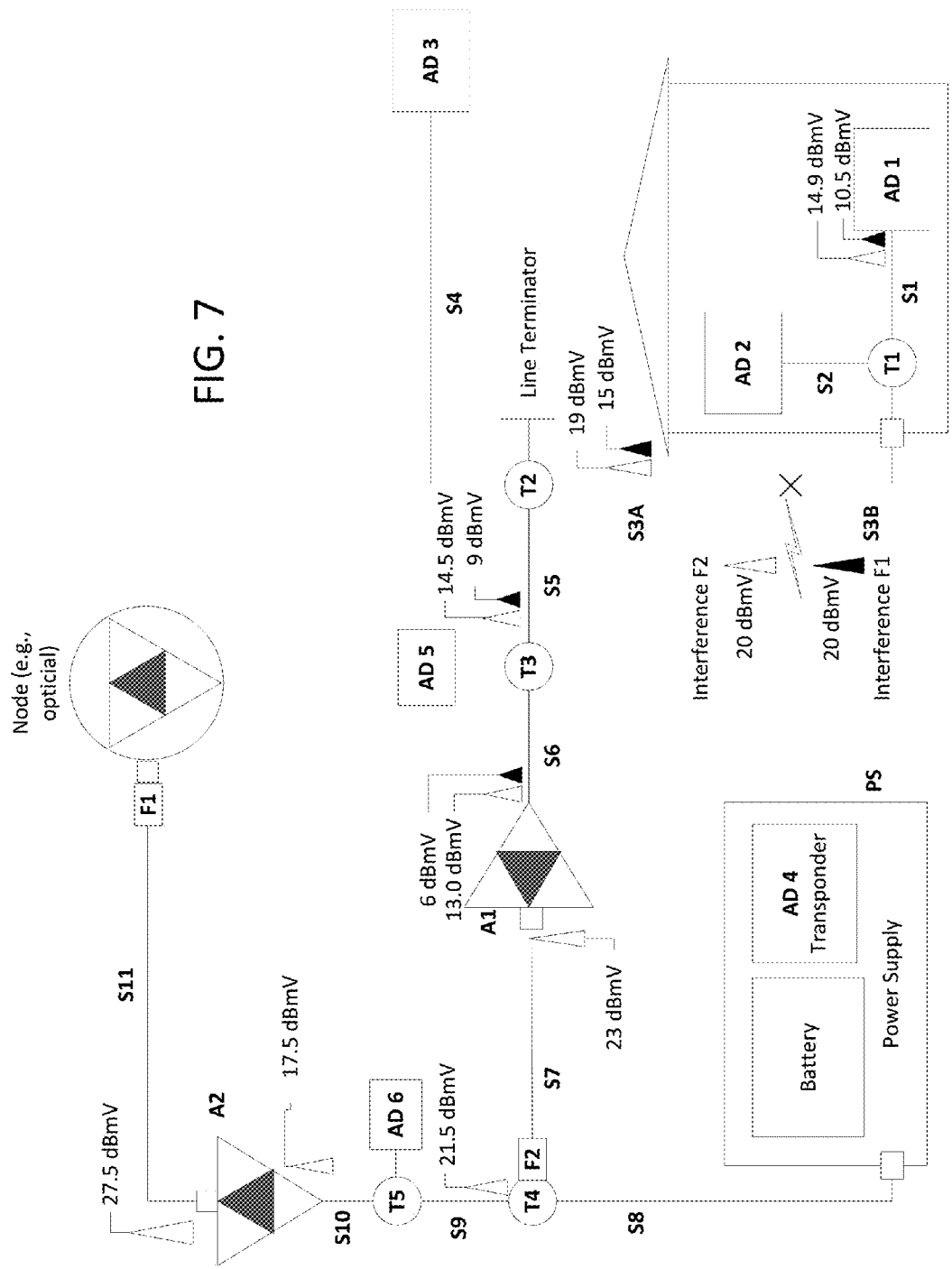

| Index | AD Identifier | f 1 | f 2 | ... | f N | ... | Sum | Freq. |
|---|---|---|---|---|---|---|---|---|
| 00001 | <MAC addr. for AD1> | <d> | <d> | ... | <d> | ... | <s> | <f> |
| 00002 | <MAC addr. for AD2> | <d> | <d> | ... | <d> | ... | <s> | <f> |
| 00003 | <MAC addr. for AD3> | <d> | <d> | ... | <d> | ... | <s> | <f> |
| ... | ... | ... | ... | ... | ... | ... | ... | ... |
| N | <MAC addr. for ADn> | <d> | <d> | ... | <d> | ... | <s> | <f> |

FIG. 9A

| Index | AD Identifier | Iteration 1 | | | Iteration 2 | | | ... | Iteration T | | |
|---|---|---|---|---|---|---|---|---|---|---|---|
| | | t | s | f | t | s | f | | t | s | f |
| 00001 | <MAC addr. for AD1> | <t> | <s> | <f> | <t> | <s> | <f> | ... | <t> | <s> | <f> |
| 00002 | <MAC addr. for AD2> | <t> | <s> | <f> | <t> | <s> | <f> | ... | <t> | <s> | <f> |
| 00003 | <MAC addr. for AD3> | <t> | <s> | <f> | <t> | <s> | <f> | ... | <t> | <s> | <f> |
| ... | ... | ... | ... | ... | ... | ... | ... | ... | ... | ... | ... |
| N | <MAC addr. for ADn> | <t> | <s> | <f> | <t> | <s> | <f> | ... | <t> | <s> | <f> |

FIG. 9B

| Index | Id. | Attenuation Factor |
|---|---|---|
| 1 | AD1 | AF1(location, frequency) |
| 2 | AD2 | AF2(location, frequency) |
| 3 | AD3 | AF3(location, frequency) |
| 4 | AD4 | AF4(location, frequency) |
| 5 | AD5 | AF5(location, frequency) |
| 6 | AD6 | AF6(location, frequency) |
| ⋮ | ⋮ | ⋮ |

FIG. 9C

| Index | Id. | Parameter 1 | | Parameter 2 | | Parameter 3 | | Parameter 4 | |
|---|---|---|---|---|---|---|---|---|---|
| | | Para. | Value | Para. | Value | Para. | Value | Para. | Value |
| 1 | AD1 | Type | AD | sig. loss | 0dB | | | | |
| 2 | AD2 | Type | AD | sig. loss | 0dB | | | | |
| 3 | AD3 | Type | AD | sig. loss | 0dB | | | | |
| 4 | AD4 | Type | AD | sig. loss | .5dB | | | | |
| 5 | AD5 | Type | AD | sig. loss | .5dB | | | | |
| 6 | AD6 | Type | AD | sig. loss | .5dB | | | | |
| 7 | S1 | Type | RG-6 | 5-42MHz | 1dB/100ft | .6-.75 GHz | 5dB/100ft | length | 10ft |
| 8 | S2 | Type | RG-6 | 5-42MHz | 1dB/100ft | .6-.75 GHz | 5dB/100ft | length | 10ft |
| 9 | S3 | Type | RG-6 | 5-42MHz | 1dB/100ft | .6-.75 GHz | 5dB/100ft | length | 200ft |
| 10 | S4 | Type | RG-11 | 5-42MHz | .5dB/100ft | .6-.75 GHz | 2dB/100ft | length | 100ft |
| 11 | S5 | Type | RG-11 | 5-42MHz | .5dB/100ft | .6-.75 GHz | 2dB/100ft | length | 100ft |
| 12 | S6 | Type | RG-11 | 5-42MHz | .5dB/100ft | .6-.75 GHz | 2dB/100ft | length | 100ft |
| 13 | S7 | Type | RG-11 | 5-42MHz | .5dB/100ft | .6-.75 GHz | 2dB/100ft | length | 100ft |
| 14 | S8 | Type | RG-11 | 5-42MHz | .5dB/100ft | .6-.75 GHz | 2dB/100ft | length | 100ft |
| 15 | S9 | Type | RG-11 | 5-42MHz | .5dB/100ft | .6-.75 GHz | 2dB/100ft | length | 100ft |
| 16 | S10 | Type | RG-11 | 5-42MHz | .5dB/100ft | .6-.75 GHz | 2dB/100ft | length | 500ft |
| 17 | S11 | Type | RG-11 | 5-42MHz | .5dB/100ft | .6-.75 GHz | 2dB/100ft | length | 500ft |
| 18 | A1 | Type | amp | 5-42MHz | 10dB(up), -60dB(dn) | .6-.75 GHz | -60dB(up), 10dB(dn) | | |
| 19 | A2 | Type | amp | 5-42MHz | 10dB(up), -60dB(dn) | .6-.75 GHz | -60dB(up), 10dB(dn) | | |
| 20 | T1 | Type | splitter | ins. loss | 4dB | tap iso. | 20dB | | |
| 21 | T2 | Type | splitter | ins. loss | 4dB | tap iso. | 20dB | | |
| 22 | T3 | Type | tap | ins. loss | 1dB | tap iso. | 20dB | | |
| 23 | T4 | Type | tap | ins. loss | 1dB | tap iso. | 20dB | | |
| 24 | T5 | Type | tap | ins. loss | 1dB | tap iso. | 20dB | | |
| 25 | F2 | Type | filter | ins. loss | 0dB | | | | |

FIG. 9E

NETWORK IMPLEMENTATION OF SPECTRUM ANALYSIS

RELATED APPLICATIONS

This application claims priority to and is a continuation of U.S. application Ser. No. 15/167,349, filed on May 27, 2016, which is a continuation of U.S. application Ser. No. 13/834,962, filed on Mar. 15, 2013, which claims priority to U.S. Provisional Application No. 61/773,138, filed Mar. 5, 2013, which are incorporated by reference herein.

BACKGROUND

Many communication networks include multiple access devices communicating with a hub device. Anomalies in a communication channel between an access device and the hub may induce signal distortions in the channel, thereby causing issues such as inter-symbol interference (ISI). A need exists to be able to locate and correct the cause of distortions.

SUMMARY

This Summary is provided to introduce a selection of concepts in a simplified form that are further described below in the Detailed Description. This Summary is not intended to identify key features or essential features of the disclosure.

As disclosed herein, the inventors have determined that certain network faults have specific characteristics that can be used to identify the type of fault and to identify the location of the fault. Examples of such anomalies may include micro-reflections due to impedance discontinuities and the ingress of noise from external sources.

In some aspects, apparatus, systems, and methods are disclosed for detecting, identifying, and locating the source of anomalies in a communication network. In various embodiments, access devices may time-sample communication signals received over the network, and from the time-sampled data, calculate frequency characteristics (e.g., spectrum analysis data) of the network, portions of the network, particular or groups of devices, etc. The frequency characteristics may include in-band or out-of-band characteristics associated with one or more communication channels in the network and/or include characteristics related to status, health, or performance of the network. An analyzer may collect from access devices, for example, data indicative of spectrum analysis data calculated at each of the access devices. In some aspects, the analyzer may then detect and locate various anomalies and determine anomaly sources. Such anomalies may include malfunctioning amplifiers, impedance cavities, excessive signal loss/egress, noise ingress, wideband interference/noise, arcing, incorrect plant setup, excessive tilt and leveling, frequency selective RF attenuations and notches, excessive attenuation, automatic gain control errors in amplifiers, etc.

Detection may be made by comparing and characterizing the frequency data over time, across several access devices, and/or over different frequency spectrums that include multiple communication channels and/or non-channel bands. The network topology and frequency response may be determined, and with the characterized frequency data, identify and locate the anomalies.

These and other embodiments are described in more detail below.

BRIEF DESCRIPTION OF THE DRAWINGS

FIGS. 2A-2C include illustrative diagrams of a branch of the network in FIG. 1 in accordance with various embodiments.

FIGS. 4A-4L illustrate user interfaces presenting frequency spectrum data of access devices that indicate noise caused by different types of faults according to various embodiments.

FIGS. 6A-6B illustrate various data structures in accordance with one or more embodiments.

FIG. 7 includes the network branch of FIGS. 2A-2C with illustrative attenuations of a noise source according to various embodiments.

FIGS. 9A-9E illustrate various data structures in accordance with one or more embodiments.

DETAILED DESCRIPTION

Figure 1:
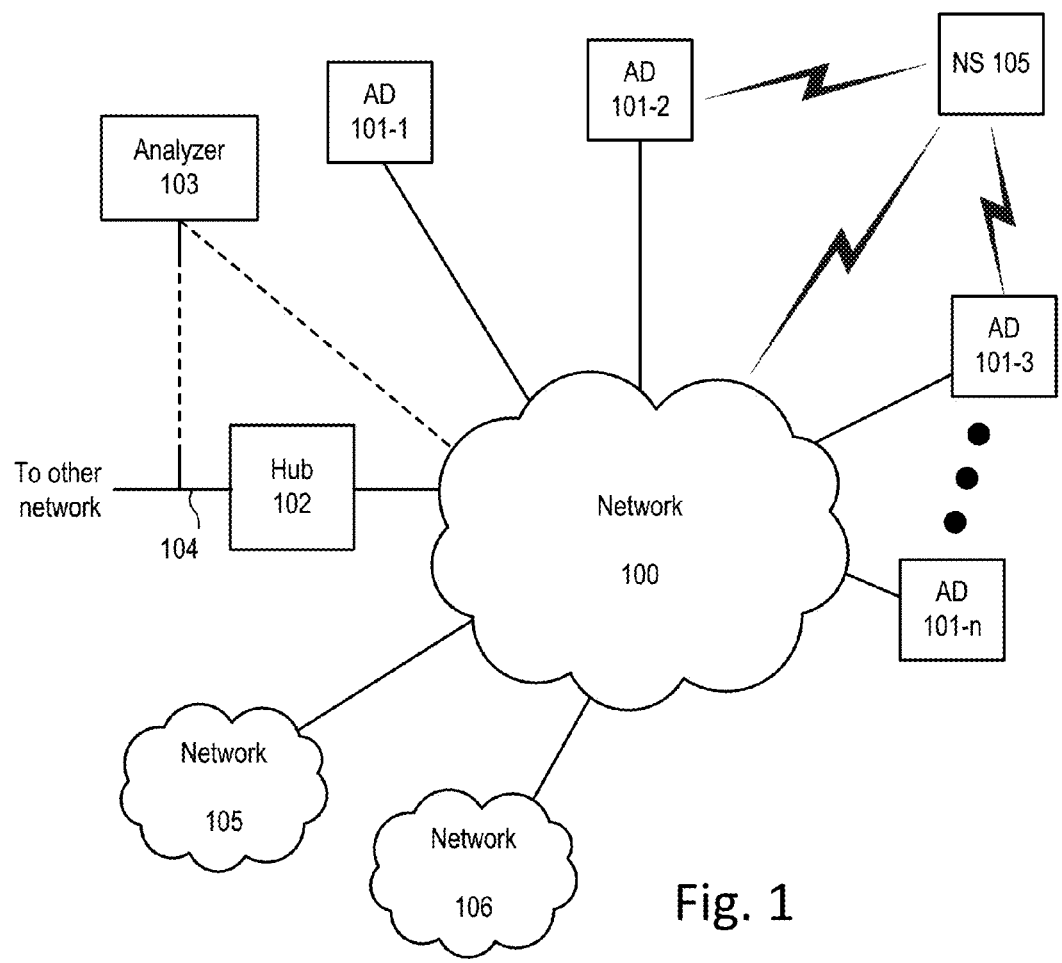
FIG. 1 includes a diagram showing elements in an illustrative network in which some embodiments may be practiced.

FIG. 1 is a block diagram illustrating elements in an exemplary network 100 (e.g., access network) according to some embodiments. Each of multiple access devices (AD) 101-1 through 101-n communicates with a hub 102 across a particular path through network 100. Each of devices 101-1 through 101-n may share a portion of its particular communication path to hub 102 with one or more other access devices 101-1 through 101-n (e.g., access devices on the same street, on the same building floor, or otherwise in a similar geospatial region).

In some embodiments, hub 102 may include a termination system (e.g., CMTS) or other type of similar system, network 100 may include a network (e.g., optical, hybrid-fiber coaxial (HFC), twisted pair, etc.), and access devices 101-1 through 101-n may include modems or other devices (e.g., cable modems, set top terminals, etc.) communicating via the network.

While some embodiments are described in the context of communications between modems and a termination system in network, other embodiments may include different types of access devices (e.g., fiber optic modems, wireless transceivers, gateways, set top terminals, digital video recorders) and/or different types of hubs (e.g., optical line terminals, wireless base stations, satellites). Such networks may use any of numerous communication protocols and various different types of physical communication media (e.g., twisted pair conductors, wireless RF communications, fiber optical link, etc.).

In some embodiments, for example, network 100 may be a digital subscriber line (DSL) network, hub 102 may be a DSL access module (DSLAM), and access devices 101-1 through 101-n may be DSL modems or other devices communicating via the DSL network. In still other embodiments, network 100 may be a satellite, cellular, or other wireless network, access devices 101-1 through 101-n may be transceivers through which users can access the wireless network, and hub 102 may be a base station or other wireless network hub. In yet other embodiments, network 100 may include a Fiber to the Home (FTTH) network, Fiber to the Premises (FTTP) network, passive optical network (PON), RF over glass (RFOG) network, Digital Subscriber Line (DSL) network, multimedia over coax access (MOCA) network, etc.

In some embodiments, such as ones operated in accordance with Data-Over-Cable Service Interface Specification (DOCSIS) standards, a cable modem termination system may monitor communications from cable modems to collect data form access devices. In some embodiments, the network may comprise a hybrid fiber coaxial cable network that carries video data (e.g., a cable television signal) in addition to other data (e.g., packet data in accordance with one or more DOCSIS standards). For example, the network may carry data between a data processing facility (e.g., head end) and a set-top-box located in a client premises (e.g., a cable television signal) and data between a data processing facility (e.g., head end) and a cable modem located in a client premises (e.g., packet data in accordance with one or more DOCSIS standards).

Hub 102 may communicate over one or more links 104 (e.g., a Gigabit Ethernet link) with the Internet, a private IP (internet protocol) data network, and/or other network that allows communications between devices 101-1 through 101-n (via hub 102) and one or more external networks. In the examples of FIG. 1 and subsequent figures, "n" represents an arbitrary number. Network 100 may include tens, hundreds, thousands or more access devices, and may be connected to a plurality of other networks (e.g., 105, 106). Hub 102 may also utilize links 104 for communication with billing servers, network management servers, and/or other network elements. One such network element is analyzer 103. Analyzer 103 may retrieve from hub 102 (or directly from devices 101-1 through 101-n via network 100) data that indicates signal characteristics in communication paths between access devices 101-1 through 101-n, and between the access devices and hub 102. In some embodiments, this data includes in-band and out-of-band (e.g., guard intervals) frequency data of signals received at devices 101-1 through 101-n. According to some embodiments, Analyzer 103 may process the retrieved data to characterize devices 101-1 through 101-n, to identify devices that share communication paths or portions of paths, and to diagnose and locate network problems such as noise/interference ingress, attenuation, malfunctioning network elements, and other anomalies. Although FIG. 1 shows analyzer 103 communicating with hub 102 over link 104, analyzer 103 could alternatively be connected to (or be a part of) hub 102, or may alternatively be connected to network 100 itself.

At various times, a noise source (NS) 105 may be present that introduces noise into the system at one or more access devices (e.g., AD 101-2, AD 101-3) and/or at a location within network 100. Noise source 105 may include an external signal or may result from an anomaly that distorts signals present on the network.

Figure 2B:
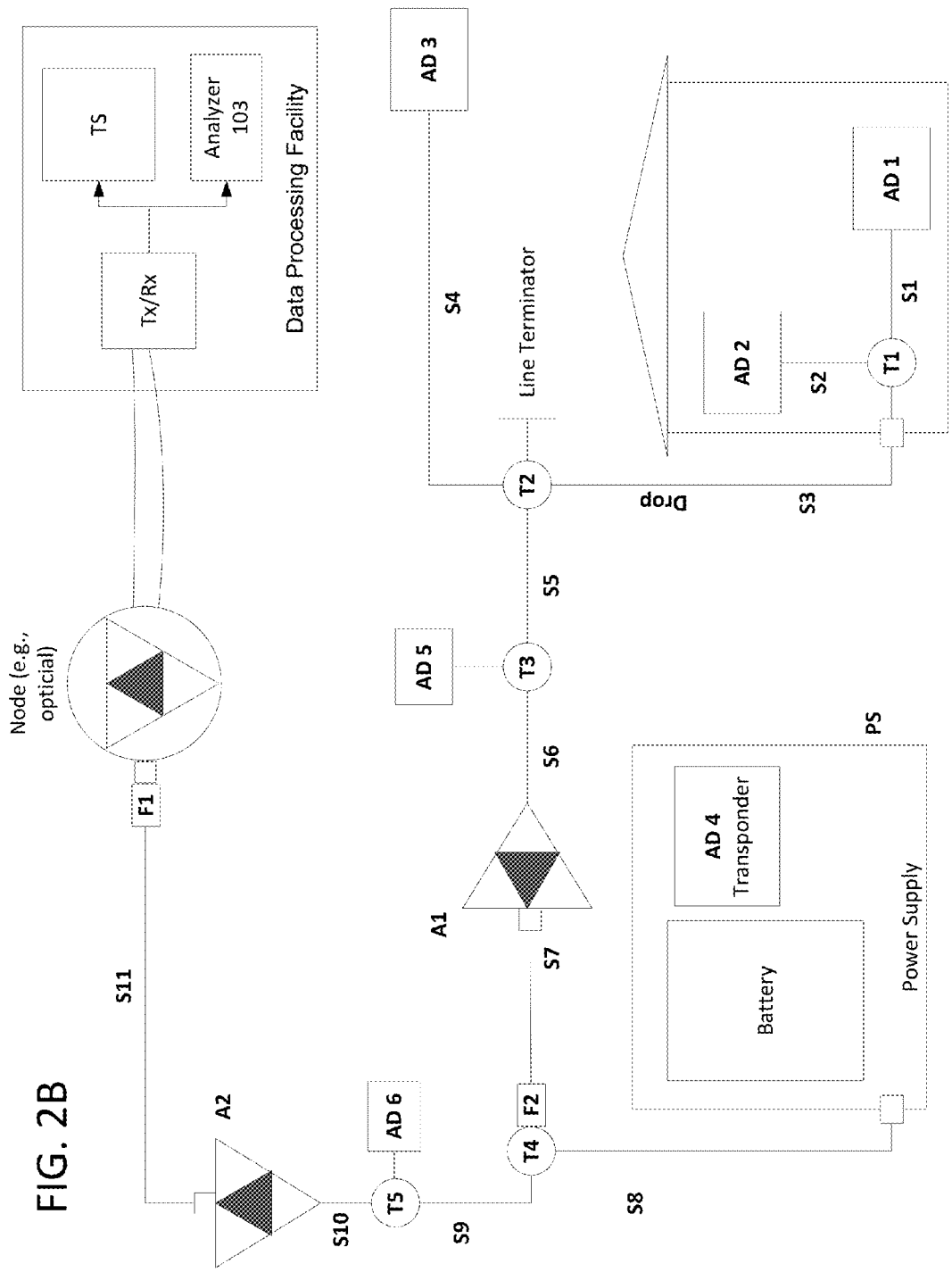
Figure 2C:
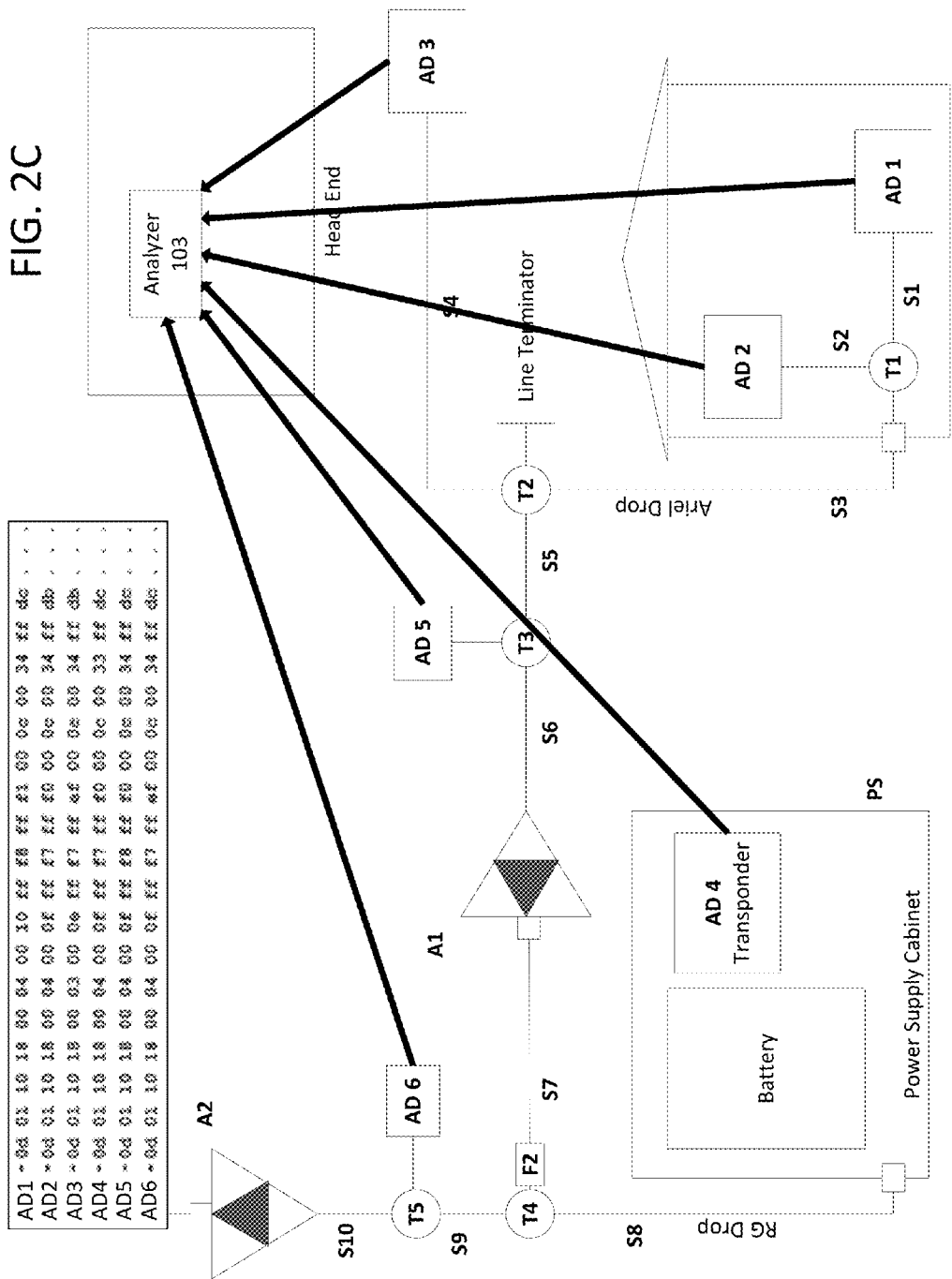

FIGS. 2A-2C include illustrative diagrams of a branch of the network of FIG. 1, in which noise, interference, and/or other anomalies may be detected according to various embodiments. To providing a non-limiting example using components relative to a particular network, FIGS. 2A-2C are described with respect to a hybrid coax/fiber network, though other networks and components may be used.

Referring to FIG. 2A, at a first end, the network branch may begin at a data processing facility (e.g., head end) that includes a termination system TS (e.g., a cable modem termination system (CMTS)), a modulator and/or demodulator (e.g. an edge quadrature amplitude modulator and demodulator), a computing device such as analyzer 103 (not depicted), and combiners equipped to combine multiple signals onto the network. In some variations, the network may carry optical signals on optical strands between the data processing facility (e.g., head end) and an optical node. The optical node may include an optical combiner/splitter, which receives downstream optical signals at an optical/RF converter that re-modulates the downstream signals as RF signals onto a coaxial cable network beginning at a communication link (e.g., hardline trunk). The downstream signal may progress over the communication link to an amplifier and then across a feed (e.g., an RG coaxial cable). The feed may connect to one or more taps that may include communication links (e.g., drop lines) to customer premises and/or network equipment, such as power supply cabinets (e.g., a unit comprising batteries and a transponder). In an example, the power cabinet may provide back-up power to a subset of the network active elements (e.g., amplifiers). The network may continue across additional coaxial cables, amplifiers, and feeder taps, and filters (not illustrated). The feeder taps may connect to customer premises via a communication link (e.g., drop line) cable and/or a ground block. The signal may enter the customer premises through the ground block, pass through one or more splitters, and connect to a plurality of customer premises equipment (e.g., a cable modem, a set top box, etc.). In an example, an upstream signal may traverse the network in a similar fashion from the customer premises and/or network equipment to the termination system at the data processing facility (e.g., head end). The optical node may receive upstream RF signals from the communication link (e.g., hardline trunk) and re-transmit the upstream signals as optical signals.

FIG. 2B illustrates a block diagram of a branch of a network similar to FIG. 2A according to various embodiments. The network branch may begin at a headend or other termination point that may for example include a termination component (e.g. a cable modem termination system (CMTS)), the analyzer 103, and a bidirectional interface (e.g., an optical transmitter/receiver). The termination point may be coupled to the remainder of the branch via the bidirectional interface through a bidirectional fiber-optic communication path connecting the termination system to a fiber node (e.g., fiber-optic/coax node). The optical node may include an optical combiner/splitter, which receives downstream optical signals at an optical/RF converter, which drives a modulator, which then transmits RF signals onto the coax network beginning at communication link (e.g., hardline trunk) segment S11.

The optical node may also include a de-modulator, which demodulates RF signals received from the coax network and transmits the demodulated signals to an RF/optical converter. The RF/optical converter may then transmit the converted upstream signals to the combiner/splitter, which then transmits the upstream signals to the termination system via the optical fiber path.

The coaxial branch may include a plurality of communication paths S1-S11 interconnected by a plurality of amplifiers A1 and A2, taps T3, T4, and T5, power supply cabinet PS, filters F1 and F2, and combiner/splitters T1 and T2. The network also includes a plurality of access devices AD1-AD6, such as modems, set-top boxes, transponders, etc. Although not illustrated, groups of access devices located in different facilities (e.g., apartments, condominiums, single-family homes, duplexes, offices, plants, etc.) may be connected through taps and splitter/combiners. For example, each facility may include multiple access devices connected to a single tap. While the coaxial branch of the network in FIG. 2B illustrates one topology, other illustrative networks may include additional amplifiers, combiners/splitters, taps, and communication paths, which may connect hundreds, thousands, or tens of thousands of access devices to the network. Additionally, the network may include other optical nodes supporting other coaxial branches, which are not shown for convenience.

Figure 3A:
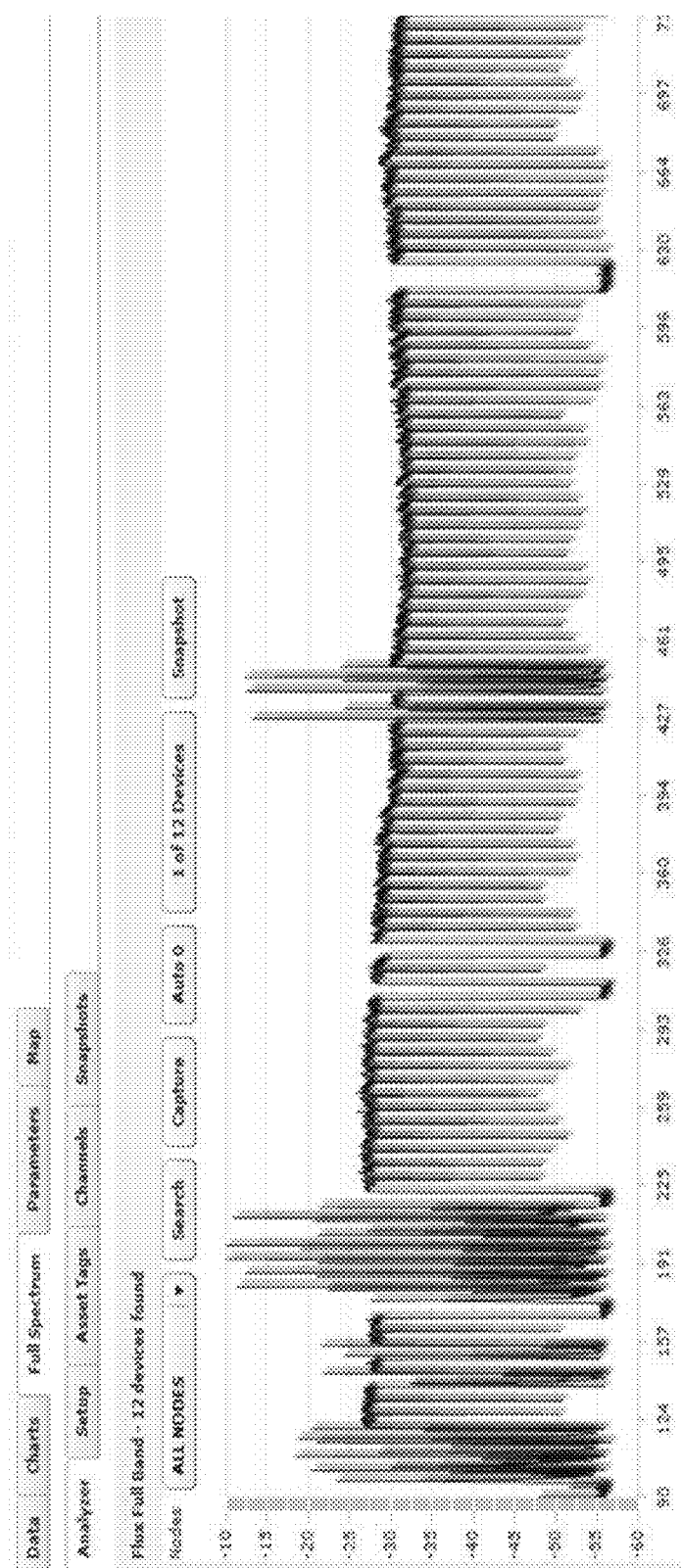
FIGS. 3A-3C illustrate frequency spectrum data of a network at an access device according to various embodiments.

In an embodiment, each access device AD1-AD6 may time sample the signals received on the network and perform a spectral analysis of the time-sampled data. For example, access device AD1 may comprise a cable modem and may perform spectral analysis of a signal received at AD1. In an example, the spectral analysis may include performing a fast Fourier transform (FFT) on the received signal that results in data representative of the signal in the frequency domain. In some embodiments, the spectral analysis may output frequency spectrum data in the form of minimum values, maximum values, average values, instantaneous values, or a combination of these. For example, FIG. 3A illustrates a frequency spectrum calculated for a signal received at one AD. In various examples, the time-sampled signals may be over a specific bandwidth. For example, the sampling may be over a single channel (e.g., 6 MHz channel), or over a set of channels (e.g., 1 GHz including channels, guard bands, and unallocated out-of-band frequencies).

FIG. 2C illustrates the network branch shown in FIG. 2B, according to various embodiments, in which analyzer 103 obtains data regarding signal characteristics in each of multiple communication paths within the network. Each path may be associated with an individual access device and can represent a physical path from that individual access device to the fiber node or other signal termination. In some embodiments, one or more access devices (e.g., cable modems, set-top-boxes, etc.) include a MAC address used to communicate with analyzer 103. As illustrated in FIG. 2C, the data acquired by the analyzer 103 may include frequency spectrum data of the signals received by each access device connected to the communication path (e.g., a frequency spectrum of signals received at the access device). The analyzer 103 may collect the data by communicating with each of the access devices through the communication paths. For example, the analyzer 103 may poll each access device for data. In other examples, each access device may report its data to analyzer 103 periodically and autonomously. In other aspects, analyzer 103 may acquire the data from another device that communicates with the access devices to collect the data.

In various examples, a communication branch may include one or more sources of noise or signal distortion. FIGS. 3A-3C and 4A-4L illustrate various graphical depictions of frequency spectrum data generated from signals sampled by an access device. While the data is shown graphically in the figures, the data may be stored/represented in other forms, such as in a database, table, etc.

Figure 3B:
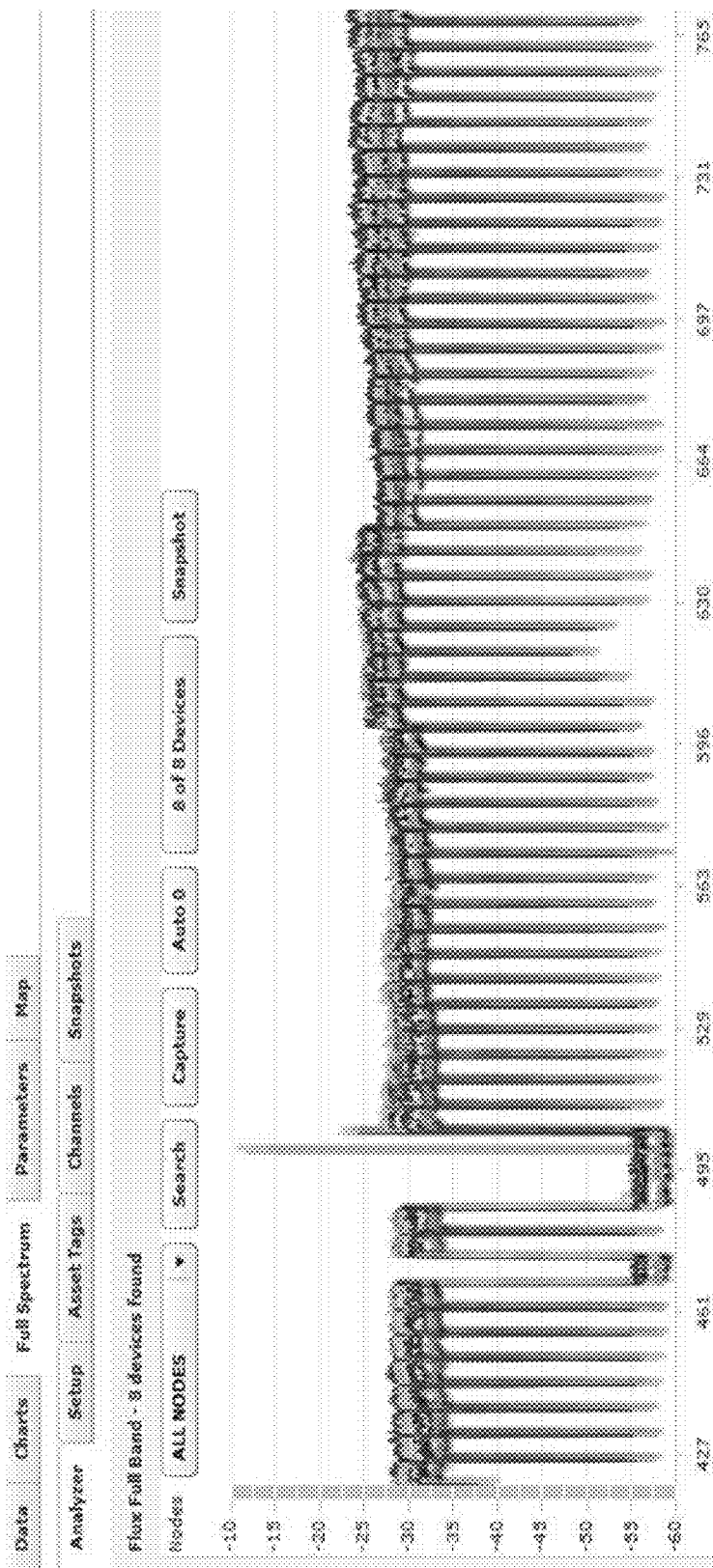

FIG. 3A illustrates example frequency spectrum data from a single access device in which the data spans a plurality of communications channels under nominal conditions (e.g., no anomalies). FIG. 3B illustrates example frequency spectrum data from multiple access devices in which the frequency spectrum data spans a frequency band including a plurality of communications channels under nominal conditions (e.g., no anomalies). As can be seen, each device may receive the same signals (e.g., exemplified by the spectrum of each device having similar profiles), but with different amplitudes, which depend upon the different attenuations of the different network paths to each access device. The frequency spectrum may include, for example, a number of 6 MHz audio/visual channels (e.g., ATSC channels), a number of 6 MHz data communication channels (e.g., DOCSIS), analog video and audio carriers.

Figure 3C:
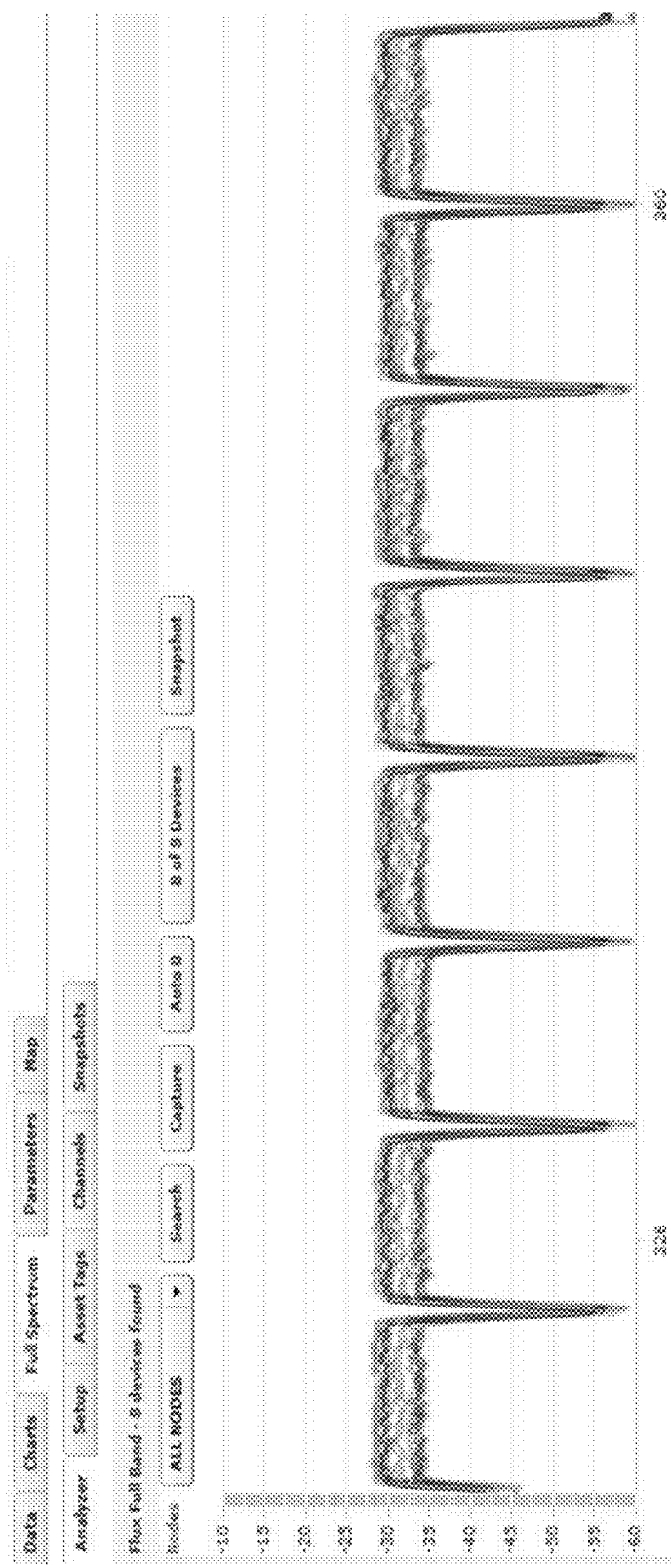

FIG. 3C illustrates in more detail a portion of the frequency data of FIG. 3B for a frequency band including eight 6 MHz channels. In addition to frequency data of each in-band signal (e.g., approximately, 5.4 MHz signal), the frequency spectrum between the in-band signals (e.g., the out-of-band signals at approximately 0.6 MHz width) may also be captured.

Figure 4A:
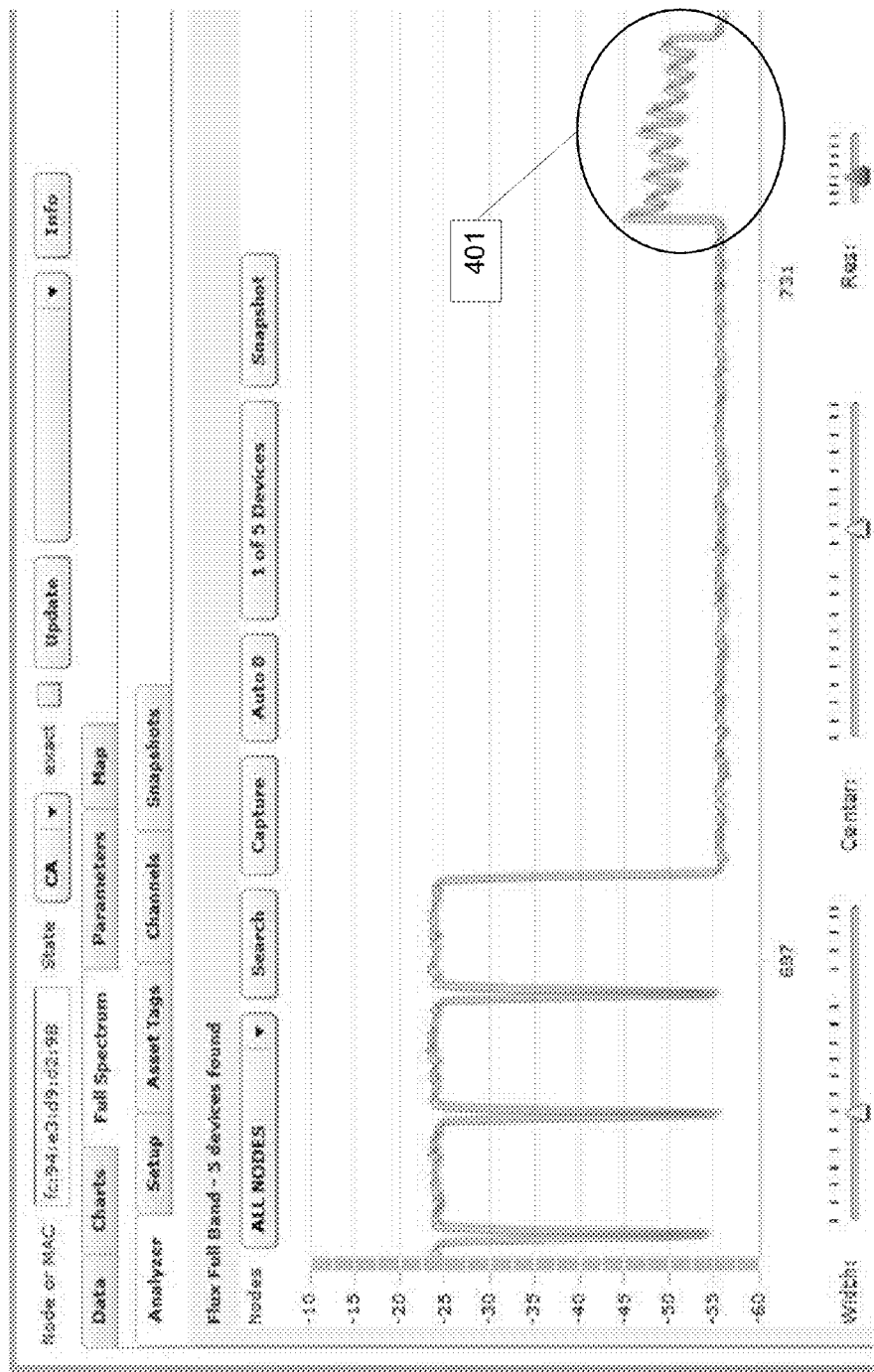
Figure 4B:
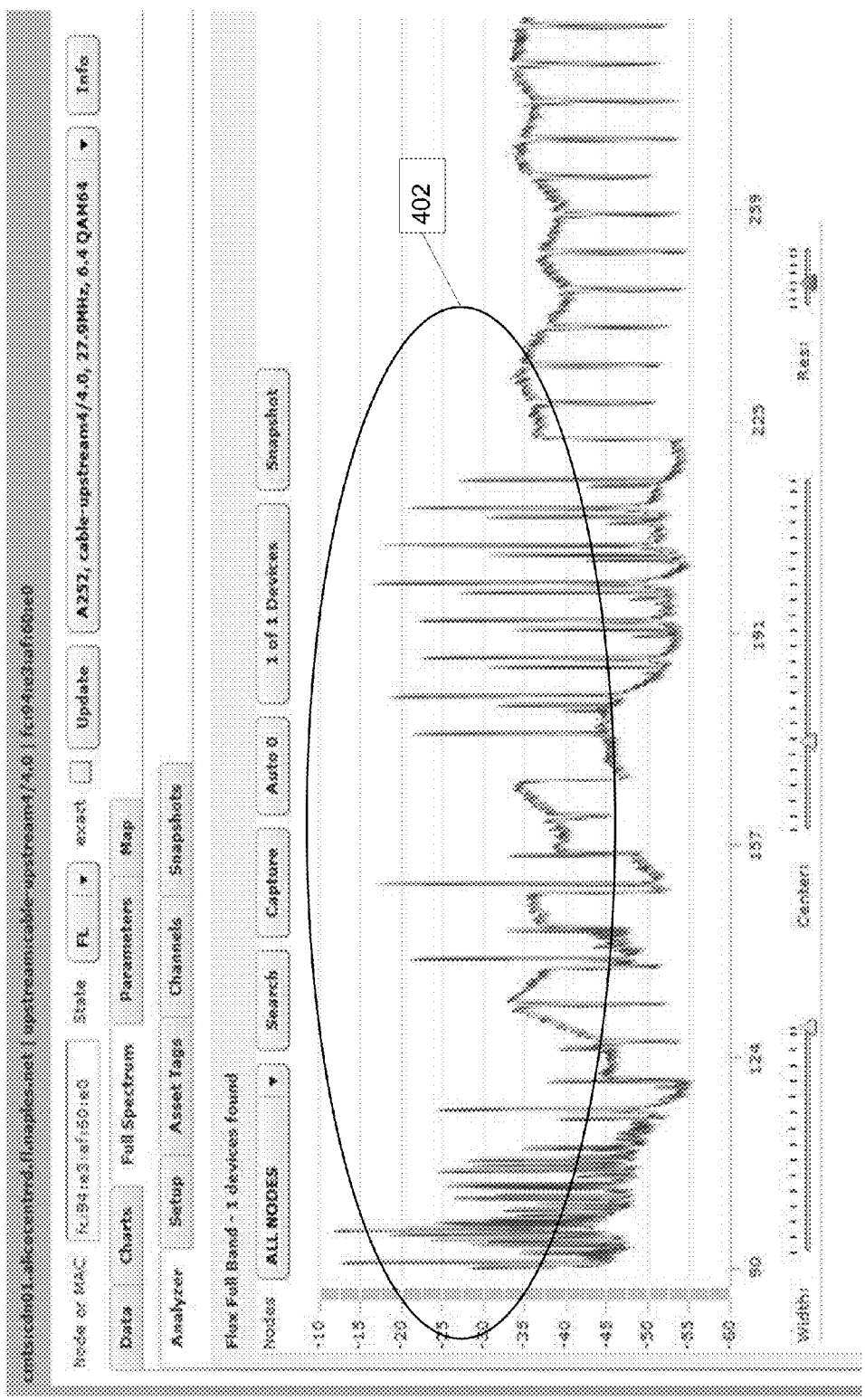

FIG. 4A illustrates example frequency spectrum data from an access device receiving a signal over the network from an external source (e.g., Long Term Evolution (LTE) wireless standard, 8VSB transmission, etc.), where the signal has ingressed into a network branch through a network fault such as a broken cable shield. Such anomalies may be induced, for example, by the momentary operation of a motor or transformer next to an unshielded signal path, or by an external transmitter outside of the communication system (e.g., cellular phone, television transmitter, wireless transmitter, etc.). Such anomalies may be momentary and dynamically change over time FIG. 4B illustrates example frequency spectrum data from an access device in the presence of wideband interference, such as power arcing, within the network branch. For example, short between the shield and the signal wire or between the shield and a power wire may induce interference over a wide bandwidth (e.g., several channels) with high amplitude that is above the transmitted signals allocated for that bandwidth. Such interference is indicated by the oval 402 in FIG. 4B.

Figure 8A:
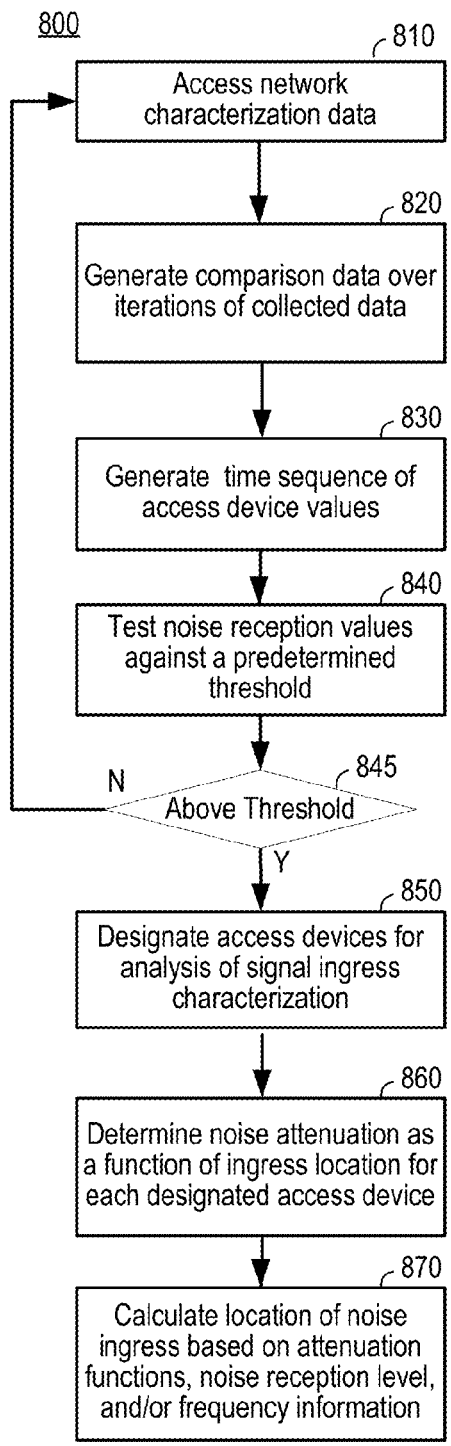
FIGS. 8A-8B illustrate operations in flow charts that may be performed in accordance with one or more embodiments.
Figure 8B:
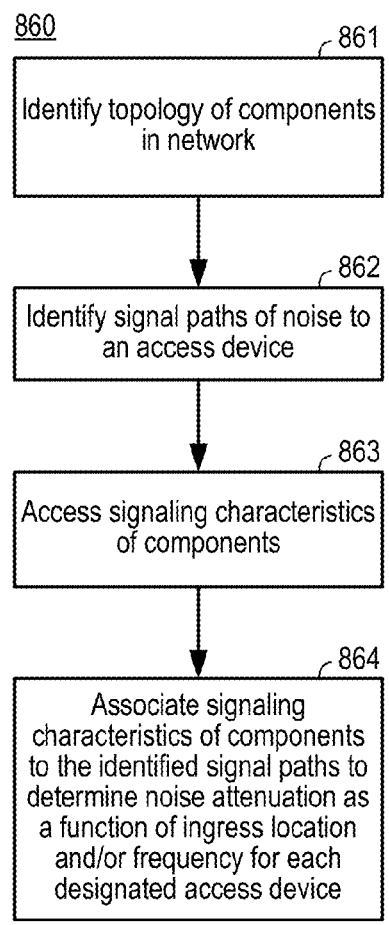

With respect to FIGS. 4A and 4B, the noise may be characterized from the frequency spectrum data as originating from a specific type of source (e.g., arcing, LTE transmitter, electric motor, etc.). For example, in FIG. 4A, the oval 401 identifies an ingressing signal that is above the allocated frequency spectrum in the network (e.g., above 700 MHz). The specific frequency range of approximately 735 MHz to 745 MHz of the ingress signal may be known (e.g., stored in a database) to be within the standard frequency band of an LTE channel transmitted from a cellular phone in a cellular wireless system. The signal may also be momentary (e.g., only present when the cellular phone is transmitting and near the unshielded cable.) From these characteristics, the analyzer may determine that the signal is generated from a cellular phone transmitting in the LTE band near a network fault (e.g., an unshielded cable). FIGS. 8A and 8B illustrate operations according to various aspects for detecting and identifying noise source such as those in FIGS. 4A and 4B and for locating the fault at which the noise enters the network.

Figure 4C:
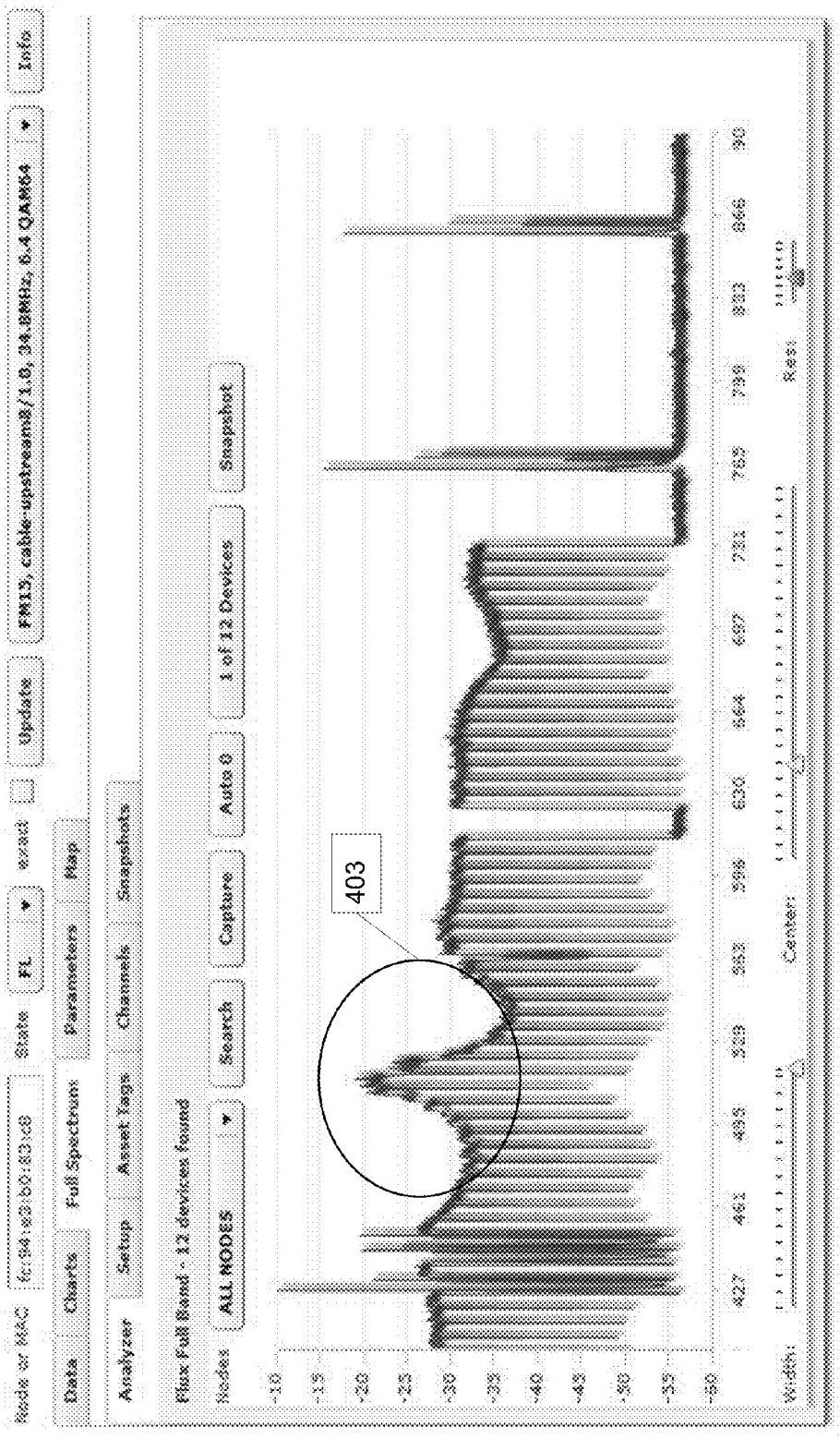
Figure 4D:
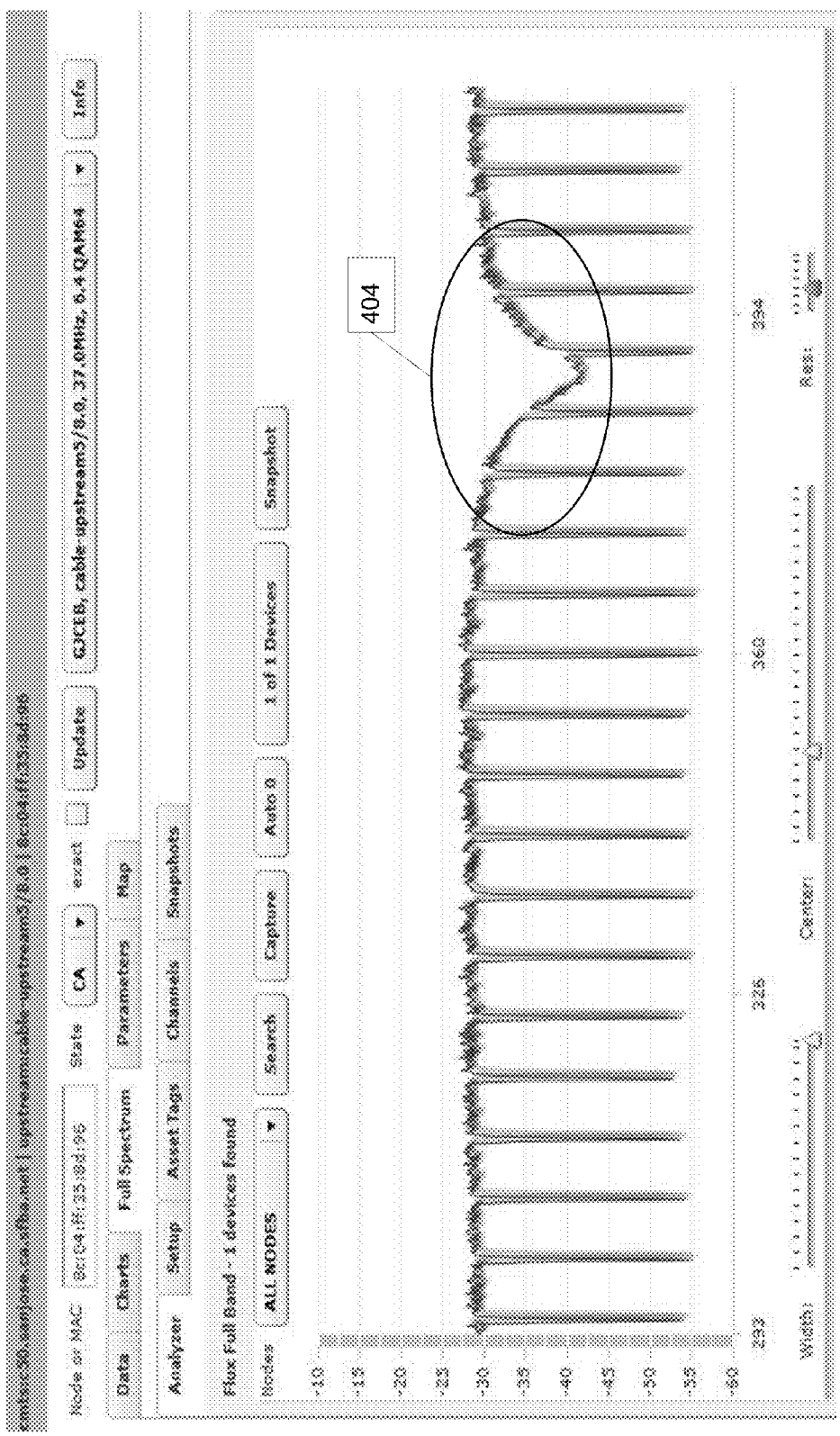
Figure 11:
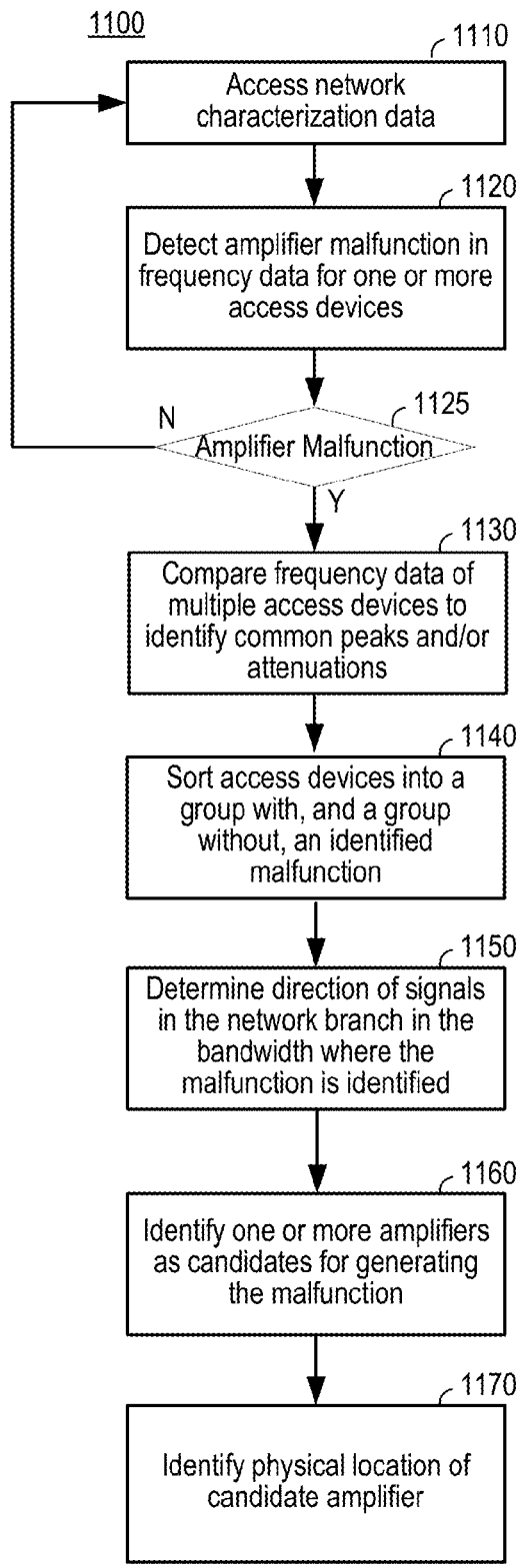
FIGS. 11-14 illustrate operations in flow charts that may be performed in accordance with one or more embodiments.

FIGS. 4C and 4D illustrate example frequency spectrum data from an access device that receives signals from a malfunctioning amplifier (e.g., A1). The malfunctioning amplifier may cause frequency selective resonant peaking and/or attenuation (e.g., a suck out) within a network branch. Under some amplifier failure conditions, network amplifiers exhibit a frequency selective peak 403 or attenuation 404 that can be characterized by their shapes as highlighted by the ovals in FIGS. 4C and 4D. In other amplifier failure conditions, network amplifiers exhibit temperature dependent automatic gain control failures as shown in FIGS. 4K and 4L. FIG. 11 includes operational steps of a process for detecting and locating malfunctioning amplifiers that cause a resonant peak or attenuation.

Figure 4E:
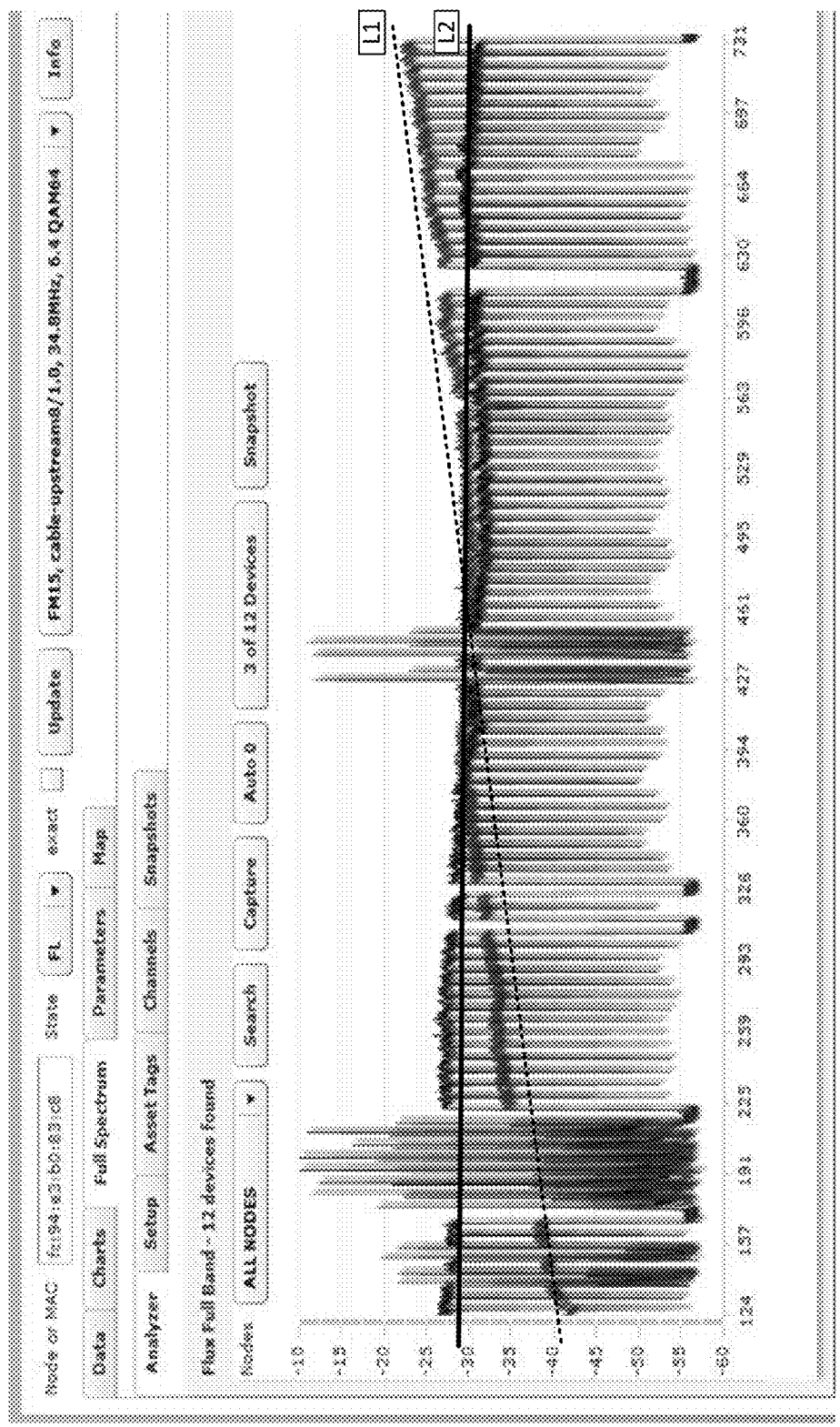

FIG. 4E illustrates example frequency spectrum data from multiple access devices in the presence of incorrect plant setup such as excessive frequency tilt and/or leveling, within the network branch. In the network, certain components may exhibit a characteristic or specific frequency response that is not constant (e.g., flat over the operating frequency band). For example, coaxial cable may have a frequency response that exhibits signal attenuation that linearly increases or decreases with frequency (resulting in decreasing or increasing signal amplitude, respectively, with frequency). Such attenuation, sometimes referred to as frequency tilt, is illustrated by the frequency data sets shown in FIG. 4E from two respective access devices. One access device shows a signal that has linearly increasing amplitude over the frequency range of 300 MHz to 731 MHz. A line, L1, illustrates a linear approximation of the frequency data exhibiting frequency tilt. While certain components, such as coaxial cable exhibit a linear frequency response, other components may exhibit other linear or non-linear frequency responses.

To adjust for these frequency dependent variations introduced into the network by the network components, the plant may be set up with one or more correction devices (e.g., filters F1, F2) distributed throughout the network to correct for such variations. For example, a filter (e.g., F2) may be inserted in-line in a network branch, with the filter having a frequency response that cancels the frequency dependent attenuation/amplifications for signals traversing that branch (e.g., a filter having an inverse response of the frequency tilt of a coaxial cable). By doing so, the frequency response may be leveled as shown by the frequency data of the second access device shown in FIG. 4E. Line L2 illustrates a linear approximation of the frequency data from signals received by the second access device, after the signals have been corrected by a correction device such a filter. As shown, the slope of L2 is closer to zero than the uncorrected slope of L1.

Figure 12:
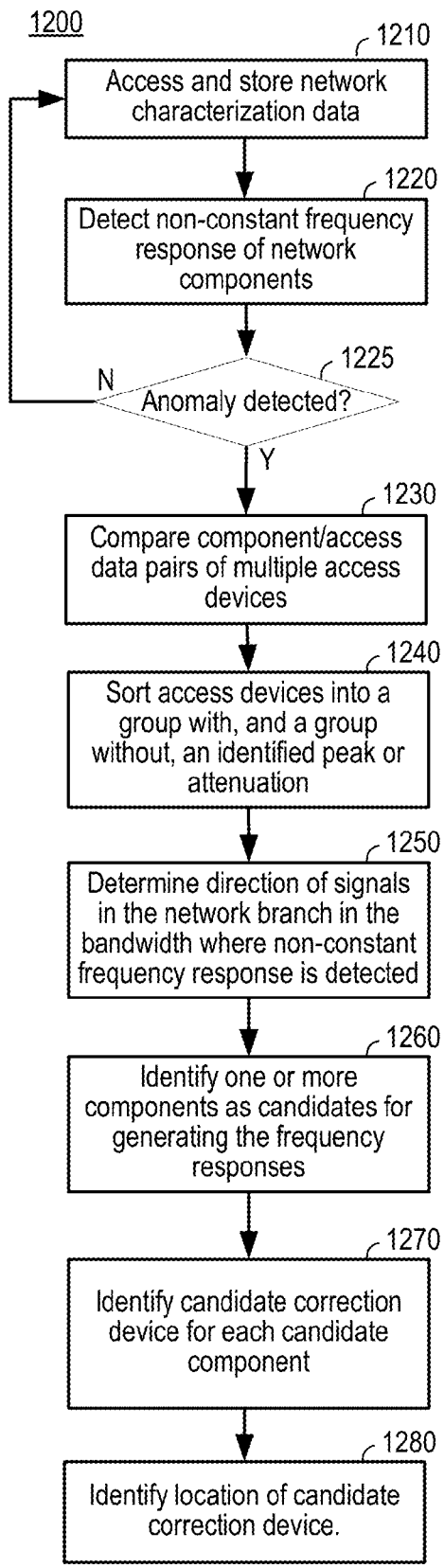

The filters or other correction devices may be included at various points in the network, such as at the input of one or more amplifiers, at taps, or in-line between coaxial segments. Frequency data that exhibits a non-constant response beyond a predetermined threshold (e.g., having an approximate linear slope beyond a threshold or equal to a predetermined slope within a predetermined margin of error), may indicate incorrect plant setup. For example, a filter may be needed, or a filter may exist but is failing, or a filter otherwise exhibits an insufficient response to correct the non-constant attenuation/amplification by the network components. FIG. 12 described herein provides a process for identifying network components exhibiting a non-constant frequency response that has not been corrected for by a correction device, and for locating a malfunctioning correction device or a place where a correction device is needed to be added.

Figure 4F:
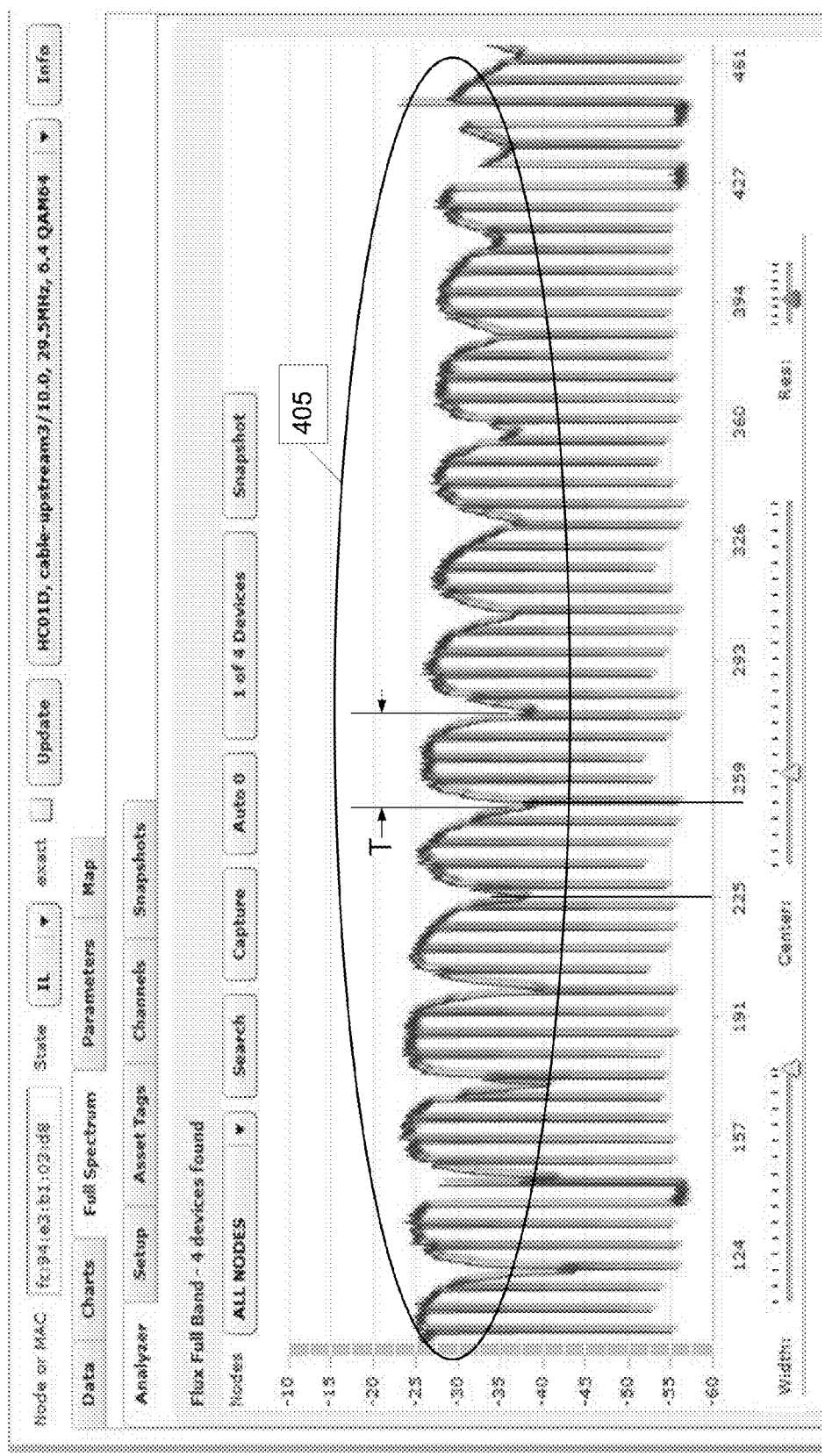
Figure 13:
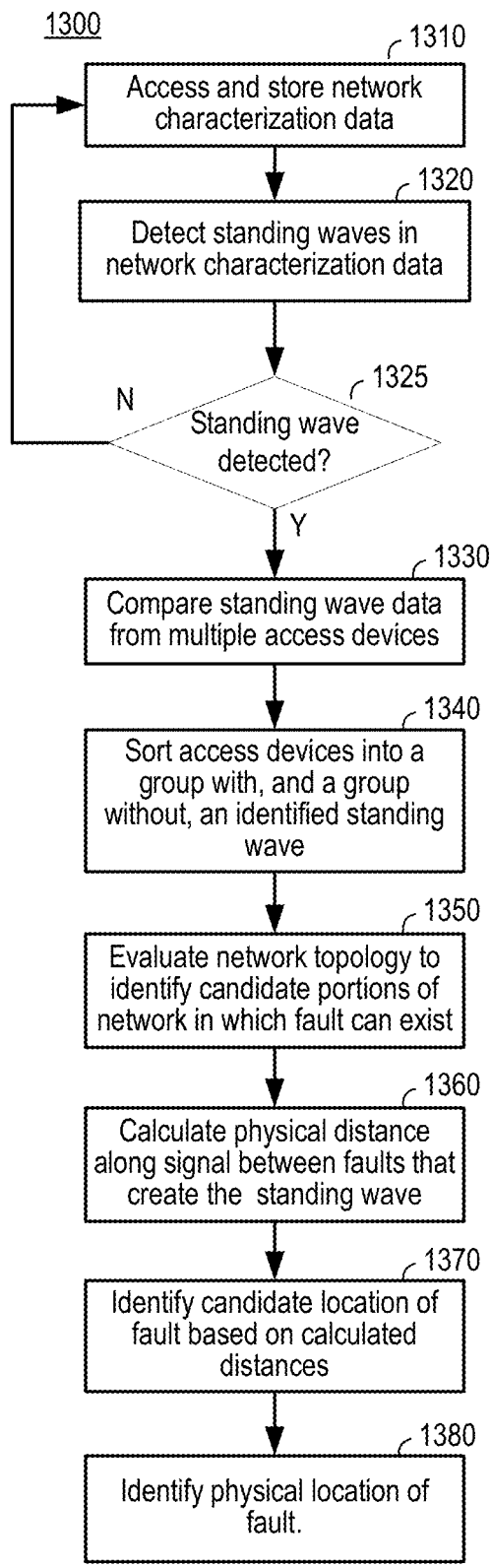

FIG. 4F illustrates example frequency spectrum data from an access device in the presence of an impedance cavity anomaly that causes a standing wave 405 on the network branch. The impedance cavity may result from the network including multiple impedance mismatches that cause a signal to be reflected back and forth in the network between the two mismatches. A period of the standing wave, T, illustrated in FIG. 4F may be equal to the time the reflected signal takes to propagate from a first impedance mismatch to a second impedance mismatch and back to the first impedance mismatch. Based on known velocities of propagations of signals within the different components (e.g., coaxial cable), a distance between the two mismatches may be determined. FIG. 13 described below provides a process for detecting impedance cavities, detecting the distance between the impedance mismatches, and locating the impedance mismatch in the network based on the distance and other network data.

Figure 4G:
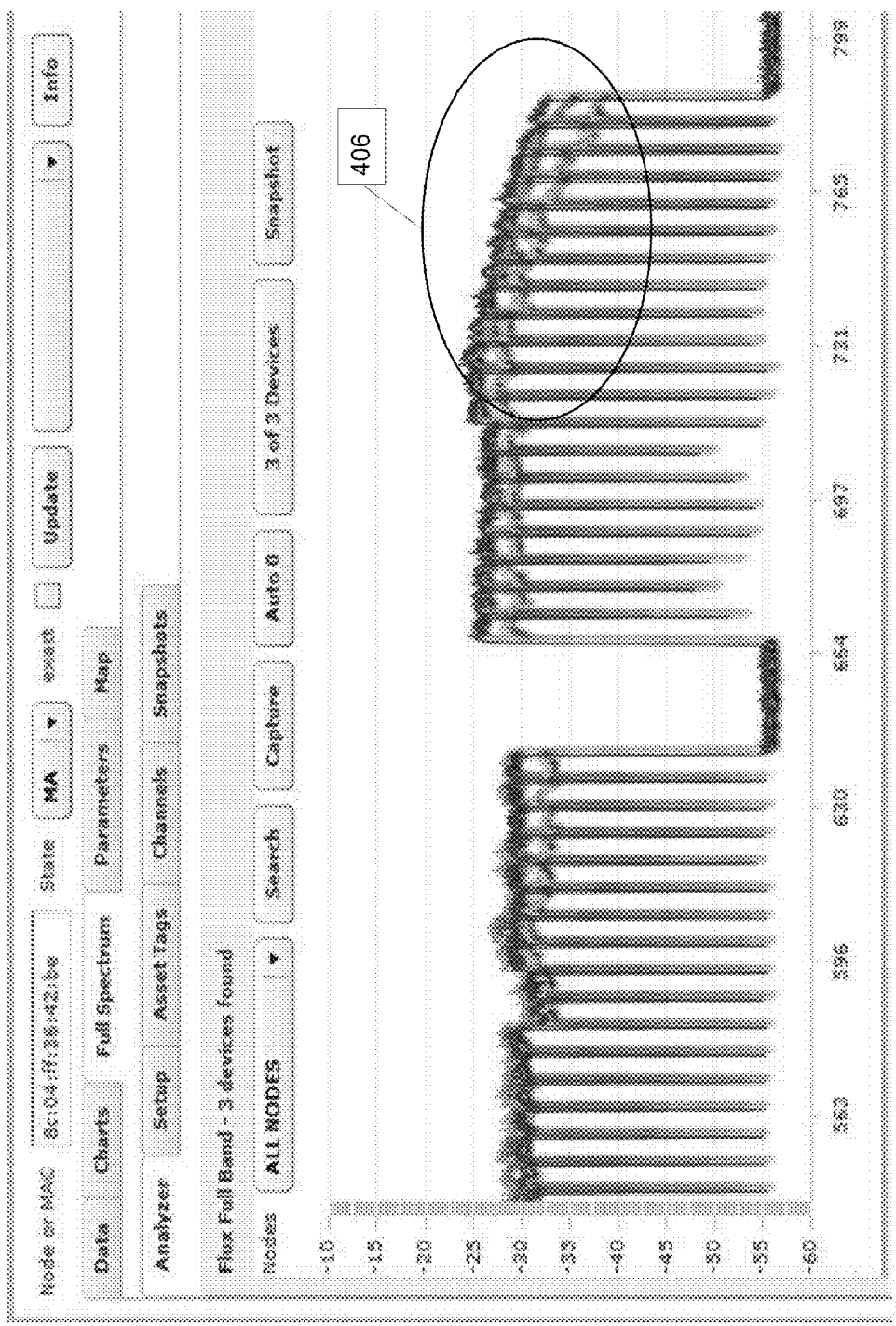

FIG. 4G illustrates example frequency spectrum data from multiple access devices in the presence of high-end roll-off 406 within the network branch. High-end roll-off may be caused by a network failure that attenuates signals at high frequency. One example could be a wet or damp conductor (e.g., a tap, coaxial cable). For example, water damage at a network connection point could inadvertently cause attenuation at high frequencies as a result of moisture entering a connection point between two components (e.g., between a tap and a coaxial cable).

Figure 4H:
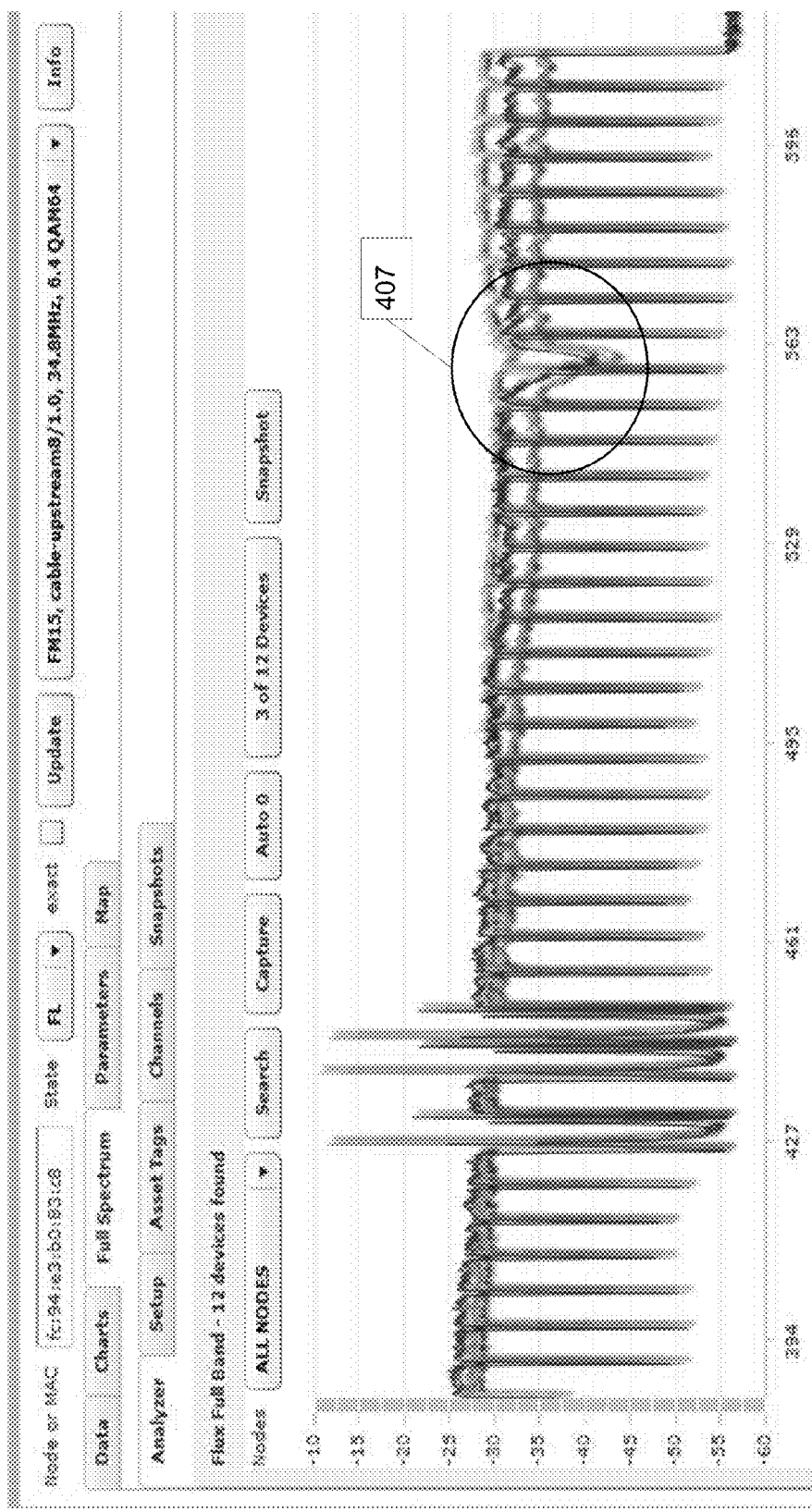

FIG. 4H illustrates example frequency spectrum data from multiple access devices in the presence of passive device (e.g., inductors, capacitors) failures in the network branch. The device failures may result in frequency selective notches 407 (e.g., attenuations). Such notches appear similar to the attenuations caused by amplifier failures in FIG. 4D, but may be distinguished based on shape, with the notches in FIG. 4H having more linear slopes.

Figure 4I:
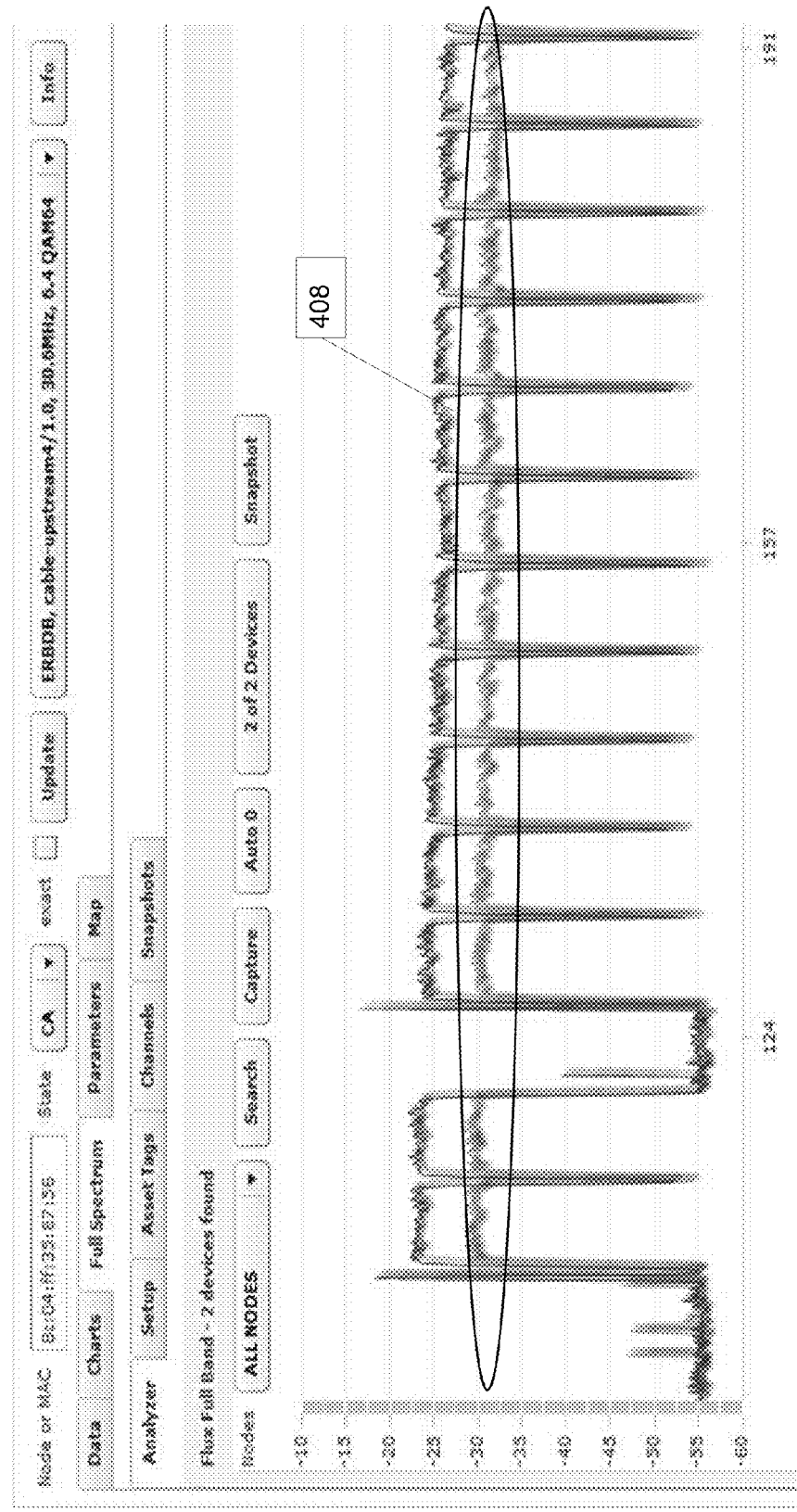

FIG. 4I illustrates example frequency spectrum data from multiple access devices in the presence of excessive attenuation 408 in the network branch. Such attenuation may be caused, for example, by additional network components, e.g., splitters, being inserted into a network on a client premise.

Figure 4J:
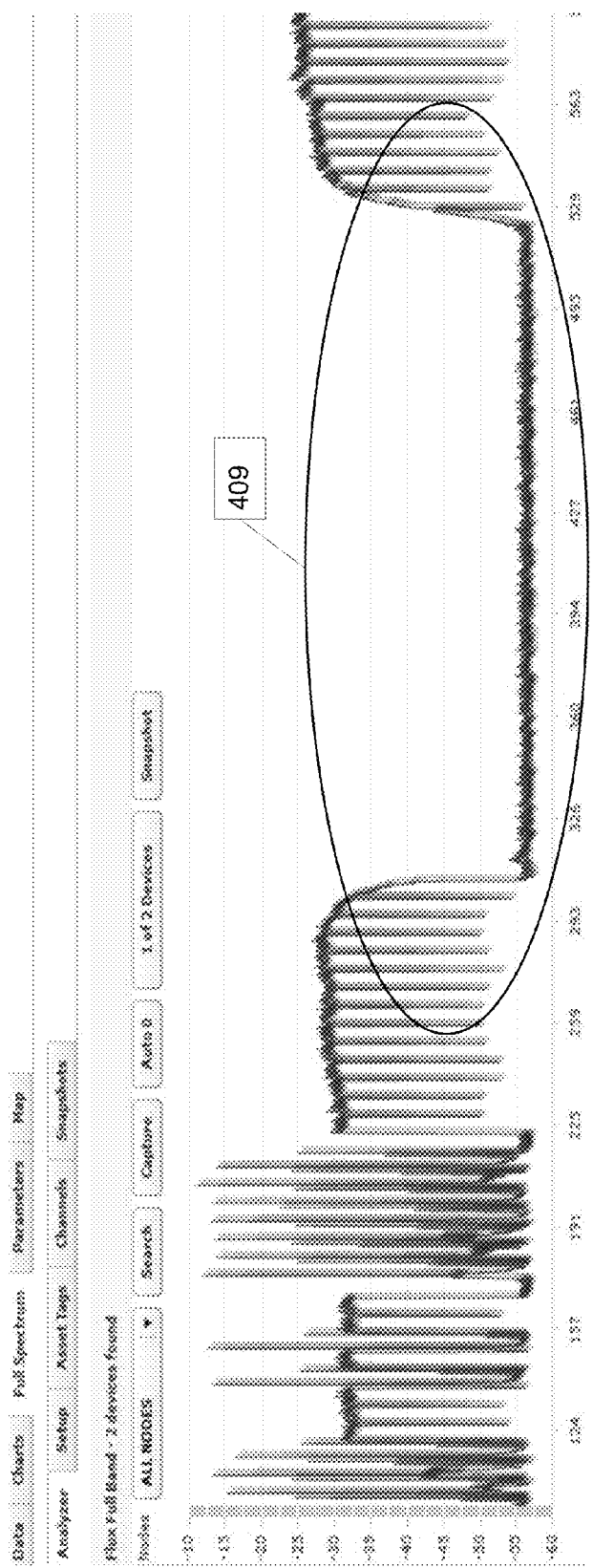
Figure 14:
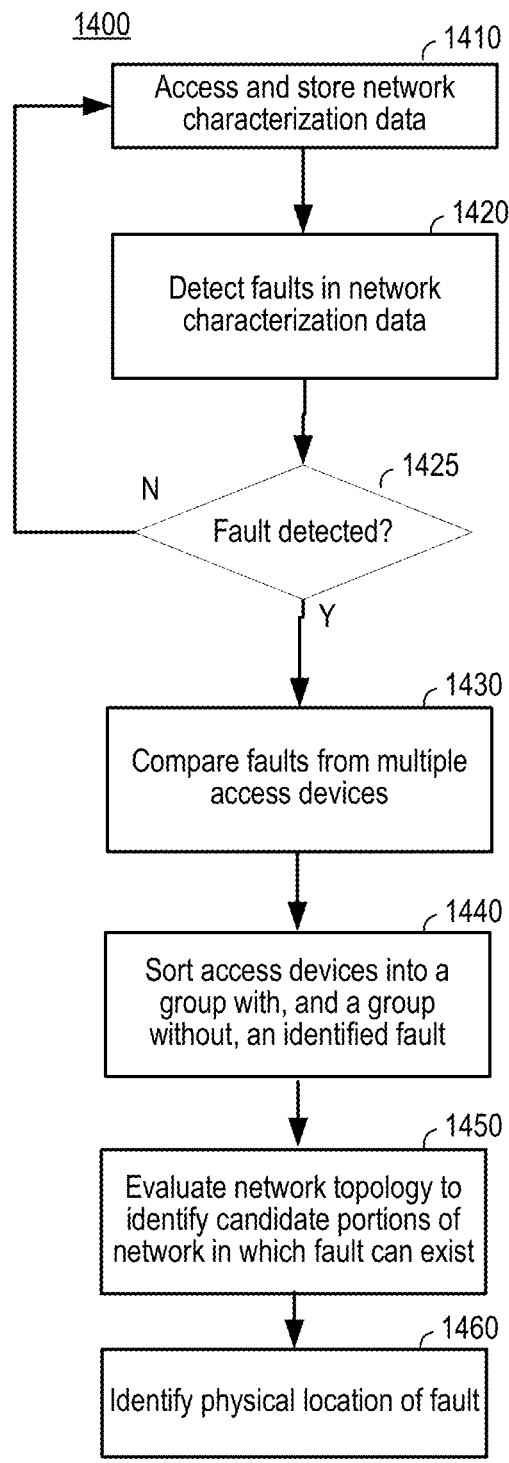

FIG. 4J illustrates example frequency spectrum data from an access device in the presence of a band-pass filtering 409. Band pass filters may be used in a network to inhibit certain signals from traversing particular network paths. One example where such filters may be used is selectively providing particular services to a customer, e.g., providing only data services without providing audio/visual services. A filter may for example be installed between a tap and a communication link (e.g., drop line) to a customer's premise to filter out the audio/visual services (e.g., television content) to the premise, while permitting data services (e.g., DOCSIS based network services) to pass through the communication link (e.g., drop line). Filters may be installed in some instances in incorrect locations, causing unintentional filtering of particular channels. FIG. 14 described herein provides a process for detecting, identifying and locating the anomalies shown by the frequency spectrum data in FIGS. 4G-4J FIG. 5 illustrates process 500 that may be performed in accordance with one or more embodiments to identify and/or locate a noise or a noise source in a network. The process begins at step 510 in which a computing device, such as analyzer 103, accesses (e.g., retrieving from a memory, receiving over the network, etc.) and optionally store (for immediate or future use) data that characterizes the communication paths between one or more of access devices AD1 through AD6 and the termination device (e.g., fiber node) at the beginning of the network branch. Such data may include the time-sampled data of signals received over the network at each access device, or may include frequency spectrum data calculated based on the time sampled data.

In some embodiments, step 510 may further include the computing device (e.g., analyzer 103) accessing and/or storing time-sampled and/or spectral analysis data retrieved from the data processing facility, optical node, or other intermediate device within a network branch. For example, a spectral analysis (e.g., an FFT) may be performed on time-sampled data of the downstream signal captured at the data processing facility before the signal traverses the network. Step 510 may include multiple iterations of the spectral analysis data being retrieved and stored, and each iteration may be stored with a timestamp and other metadata indicating the source of the data (e.g., data processing facility, AD1, PS, optical node, etc.).

FIGS. 6A-6B shows a portion of a database 150 and 160 generated in step 510 by analyzer 103 and stored in a memory (e.g., 1702 described below). For convenience, FIGS. 6A-6B show data in a simple table. The table of FIGS. 6A-6B is merely one example of how data can be arranged in accordance with various embodiments. The actual format of data and/or of the tables or other data structures used to organize that data will vary among different embodiments. Each row in table 150 corresponds to a specific one of the access devices AD1 through ADn. The cells of each row contain data related to the corresponding access device and to the communication path used by the corresponding access device to communicate with the fiber node or other termination device. Cells in a first column 151 contain index numbers for the rows of table 150. In the present example, row 00001 corresponds to device AD1, row 00002 corresponds to device AD2, etc. Fields in column 152 contain identifying data for an access device on a particular row. In some embodiments, this identifying data may include a media access control (MAC) address of the access device. Each of columns 153-1 through 153-P represents frequency data of the signal(s) received from the network by that respective access device. A cell in a particular row and column contains spectral analysis data for the access device corresponding to that row and the frequency corresponding to that column. For each frequency f1-fN, the spectral analysis data may have a real ("r") and imaginary ("i") component, with those components represented as "<r>" and "<i>". The embodiment displayed in Table 6A illustrates spectral analysis data as real and imaginary parts of the frequency response. Other embodiments may represent similar data in some other manner. For example, in some embodiments, the spectral analysis data may be stored as the phase and amplitude values determined (e.g., calculated from an FFT of the received signal) from the time sampled signal data. In other embodiments, only amplitude or phase is stored. At the end of step 510 (FIG. 5), each row of table 150 may contain an identifier and spectral analysis data for up to N frequencies for one or more of the access devices AD1 through ADn.

Analyzer 103 may repeat step 510 collecting and storing table 150 for multiple iterations. The iterations may be periodic, occurring at a predetermined rate, or may occur on a varying rate basis (e.g., as fast as data can be collected). Analyzer 103 may store every iteration of data, or may store only the most recently collected data (the most recent 2, 3, 4, etc. iterations). During each iteration, analyzer 103 may retrieve spectral analysis data for one or more access devices AD1 through ADn and generate a time sequence of the retrieved data in step 520.

In some embodiments in step 520, the computing device (e.g., analyzer 103) stores the time sequence of values in a database 160, such as the one illustrated in FIG. 6B. For convenience, FIG. 6B shows data in a simple table. The table of FIG. 6B is merely one example of how data can be arranged in accordance with various embodiments. The actual format of data and/or of the tables or other data structures used to organize that data will vary among different embodiments. In some variations, database 150 is a portion of database 160. In each row of database 160, an index 161 and access device identifier 162 is included similar to those of FIG. 6A. Columns 163-1 through 163-T may include a set of data items for each time iteration. In an embodiment, one data item is a value labeled <t> and may include a start, end, medium, or other time at which the iteration is captured and calculated within a margin of error (e.g., delta t). In alternative embodiments, each column may include only one value <t> associated with all of the values <p> in that column, instead of storing a separate <t> value for each <p> value. The number of iterations T may be any value and will depend on the available resources. In some variations, the columns 163-1 to 163-T may operate as a circular buffer (e.g., FIFO) storing the most recent T iterations. In an embodiment, the other data item may include a pointer <p> that points to a changeable data element depending on a particular use for the spectral analysis data.

In one embodiment, pointer <p> may point to a data table that stores spectral analysis data retrieved from a particular AD in an iteration at a time (e.g., a time <t>), where that data table includes columns 153-1 to 153-P from FIG. 6A. As discussed above, columns 153-1 to 153-P store spectral analysis data (e.g., amplitude and phase) with respect to frequencies f1-fN for a particular AD. In this example, the data table pointed to by pointer <p> may store the spectral analysis data for frequencies f1-fN retrieved at time <t> from an AD identified by the AD identifier (e.g., MAC address) for the row. In some embodiments, pointer <p> may be replaced by one or more actual data values. For example, the data table illustrated in FIG. 9B includes data values <s> and <f> instead of data item <p>. Data items <s> and <f> will be further explained below with reference to FIG. 9B and a particular example for identifying/locating ingress noise and/or wideband interference.

At step 530 the computing device (e.g., analyzer 103) may analyze the retrieved spectral analysis data (e.g., amplitude and phase) to identify an anomaly in the network (e.g., noise ingress, wideband interference, resonant cavity, etc.). In some embodiments, the iterations of retrieved spectral analysis data stored in the data table illustrated by FIG. 6B may be analyzed. The analysis may include, for example, identifying and/or distinguishing between one or more anomalies from amongst a plurality of different types of anomalies (e.g., the anomalies of FIGS. 4A-4L) exhibited in the frequency data. This may include performing portions of the processes shown in FIGS. 8A, 8B, and 11-14, to identify different anomalies.

In step 540, a method of analysis may be selected based on the type of anomaly that is detected, and in step 550, the computing device (e.g., analyzer 103) may determine the existence and/or location of the anomaly in the network using the analysis selected in step 540. In step 560, the anomaly may be correlated to specific services based on a predetermined service allocation database (e.g., a map of video and data services to specific channels), and based on the impact of the anomaly on particular channels (e.g., decreasing signal to noise ratio on a channel). In step 570, analyzer 103 may determine a course of action to be taken by a network operator (e.g., service technician) or by a customer. Such action may include for example, repairing or reconfiguring the network components to correct the anomaly. Another action may be to adapt the signal transmissions, such as pre-filtering signals before being transmitted or reassigning a signal to a different carrier frequency so at to avoid using the frequencies that are adversely effected by the anomaly. (e.g., move a carrier away from an LTE transmission frequency).

A number of particular variations of the process of FIG. 5 will be further described below with respect to FIGS. 8A-8B, and 11-14. The processes may be used together, with portions of each process first identifying respective types of anomalies as in steps 510-530, and based on the identified anomalies, deciding which of the processes to continue in step 540 to determine the location of the anomaly as in step 550.

As one example variation, FIG. 7 illustrates a network diagram similar to FIGS. 3A and 3B that includes an ingress noise or wideband interference source and FIGS. 8A-8B illustrate a method for identifying and/or locating the noise/interference source in the network.

FIG. 7 depicts the network branch of FIGS. 3A-3B including an example of noise ingress such as that depicted in the frequency spectrum data as shown in FIG. 4A or 4B. In FIG. 7, segment S3 may be damaged or otherwise configured to permit the ingress of an external signal into the network. This could be, for example, a damaged coaxial line connecting splitter T1 to splitter T2. The ingress of noise sources may occur at different times, and the noise sources may have different levels of power and may have different frequency components at the point of ingress. While the sources are described in the following examples as noise ingress as illustrated in FIG. 4A, the sources may alternatively be from a wideband interference source as previously described with respect to FIG. 4B.

FIG. 7 depicts two illustrative sources of noise ingress in segment S3. A first noise source (the black triangle), may for example have a first frequency F1 (e.g., 600-750 MHz) and induce a 20 dBmV level signal onto segment S3 at the point of ingress. A second noise source (the white triangle), may for example have a second frequency F2 (e.g., 5-42 MHz) and induce a 20 dBmV level signal onto segment S3 at the same point of ingress. For ease of explanation, various embodiments are described herein with respect to one point of ingress as illustrated in FIG. 7. In various other embodiments, multiple noise sources through multiple points of ingress may be detected.

A noise source may traverse the network from a point of ingress and reach the receiver of an access device or a receiver of another device connected to the network (e.g., a fiber node, test equipment, etc.). The received noise may cause interference with the intended downstream and upstream communications between the access devices and the fiber node/termination system.

In various embodiments, analyzer 103 may acquire spectral analysis data (e.g., a frequency spectrum) from the access devices at different moments of time. By analyzing the spectral analysis data, various embodiments may identify and/or locate noise ingress along one or more paths in the network. Various examples include the analyzer 103 obtaining multiple samples of spectral analysis data from one or more access devices and detecting changes in the spectral analysis data over time in order to determine the presence and/or location of noise ingress.

As a noise source propagates through the network, the noise will be attenuated, amplified, and/or distorted through line loss and through network components such as splitters, taps, amplifiers, etc. As such, different access devices having different physical paths to the noise source will receive varying degrees of interference with the modulated signal. Various aspects compare differences between spectral data received from the access devices to identify a type of noise source and/or to determine a location of noise ingress.

FIG. 7 depicts the network with illustrative attenuations of the two noise sources F1 (e.g., 600-750 MHz) and F2 (e.g., 5-42 MHz) at various points along the communication path. The attenuation by each component may depend on the component function, structure, electrical properties, signal frequency, signal propagation direction, other signal properties, and combinations thereof. For example, a cable (e.g., RG6 coaxial cable) may attenuate a 5-42 MHz signal by approximately 1 dB for every 100 feet of cable length and attenuate a 600-750 MHz signal by approximately 5 dB for every 100 feet of cable length. A tap may have an approximate insertion loss of 1 dB and a tap isolation of 20 dB for signals in the range of 5-750 MHz. A splitter may have an approximate 4 dB insertion loss and 20 dB tap isolation for signals in the range of 5-750 MHz. An amplifier may be configured to amplify signals in both directions, but the direction of amplification may be frequency selective. For example, in a coaxial system compliant with Data Over Cable Service Interface Specification (DOCSIS) standards, amplifiers A1 and A2 may be designed to block upstream signals in the frequency range of 600-750 MHz, but amplify signals by a gain factor G (e.g., 10 dB) in the 5-42 MHz range. These attenuation and gain values are illustrative only, and other values may be applied based on the characteristics of the specific network of the various embodiments.

Based on the example attenuation values above, the levels of F1 having a frequency in the 600-750 MHz range and F2 having a frequency range of 5-42 MHz are depicted propagated on different segments of FIG. 7. F1 for example propagates to amplifier A1 attenuated by 14 dBmV (e.g., −5 dBmV from S3A, −4 dBmV from T2, −2 dB from S5, −1 dB from T3, −2 dB from S6). Beyond S6, however, F1 may be blocked by amplifier A1 from propagating to segment S7, because F1's frequency is outside the upstream operating frequency of A1. F2 in contrast may propagate to S7 with a 13 dBmV attenuation plus an amplification of 10 dBmV, the gain of A1 in the upstream direction (e.g., −1 dBmV from S3A, −4 dB from T2, −0.5 dB from S5, −1 dB from T3, −0.5 dB from S6, and +10 dBmV from A1, −0.5 dB from S7).

FIG. 8A illustrates process 800 that may be performed in accordance with one or more embodiments to identify and/or locate an ingress noise in a network. Process 800 describes one variation (e.g., identifying/locating ingress noise or wideband interference) of process 500 from FIG. 5. The process begins at step 810 in which a computing device, such as analyzer 103, obtains and stores data that characterizes the communication paths between one or more of access devices AD1 through AD6 and the fiber node (or other termination device) at the beginning of the network branch. Step 810 includes the retrieval steps described above for step 510 of FIG. 5. For example, at the end of step 810 (FIG. 8A), each row of a table 150 (e.g., table 150 from FIG. 6A) may contain an identifier and spectral analysis data for up to P frequencies for one of access devices AD1 through ADn.

Figure 5:
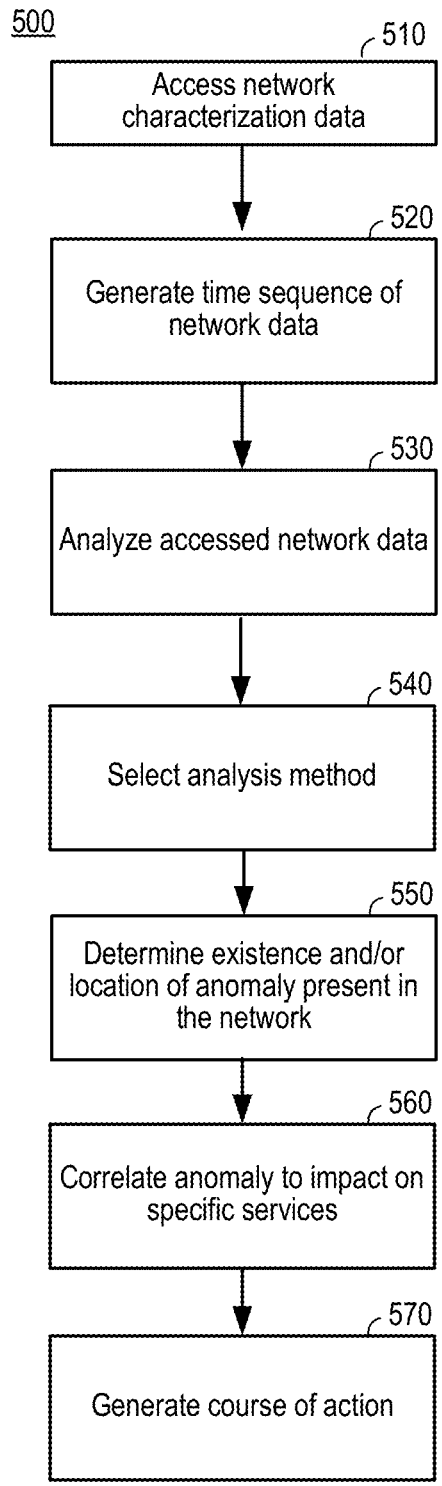
FIG. 5 illustrates operations in a flow chart that may be performed in accordance with one or more embodiments.

As in step 510 of FIG. 5, analyzer 103 may repeat step 810 to collect and store table 150 for multiple iterations. The iterations may be periodic, occurring at a predetermined rate, or may occur on a varying rate basis (e.g., as fast as data can be collected). Analyzer 103 may store every iteration of data, or may store only the most recently collected (e.g., the most recent 2, 3, 4, etc. iterations).

Table 150 may store in each row a time (not illustrated) at which the iteration was captured, which may be an absolute time, or may be a time relative to a prior iteration. In an example, for two different iterations of collected spectral analysis data at different moments in time, analyzer 103 in step 820 may generate comparison data for each frequency (e.g., f1 at time 1 is compared to f1 at time 2) of the received signal at each access devices AD1 through ADn. For example, as illustrated in FIG. 9A, columns 174-1 through 174-P include the comparison value, <d>, for each frequency f1 through fN respectively, for each access device 172. The comparison data may be calculated from consecutive iterations, may be calculated from two non-consecutive iterations, or may be calculated from more than two consecutive or non-consecutive iterations. In some embodiments, the comparison data may be derived using complex division values calculated between two iterations of spectral analysis data (e.g., amplitude and phase). Additional data (not shown) may be included for each row, such as the difference in time(s) between the iterations on which columns 174-1 through 174-P are based. In step 820, a single value for each access device may be calculated from the comparison values (e.g., delta values) of the respective set of frequencies (e.g., frequencies f1-fN) for each access device. The single value may be representative of noise received at the access device. Column 175 illustrates the single values, <s>, for each access device, which may represent a noise reception level at that access device. The single value of an access device could be, for example, the absolute value of the RMS sum of the difference values <d> for that access device.

In certain variations, step 820 may include characterizing frequency components of the noise source based on the frequency values 153-1 to 153-P or comparison values 174-1 to 174-P. The frequency data may be stored for each access device as <f> in column 176 of FIG. 9A. In some embodiments, one or more frequency peaks may be detected based on an analysis of the frequency values 153-1 to 153-P or the comparison values 174-1 to 174-P. A center value for each frequency peak may be determined and these values may be stored in column 176.

Analyzer 103 may repeat step 820 periodically as new data is collected based on the iteratively collected data in step 810. Analyzer 103 may store every iteration of data in 174-1 through 174-P, 175, and/or 176, or may store only the most recently collected (e.g., the most recent 2, 3, 4, etc. iterations).

During each iteration, analyzer 103 may retrieve data for one or more access devices AD1 through ADn, generate comparison (e.g., <d>) and summed (e.g. <s>) values for those access devices, and generate a time sequence of values in step 830. In some embodiments in step 830, the computing device (e.g., analyzer 103) may optionally store the time sequence of values in a database 180, such as the one illustrated in FIG. 9B. For convenience, FIG. 9B shows data in a simple table. The table of FIG. 9B is merely one example of how data can be arranged in accordance with various embodiments. The actual format of data and/or of the tables or other data structures used to organize that data will vary among different embodiments. In some variations, database 180 is a portion of database 150. In this embodiment, FIG. 9B may be based on the data table depicted in FIG. 6B, except the <p> column of FIG. 6B may be replaced with the <s> column and the <f> column in FIG. 9B. In each row of database 180, an index 181 and access device identifier 182 is included similar to those of FIG. 9A. Columns 183-1 through 183-T include a set of values for each time iteration. One value, labeled <t> includes a start, end, medium, or other time at which the iteration is captured and calculated within a margin of error (e.g., delta t). The other value in each column may include the single value <s>, e.g., noise reception level, and frequency data <f> as calculated in columns 175 and 176 of FIG. 9A. In alternative embodiments, each column may include only one value <t> for all of the rows in that column, instead of storing a separate <t> value for each row. The number of iterations T may be any value and will depend on the available resources. In some variations, the columns 183-1 to 183-T may operate as a circular buffer (e.g., FIFO) storing the most recent T iterations.

In step 840 in FIG. 8A, one or more noise reception levels <s> of column 175 in FIG. 9A and/or in columns 183-1 to 183-T of FIG. 9B may be compared to a predetermined threshold value. A comparison of a noise reception level <s> above the threshold may indicate the momentary ingress of noise at some point in the network branch as shown in FIG. 7. The predetermined threshold value may be the same or different for each access device, and may be autonomously adapted based on a previous comparison or previous values of <s> for one or more access devices. For example, noise reception levels for one or more access devices on a network branch may be averaged over a period of time to determine and average value at an access device, and the threshold value for detecting a momentary noise source may be adjusted based on the average value. In certain variations, for a particular access device, one or more comparisons of <s> to the threshold value over several iterations may be used to detect the ingress of a momentary noise source (e.g., 3 out of 5 positive comparisons).

In response to at least one noise reception level <s> being determined to be above the threshold, noise ingress or wideband interference is determined to exist in step 845, and the process continues to step 850.

In response to the noise reception levels <s> being determined to not be above the threshold, noise ingress or wideband interference is determined not to exist in step 845, and the process loops back to step 810. Steps 810-840 may be a specific example of steps 510-530 in FIG. 5 and step 845 may be a specific example of step 540, in which the analysis method selected includes the remainder of the steps of FIGS. 8A and 8B, which are performed as a specific example of step 550.

In step 850, one or more noise reception levels <s> from respective multiple access devices for the same time interval <t> are designated for use in detecting the noise ingress location. In some variations, only access devices with noise reception levels <s> above the threshold are designated for detection of a noise ingress location. In other variations, access devices with noise reception levels <s> below the threshold, but near an access device with a noise reception level <s> above the threshold are also included for the analysis. In further variations, all access devices on a network branch having at least one access device with a noise reception level <s> above the threshold are designated for analysis.

For one or more of the access devices designated in step 850, noise attenuation as a function of the location of noise ingress in the network branch may be determined in step 860. For example in FIG. 7, for each physical location along the network branch at which the ingress of noise may occur into the network branch, an attenuation factor AF may be calculated for a given access device. The attenuation factor AF may be a multiplier or non-linear formula that indicates the attenuation of the noise signal when it reaches the access device. As illustrated in FIG. 7, for example, a noise source F1 entering between S3A and S3B may be attenuated by 10 dBmV when received by AD2. For a given access device (e.g., ADn), an attenuation factor AFn may be expressed as a function of physical location of the noise ingress on the network branch and/or a function of frequency of the noise source (e.g., AFn[location, frequency]). The measure of noise (e.g., noise reception level <s>), at a particular access device (e.g., n), for a particular noise source (e.g., F1), may be determined by the noise level (e.g., N) at the point of ingress multiplied (or added in decibels) by the attenuation factor AFn (e.g., <s>=N dBmV+AFn dB). In various embodiments, the noise level at the point of ingress, N, and noise reception levels <s> may represent power, voltage, or current, and may be a maximum, peak, RMS, or other average value. Further, while AFn is expressed as a multiplication factor above, <s> may be determined as a non-linear function of N, position, and frequency.

In step 860, the attenuation factor AFn for the access devices may be stored in a database 190 as illustrated in FIG. 9C. For convenience, FIG. 9C shows data in a simple table. The table of FIG. 9C is merely one example of how data can be arranged in accordance with various embodiments. The actual format of data and/or the tables or other data structures used to organize that data will vary among different embodiments. For each access device, a row entry is included that contains an index 191 uniquely identifying the entry, an access device identifier 192, and an attenuation factor AFn. One example of determining an attenuation factor for each access device in step 860 is shown in FIG. 8B.

Figure 9D:
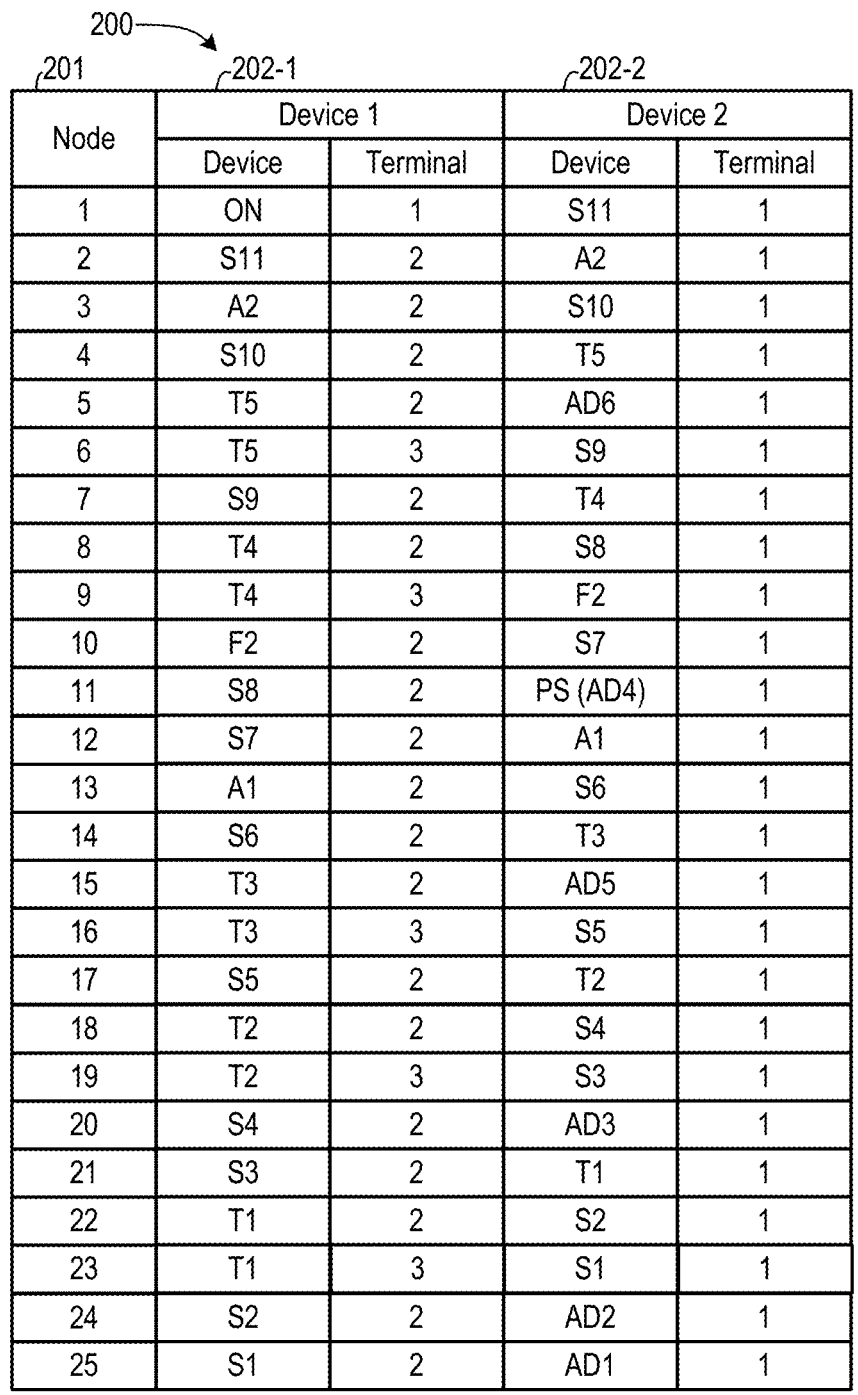

In step 861 of FIG. 8B, interconnection of all of the components in the network branch are identified, mapped, and/or stored in a database generated by analyzer 103 or other computing device (e.g., FIG. 2). One example of such interconnect data is illustrated in the database 200 illustrated in FIG. 9D. For convenience, FIG. 9D shows data in a simple table. The table of FIG. 9D is merely one example of how data can be arranged in accordance with various embodiments. The actual format of data and/or of the tables or other data structures used to organize that data will vary among different embodiments. In database 200, one or more points of interconnection (i.e., nodes) between two components that affect noise transmission and/or attenuation of noise to an access device is listed as a node in column 201. For each node, the associated row in the database 200 includes connection information for one or more devices connected to the node. The devices are listed in columns across the rows. In column 202-1, the first device for each node is listed along with a terminal of that device that is connected. For example, in the Node 1 row, the first device ON represents the optical node illustrated in FIG. 7, with the terminal 1 (i.e., terminal connected to S11) of the optical node ON listed as connected to Node 1. Column 202-2 lists a second device (if one exists) connected to the node. In the Node 1 row, for example, column 202-2 lists the first terminal of branch segment S11 connected to Node 1. Although not shown, additional columns may be included to illustrate additional devices connected to each node. Although illustrated as a table, the interconnection data may be represented in other forms, such as a schematic or wiring diagram.

From database 200, noise signal paths from one or more locations (e.g., every location) in the network to an access device may be identified and/or mapped in step 862. For example, from the location marked by an X between S3A and S3B in FIG. 7, a signal path can be mapped to AD5 as traversing 100 feet of S3 (e.g., S3B), through T2, through the entire length of S5, through T3, and to AD5.

In step 863, signaling characteristics for one or more components in the network branch are retrieved from a database 210 that is shown in FIG. 9E. For convenience, FIG. 9E shows data in a simple table. The table of FIG. 9E is merely one example of how data can be arranged in accordance with various embodiments. The actual format of data and/or of the tables or other data structures used to organize that data will vary among different embodiments. In database 210, each row includes electrical characterization data for a different component. In the present example, the first row includes data for access device AD1. In column 211, an index number is included in the cell that uniquely identifies each row, and in column 212, a component identifier associated with the respective component is included in each cell of the row. The cells in columns 213-1 to 213-4 include parameters for each component. While four columns are shown storing parameters, each row associated with each component may have more or less than four parameters. For example, in row 6 access device AD6 is shown as having two parameters, each made up of a parameter name (e.g., sig loss) and an associated value (e.g., 0.5 dB). The first parameter, Type, indicates that AD6 is an access device (e.g., AD). The second parameter represents the signal loss attributable due to the path between the access device input and the next identified component in the network branch (e.g., T3).

In another example in database 210, row 7 illustrates signal characteristics of network branch segment S1 illustrated in FIG. 7. In this example, segment S1 includes four different parameters. The first parameter, Type, indicates that S1 is an RG-6 coaxial cable. The second and third parameters indicate signal attenuation through S1 as a function of length and frequency. In row 7 column 213-2, attenuation of signals in S1 is given as 1 dBmV per 100 feet of cable for signals in the 5 to 42 MHz range. In row 7 column 213-3, attenuation of signals in S1 is given as 5 dB per 100 feet of cable for signals in the 0.6 to 0.75 GHz range. The given frequency ranges and attenuations are only one example, and other embodiments may have other ranges, more or less ranges, and other attenuations. In row 7 column 213-4, the entire length of S1 is given as 10 ft. Rows 8-17 illustrate similar parameters for other segments in the network branch.

In rows 18 and 19 of database 210, FIG. 9E illustrates parameters for amplifiers A1 and A2. In these examples, amplification is given for each amplifier for two different frequency ranges in two different directions. Row 18 column 213-2, for example indicates that amplifier A1 amplifies signals in the 5 to 42 MHz range by 10 dBmV in the upstream direction, but attenuates signals in the same frequency band by 60 dBmV in the downstream direction. Row 18 column 213-3 indicates that amplifier A1 amplifies signals in the 0.6 to 0.75 GHz range by 10 dBmV in the downstream direction, but attenuates signals in the same frequency band by 60 dBmV in the upstream direction. In rows 20-24, insertion loss (column 213-2) and tap isolation (column 213-3) are illustrated for taps/splitters T1-T5. The cell entries of table 210 are only a few examples, and other components and other parameters may be specified. For example, further effects on signal frequency, such as phase shift, phase-frequency distortion, frequency tilt, etc., caused by each component may also be indicated as parameters.

Returning to FIG. 8B, in step 864 the signaling characteristics retrieved in step 863 are associated to the identified signal paths in step 862 to determine the noise attenuation as a function of noise ingress location and frequency. In various examples, step 864 results in the attenuation factors of FIG. 9C. In various examples, the attenuation factor AFn, may be represented as a piecewise function or pseudo-code, with different portions of the function/code given for various ranges of locations along the network branch and for various ranges of signal frequency. For example, for locations of noise ingress along S3, the function of AF5 may be:

If (noise ingress location=S3) AND (frequency=5-42 MHz), than $$AF5 = -C1 - C2 - C3 - C4 - C5; \text{ where,}$$

C1=(length along S3 starting from T2)×1 dBmV/100 ft; (e.g., S3 attenuation loss)
C2=4 dBmV; (e.g., insertion loss of T2)
C3=100 ft×0.5 dBmV/100 ft; (e.g., S5 attenuation loss)
C4=1 dBmV; (e.g., insertion loss of T3)
C5=0.5 dB; (e.g., signal loss at AD5).

The terms C1 through C5 included in AF5 may be determined from connection information in FIG. 9D and the values of each term may be determined from the electrical characteristics in FIG. 9E.

As described above, attenuation (e.g., attenuation factor AFn) may be a function of noise ingress location and frequency. In various embodiments, the frequency data <f> in the tables of FIGS. 9A and 9B may be used. For noise ingress location, various embodiments may use location data in different forms. In some examples, location could be expressed as the component where the ingress of noise occurs (e.g., S3, 100 ft from T2). In another example, position could be expressed as total physical distance from the fiber node where the ingress of noise occurs (e.g., 1200 ft). If the network branch includes more than one sub-branch, the sub-branch may also be identified (e.g., 1200 ft, branch S3).

Figure 10:
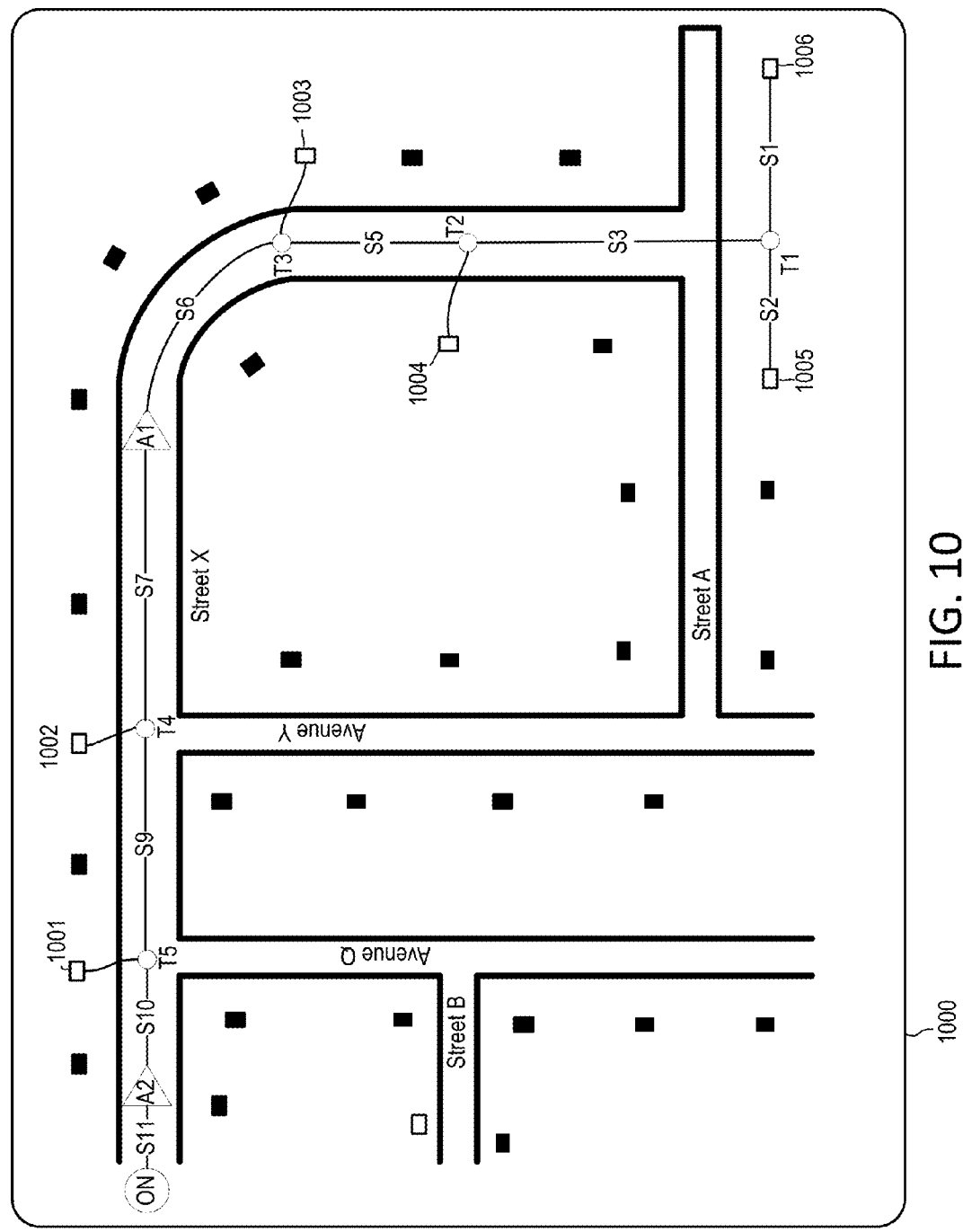
FIG. 10 illustrates a geospatial map in accordance with one or more embodiments.

In another example, location may be expressed as a geospatial location (e.g., latitude, longitude), which could then be mapped to a specific location within the network branch. In certain embodiments, database 210 in FIG. 9E may include additional parameters that describe the geospatial location (e.g., latitude and longitude) of the various components, or portions thereof. In another example, geospatial location information may be mapped to the network branch with a visual map. For example, FIG. 10 illustrates a geospatial map 1000 of a neighborhood with the geospatial locations of the network branch in FIG. 7 shown. In FIG. 10, several components of the network branch are shown in the physical location in which they exist within the neighborhood. Buildings and structures, e.g., 1001-1006, are shown which may contain some network branch elements such as access devices. For example, building 1006 may include access device AD1. Structure 1002 may include S8 and a power supply cabinet comprising AD4. Map 1000 may include textual information, icons, and/or other indicators (not shown), which indicate network branch components in particular structures. For example, a portion of the table in FIG. 9E may be included in map 1000, which describes the interconnection of access device AD1 within structure 1006. In various embodiments, map 1000 may take the form of an interactive interface displayed on a monitor or other display device. When a component illustrated on the map is selected or hovered over with a pointing (e.g., mouse, stylus, finger), for example, information (e.g., information from the tables in FIGS. 9A-9E, longitude, latitude, etc.) may be displayed in the form of a pop-up window or other textual display or provided in the form of auditory feedback.

At the completion of step 864 in FIG. 8B, the process may return to step 870 in FIG. 8A. In step 870, the ingress location of a noise source is determined based on noise attenuation factors and the noise reception levels <s> and/or frequency data <f> for multiple access devices over one or more time iterations. For example, for a given time iteration, for a designated access device, the relationship between the noise reception level <s> and noise ingress level N may be calculated as follows (in decibels).

$$<s> = (N + AFn[\text{location}, <f>]) => N = (<s> - AFn[\text{location}, <f>])$$

If multiple designated access devices (e.g., AD1 and AD2) detect the same noise source N, than the relationships above can be used to calculate the location of noise ingress. For example, using AD1 and AD5, the following relationships may be established.

$$(<s1> - AF1[\text{location}, <f1>]) = N = (<s5> - AF5[\text{location}, <f5>])$$

Given that the noise reception levels at AD1 (e.g., <s1>) and AD5 (e.g., <s5>), the frequency data at AD1 (e.g., <f1>) and AD5 (e.g., <f5>) and the attenuation factor functions at AD1 (e.g., AF1) and AD5 (e.g., AF5) have been determined and may be retrieved from the tables in FIGS. 9B-9C, and all terms of attenuation factors are known from the tables in FIGS. 9D-9E, location of the noise ingress may be solved from the above relationship. When using two designated access devices, a single solution for location may be calculated. For example, formulas for AF1 and AF5 for a noise source in the location of segment S3 and in the frequency range of 5-42 MHz may be as follows:

$$AF1 = -(200 \text{ ft-loc}^*/1 \text{ dB}/100 \text{ ft}) - 4 \text{ dBmV} - 0.1 \text{ dBmV};$$
$$= +(\text{loc}/100 \text{ ft})^* 1 \text{ dB} - 6.1 \text{ dB};$$

$$AF5 = -(\text{loc}^* 1 \text{ dB}/100 \text{ ft}) - 4 \text{ dBmV} - 0.5 \text{ dBmV} - 1 \text{ dBmV} - .5 \text{ dBmV};$$
$$= -(\text{loc}/100 \text{ ft})^* 1 \text{ dB} - 6 \text{ dB};$$

where (loc=location=distance along S3 from T2).

Given a noise reception level at AD1 of <s1>=14.9 dB, and a noise reception level at AD5 of <s5>=13 dB, then location can be calculated as follows:

$$14.9 \text{dB} - (\text{loc}/100\text{ft})^*1\text{dB} + 6.1\text{dB} = 13\text{dB} + (\text{loc}/100\text{ft})^*1\text{dB} + 6.0\text{dB};$$

loc=location=100 ft from T7 on S2.

In various embodiments, the formula above or other relationships may be used for more than two designated access devices. In such a case, various known algorithms may be used to calculate the best-fit solution for a location that satisfies the relationships.

In the various examples above, the frequency data (e.g., <f1> and <f5>) may be the same, since it is generated from the same noise source. In other embodiments, as previously noted with respect to FIG. 9E, various components may induce distortions in the frequency. In such cases, the frequency data at different access devices may be different. Nonetheless, using frequency parameters from the table in FIG. 9E, the distortions may be accounted for in the formulation of the attenuation factors.

In certain variations, the determined location of noise ingress may be transmitted to a remote device and/or displayed on an interactive map (e.g., FIG. 10) on a display device that provides a geospatial location (e.g., latitude, longitude) of the point of ingress. For example, one or more servers (e.g., analyzer 103) may perform the steps of FIGS. 8A and 8B, and transmit the location to a technician in the field for troubleshooting and correcting the problem of noise ingress.

In some embodiments, one or more steps of FIG. 8A may be omitted or replaced. For example, steps 820 and 830 generate and store a time sequence of access device values (e.g., populate data structures such as those depicted in FIGS. 9A-9B). Step 840 then tests noise reception values against a predetermined threshold based on the values generated and stored (e.g., values from data structures depicted in FIGS. 9A and 9B). In some embodiments, steps 820-840 may be replaced by a comparison step that compares the network characterization data for an access device with predetermined expected spectral analysis data for that access device. Spectral analysis data for a particular access device may be predetermined based on network characterization data measured at a data processing facility and expected attenuation based on the network structure. For example, referring to FIG. 2B, an expected spectral analysis data for AD5 may be predetermined based on the signal measured at the data processing facility (e.g., downstream signal) and the expected attenuation of the signal based on the network elements between AD5 and the data processing facility (e.g., optical strands, optical node, S11, A2, S10, T5, S9, T4, S7, A1, S6, and T3). More generally, the data processing facility may be configured in such a way that AD5 has predetermined expected spectral analysis data. Accordingly, the spectral analysis data measured at AD5 may be compared in step 845 to the expected predetermined spectral analysis data for AD5. If the difference between the measured spectral analysis data at AD5 and the expected predetermined spectral analysis data for AD5 is greater than a threshold, the process of FIG. 8 may move to step 850. From step 850, the process may continue as previously described.

In some embodiments, noise ingress may be experienced over an unassigned frequency range. For example, a signal sent from a data processing facility may carry information on one or more 6 MHz frequency channels (e.g., assigned frequency range). The information may be carried on a phase and/or amplitude modulated signal in the assigned frequency range. An example of an assigned frequency range can be seen in the plot illustrated in FIG. 4A. An amplitude-modulated signal can be seen in the frequency range from 664 Mhz to 697 Mhz. In some embodiments, noise ingress may be measured in a signal in a frequency range that is unassigned (e.g., that is not phase and/or amplitude modulated). For example, in FIG. 4A, the amplitude measured above 731 MHz (circled) represents ingress noise 401 over an unassigned frequency range. Depending on the one or more AD's that experience this ingress noise, a location for the noise may be located. For example, the process of FIGS. 8A and 8B may be used to locate the noise.

In some embodiments, noise ingress may be experienced over an assigned frequency range, but detection of the noise may be limited. For example, in the plot illustrated in FIG. 4A, an amplitude modulated signal can be seen in the frequency range from 664 Mhz to 697 Mhz. In some embodiments, noise may be experienced in this assigned frequency range, but the noise may be undetectable (e.g., below a threshold) across each 6 Mhz frequency channel. A guard interval may be placed between each 6 Mhz channel. For example, in FIG. 4A, an interval is illustrated between each 6 Mhz channel where little to no amplitude is measured (e.g., amplitude below a threshold). In some embodiments, the guard intervals between 6 Mhz channels are used to detect noise that is otherwise undetectable across the 6 Mhz channels. For example, if amplitude is measured across a guard interval (e.g., amplitude above a threshold) at an AD, it may be determined that the signal received at the AD has experienced noise ingress since little to no amplitude (e.g., amplitude below a threshold) is expected over the guard interval. Depending on the one or more AD's that experience this ingress noise, a location for the noise may be located. For example, the process of FIGS. 8A and 8B may be used to locate the noise.

In some embodiments, the noise ingress as described above, may instead include wide band interference and/or power arching. For example, the plot illustrated in FIG. 4B depicts wideband interference over a frequency range. Wideband interference may be differentiated from noise ingress based on an energy level for the noise being above a predetermined threshold. Depending on the one or more AD's that experience wideband interference, a location for the noise may be located. For example, the process of FIGS. 8A and 8B may be used to locate the noise due to wideband interference in the same manner as locating an external noise source.

As noted above, attenuation of noise ingress and wideband interference may be frequency dependent (e.g., different for different frequency bands). In various examples, wideband interference and noise ingress may have bandwidths that span frequencies (e.g., F1 and F2) that have different attenuations throughout the network. In such cases, the analysis above to locate a noise source may be performed separately for one or more different frequency bands in the noise/interference bandwidth. In the table in FIG. 9E, for example the network is shown to exhibit different attenuations in two different frequencies bands (e.g., 5-42 MHz and 0.6-0.75 GHz). For noise ingress or wideband interference spanning both of these frequency bands, the process of FIGS. 8A and 8B may be performed on the spectrum data from the access devices over each of these frequency bands separately, with detection and location of the noise determined based on just one of the analyzed frequency bands, or based on the results of more than one band. For example, a location of a noise source may be determined separately for each frequency band, resulting in multiple identified locations of noise ingress. The determined locations may then be compared to determine if the detected noise is a common noise source, or different noise sources. In one example, if the distances (e.g., geographically or linearly along the network path) between the locations is less than a predetermined threshold, the noises may be determined to be from a single source. If the distances between the noise locations is above the predetermined threshold, the noises may be determined to be from different sources. If determined to be from a single source, the locations may be combined (e.g., averaged) to determine a more precise location of the noise source.

FIG. 11 illustrates a process 1100 for identifying and locating a malfunctioning amplifier in a network. The malfunctioning amplifier (e.g., A1 or A2 of FIG. 2B) may induce a frequency peak or attenuation (e.g., a suck out) as previously described with respect to FIGS. 4C and 4D, respectively. Process 1100 describes one variation (e.g., identifying/locating a malfunctioning amplifier) of process 500 from FIG. 5. The process begins at step 1110 in which a computing device, such as analyzer 103, accesses and, optionally, stores data that characterizes the communication paths between one or more of access devices AD1 through AD6 and the fiber node (or other termination device) at the beginning of the network branch. Step 1110 may include the retrieval and storage steps described above for steps 510 and 520 of FIG. 5. For example, at the end of step 1110, each row of a table 150 (e.g., table 150 from FIG. 6A) may contain an identifier and spectral analysis data for up to P frequencies for one of access devices AD1 through ADn.

As in step 510 and 520 of FIG. 5, analyzer 103 may repeat step 1110 to collect and store table 150 for multiple iterations. The iterations may be periodic, occurring at a predetermined rate, or may occur on a varying rate basis (e.g., as fast as data can be collected). Analyzer 103 may store every iteration of data, or may store only the most recently collected (e.g., the most recent 2, 3, 4, etc. iterations). In certain variations, step 1110 may average or accumulate the collected data over time, which may include, for each frequency, accumulating and/or averaging the data over every iteration from a selected starting point in time, or may include a windowed average of a predetermined number of the most recent iterations of data. In some examples, only the accumulated or average values are stored in a memory.

In step 1120, analyzer 103 may retrieve the data stored in 1110 for one or more access devices AD1 through ADn, and analyze the data for indications of an amplifier malfunction. For example, the collected data from step 1110 may, when illustrated as a graph, appear as in FIG. 4C having a frequency peak or as in FIG. 4D having an attenuation at a particular frequency.

Step 1120 may detect a frequency peak in the data for an access device by, for example, detecting a frequency band that exceeds a predetermined amplitude for a predetermined bandwidth as illustrated in FIG. 4C. The predetermined amplitude may be for example, an absolute amplitude (e.g., −20 dBmV), or may be a relative amplitude (e.g., +10 dBmV over the average amplitude) of a predetermined transmission band (e.g., 505 MHz to 517 MHz). The bandwidth could be, in various examples, a minimum width to distinguish the peak from transit noise. For example, the upper and lower limits of the frequency band having the peak could be specified as where the amplitude falls within −3 dBmV from the center frequency amplitude (or other predefined level). Detecting a frequency peak may further be based on instantaneous frequency measurements or average frequency measurements in which a number of frequency measurements are averaged over time. In some examples, a frequency peak may be detected by curve fitting the frequency data (e.g., to a multi-order polynomial) over a limited bandwidth (e.g., 20 MHz). For example, a window of a predefined frequency bandwidth may be swept over the frequency data (e.g., results calculated for the window positioned at different locations across the full bandwidth) of a particular access device, and at each location of the window, a curve fit of the windowed data could be performed. The fitted curve could then be compared, within a predetermined margin of error, to predetermined curves (e.g., a signature) characteristic of frequency peaks of known amplifier errors. For example, the difference between the calculated curve and the predetermined curve could be integrated over the bandwidth of the window and compared to a threshold value.

Step 1120 may further detect frequency attenuation (e.g., a suck-out) in the data for an access device by, for example, detecting a frequency band that is attenuated to a predetermined amplitude for a predetermined bandwidth as illustrated in FIG. 4D. The predetermined amplitude attenuation may be, for example, an absolute amplitude (e.g., −42 dBmV) within a bandwidth with an expected higher amplitude (e.g., −29 dBmV), or may be a relative amplitude (e.g., −10 dBmV over the average amplitude) of a predetermined transmission band (e.g., 386 MHz to 389 MHz). The bandwidth could be, in various examples, a minimum width to distinguish the peak from transit noise. For example, the upper and lower limits of the frequency band having the peak could be specified as where the amplitude falls within −3 dBmV from the center frequency amplitude (or other predefined level). Detecting frequency attenuation may further be based on instantaneous frequency measurements or average frequency measurements in which a number of frequency measurements are averaged over time. In some examples, a frequency attenuation may be detected by curve fitting the frequency data (e.g., to a multi-order polynomial) in the same manner as curve fitting a frequency peak as described above (e.g., comparing the curve fit data to a signature).

Step 1120 may include storing characterization data (e.g., center frequency, bandwidth, peak or attenuation, etc.) for the peaks and attenuations identified in the frequency data of the one or more access devices.

If an amplifier malfunction is not detected in step 1120, the process may return to 1110 through decision block 1125. If an amplifier malfunction is detected, the process may proceed to step 1130 to locate the malfunctioning amplifier. Steps 1110-1120 may be a specific example of steps 510-530 in FIG. 5 and step 1125 may be a specific example of step 540, in which the analysis method selected includes the remainder of the steps of FIG. 11, which are performed as a specific example of step 550.

In step 1130, the detected frequency peaks and/or attenuations from step 1120 in the frequency data of multiple access devices may be compared to identify peaks and/or attenuations that are common to multiple access devices, or unique to one access device. The comparison may done, for example by comparing the characterization signature data (e.g., center frequencies, bandwidths, fitted curves, etc.) of two peaks or attenuations identified in the data of two different access devices, or by comparing the fitted curves.

In step 1140, for an identified peak or attenuation, access devices on a common network branch are sorted into two different groups: 1) access devices with frequency data that include the identified peak or attenuation, and 2) access devices with frequency data that does not include the identified peak or attenuation. Step 1140 may be repeated for each different peak or attenuation.

For an identified peak or attenuation, step 1150 identifies the direction of signals on the network in the bandwidth where the peak or attenuation is located. Amplifiers in the network branch may be designed to transmit upstream (e.g., from access devices to a terminating device) and downstream (e.g., from the terminating device to the access devices) at different frequency ranges. For example, a frequency band of 90 MHZ to 800 MHZ may be allocated to 6 MHz wide broadcast channels (e.g., high definition television channels), which would be transmitted from the terminating system to the access devices, and a frequency band of 30 MHZ to 89 MHz may be allocated for back channel communications from the access devices to the terminating system. In such an example, the peak and attenuation illustrated in FIGS. 4C and 4D, respectively, would both be in frequency bandwidth for signals transmitted from the terminating system to the access devices.

In step 1160, one or more amplifiers may be identified in the network as candidates for generating the peak or attenuation based on the amplifiers' relative position to the group of access devices that include the peak or attenuation, based on the amplifiers' relative position to the group of access devices that do not include the peak or attenuation, and/or based on the direction of the signals in the frequency band of the peak or attenuation.

For example, a candidate amplifier may be identified by determining that the amplifier is along the signal path in the network between the group of amplifiers that includes the peak or attenuation and the group that does not include the peak or attenuation. For example, referring to FIG. 2B, if AD4 and AD6 do not include the anomaly, but AD1, AD2, AD3, and AD5 do exhibit the anomaly, amplifier A1 may be determined to be a candidate amplifier that is causing the peak or attenuation.

In another example, a candidate amplifier may be identified by determining which amplifiers transmit to at least one of the access devices that include the anomaly and based on the direction of signals in the frequency band where the anomaly is located. For example, if AD6 has data that includes a peak in a frequency band where signals are transmitted from the terminating system to the access devices, amplifier A2 may be determined to be the only possible amplifier that transmits such signals to AD6, and thus be included as a candidate amplifier. Step 1160 may be repeated for each identified peak or attenuation.

In step 1170, each candidate amplifier may be geospatially located based on stored data that correlates network components to physical locations. For example, candidate amplifiers may be located on the map in FIG. 10, by latitude and longitude, by street address, etc. The map in FIG. 10 may be generated and presented as a user interface. Step 1170 may include outputting the location on a display (e.g., on a displayed map output by analyzer 103 or a display of a remote device). Step 1170 may be repeated for each identified peak or attenuation.

Process 1100 may also be used to detect other anomalies known to occur at amplifiers, such as automatic gain control error as illustrated in FIGS. 4K and 4L. FIGS. 4K and 4L show frequency data of the same access device, but at two different temperatures, 95 degrees Fahrenheit and 55 degrees Fahrenheit, respectively. As shown in the figures, the amplitude of the signals are higher in FIG. 4L, where the temperature is lower. Such variation may be indicative of faulty automatic gain control in an amplifier.

To detect such an error, step 1120 may compare amplitude (e.g., integrated over a predefined bandwidth) for an access device at two different temperatures. Temperature data may be acquired for example, based on public weather reports, and the frequency data may be collected in step 1110 when the temperatures are within predetermined ranges (e.g., above a threshold first temperature and below a threshold second temperature that is lower than the first temperature). In step 1140, when the comparison results in a difference that is greater than a predetermined threshold (e.g., stored in a memory), the access devices may be grouped into a group designated as exhibiting this particular temperature dependent fault. Likewise, access devices having a comparison less than the predetermined threshold may be grouped into a group designated as not exhibiting this particular temperature dependent fault. Once the access devices are grouped, steps 1150 to 1170 proceed as previously described.

FIG. 12 illustrates a process 1200 that may be performed in accordance with one or more embodiments to identify and/or locate incorrect plant setup, such as detecting a missing or malfunctioning component (e.g., a filter) that is designed to correct a predetermined non-constant frequency response (e.g., frequency tilt) introduced by one or more components in the network. The incorrect plant setup may be as described herein with respect to FIG. 4E.

Process 1200 describes a variation of process 500 from FIG. 5 for identifying/locating incorrect plant setup. The process begins at step 1210 in which a computing device, such as analyzer 103, obtains and, optionally, stores data that characterizes the communication paths between one or more of access devices AD1 through AD6 and the fiber node (or other termination device) at the beginning of the network branch. Step 1210 may include the retrieval and storage steps described herein for steps 510 and 520 of FIG. 5. For example, at the end of step 1210, each row of a table 150 (e.g., table 150 from FIG. 6A) may contain an identifier and spectral analysis data for up to P frequencies for one of access devices AD1 through ADn.

Analyzer 103 may repeat step 1210 to collect and store table 150 for multiple iterations in the same manner as described herein with respect to step 510 of FIG. 5.

In step 1220, analyzer 103 may retrieve the data stored in 1210 for one or more access devices AD1 through ADn, and analyze the data for indications of incorrect plant setup, such as a missing or malfunction filter that would cause the frequency tilt as illustrated in FIG. 4E. For example, the collected data from step 1210 may, when illustrated as a graph, appear as in FIG. 4E having frequency tilt as indicated by line L1.

Step 1220 may detect frequency tilt or other non-constant frequency responses of a network component by, for example, linear approximating, or curve fitting to a polynomial, the frequency data of an access device, and then comparing the approximation/curve fit to predetermined known frequency responses (e.g., signatures) of network components. The comparison could, in one example include comparing (within a predetermined margin of error) the slope of a linear approximation of the frequency data to a known slope (e.g., tilt) introduced by a specific type of coaxial cable (e.g., RG6) within a particular frequency band. In other examples, the comparison could include an integrated difference, a cross-correlation, etc., between the approximated curve and the known curve (e.g., a signature) associated with particular components in the network. If the comparison indicates a match to a particular network component (e.g., the integrated difference being below a threshold value, the cross-correlation being above a threshold value) the type of component and the access device at which the match was detected may be stored as an associated pair of data. Step 1220 may be repeated for multiple access devices in the network.

If a component malfunction or incorrect plant setup is not detected in step 1220, the process may return to 1210 through decision block 1225. If an amplifier malfunction is detected, the process may proceed through block 1225 to step 1230 to locate the component malfunction or incorrect plant setup location. Steps 1210-1220 may be a specific example of steps 510-530 in FIG. 5 and step 1225 may be a specific example of step 540, in which the analysis method selected includes the remainder of the steps of FIG. 12, which are performed as a specific example of step 550.

The detected component/access device data pair from step 1220 of multiple access devices may be compared in step 1230 to identify access devices having frequency data indicative of the same network components having the non-constant frequency response (e.g., tilt).

In step 1240, access devices on a common network branch are sorted into two different groups: 1) access devices with frequency data that includes the non-constant frequency response of a particular component (e.g., tilt from a coaxial cable), and 2) access devices with frequency data that do not include the non-constant frequency response of the identified component. Step 1240 may be repeated for each different identified component.

For each identified component, step 1250 may identify the direction of signals on the network in the bandwidth where the non-constant frequency response was identified. For example, the frequency tilt detected in FIG. 4E is in the bandwidth from 125 MHz to 731 MHZ, which may be allocated for downstream transmissions (e.g., from the termination system to the access devices).

In step 1260, components having a characteristic frequency response that matches the detected non-constant frequency response are identified as possible sources of the anomaly. Of the possible source components, those in the signal paths (based on the determined signal direction) of the access devices in the group having the frequency response, but not in the signal paths of the access devices in the group not having the frequency response are identified as candidate components that generate the non-constant frequency response.

For example, in FIG. 2B, devices AD1 and AD2 may exhibit the frequency tilt corresponding to L1 in FIG. 4E for downstream signals, and deices AD3-AD6 may exhibit relatively lower tilt as indicated by L2 in FIG. 4E. The tilt of L1 may be determined to correspond to coaxial cable segments S1-S10 as possible sources. Of S1-S10, only S1-S3 are determined to be in the downstream signal path of AD1 and AD2, which exhibit the tilt, and not in the signal paths of AD3-AD6, which do not exhibit the tilt. Based on the determination, S1-S3 are identified as candidate components. Step 1260 may be repeated for each identified non-constant frequency response known to correspond to a network component.

In step 1270, for each candidate component, candidate correction devices and their locations in the network are identified for correcting the non-constant frequency response. The candidate correction devices (e.g., filters) could be already present, but not tuned or operating correctly, or could be missing and required to be added. Already present correction components, in step 1280, may be geospatially located based on stored data that correlates network components to physical locations. For example, candidate filters may be located on the map in FIG. 10, by latitude and longitude, by street address, etc. Step 1280 may include outputting the location on a display (e.g., on a displayed map output by analyzer 103 or other remote device). Similarly, for candidate correction devices that do not exist, appropriate locations (network path or geospatial) for correcting the non-constant response may be identified and/or displayed. Step 1280 may be repeated for each different candidate component. Based on the identified locations, already present or new correction devices may be tested within the network at the identified locations.

FIG. 13 illustrates a process 1300 that may be performed in accordance with one or more embodiments to identify resonant cavities within the network and to locate a network fault that is causing the resonant cavity (e.g., an impedance mismatch). The resonant cavity may be as described herein with respect to FIG. 4F. Process 1300 describes a variation of process 500 from FIG. 5 applied to resonant cavities.

The process begins at step 1310 in which a computing device, such as analyzer 103, obtains and, optionally, stores data that characterizes the communication paths between one or more of access devices AD1 through AD6 and the fiber node (or other termination device) at the beginning of the network branch. Step 1310 may include the retrieval and storage steps described herein for step 510 of FIG. 5, which may result in the data in table 150 illustrated in FIG. 6A. Analyzer 103 may repeat step 1310 to collect and store table 150 for multiple iterations in the same manner as described herein with respect to step 510 of FIG. 5.

In step 1320, analyzer 103 may retrieve the data stored in step 1310 for one or more access devices AD1 through ADn, and analyze the data for indications of a standing wave caused by an impedance cavity. For example, the collected data from step 1310 may, when illustrated as a graph, appear as in FIG. 4F with a periodic standing wave across the frequency spectrum (e.g., a periodic increase and decrease in signal amplitude across frequency).

Step 1320 may detect a standing wave by, for example, detecting local minimum or maximum amplitudes at multiple frequencies in the frequency data of an AD. For example, local minimum amplitudes may be found by scanning the data across frequency bands, and detecting frequency bands where amplitudes at adjacent frequencies above and below the frequency band have greater values than the amplitude at the frequency band being evaluated. To avoid detecting spurious minimums and maximums, the frequency data may be filtered to remove frequency components in the data that are above or below an expected or designated frequency at which the standing wave is to be detected. Local maximum amplitudes may be found in a similar way by detecting frequency bands where amplitudes at adjacent frequencies above and below the frequency band have lower values than the amplitude at the frequency band being evaluated. Once local minimum or maximum amplitudes are detected, a standing wave is detected by measuring periodicity of the local maximum or minimum amplitude to within a threshold tolerance.

In other examples, a standing wave may be detected by performing a Fourier Transform (e.g., a Fast Fourier Transform (FFT)) on the frequency data. Standing waves will be shown by a peak in the Fourier Transform, with the amplitude and time of the peak being respectively representative of the amplitude and time period of the standing wave. Step 1320 may be repeated for multiple access devices in the network.

If a standing wave is not detected in step 1320, the process may return to 1310 through decision block 1325. If a standing wave is detected, the process may proceed through block 1325 to step 1330 to locate the fault causing the standing wave. Steps 1310-1320 may be a specific example of steps 510-530 in FIG. 5 and step 1325 may be a specific example of step 540, in which the analysis method selected includes the remainder of the steps of FIG. 13, which are performed as a specific example of step 550.

In step 1330, the detected standing waves from step 1320 of multiple access devices may be compared to identify access devices having frequency data indicative of the same impedance cavity, e.g., having the same periodicity and/or amplitude.

In step 1340, access devices on a common network branch are sorted into two different groups: 1) access devices with frequency data that include the detected standing wave, and 2) access devices with frequency data that does not include the detected standing wave. Step 1340 may be repeated for each different standing wave (e.g., different period T1).

For each identified standing wave, step 1350 evaluates the topology of the network to identify candidate portions of the network on which the fault(s) may exist, based on one or more factors, including the groups of access devices that do/do not exhibit the standing wave, and based on the transmission and isolation properties of the network components for signals in the frequency range in which the standing wave is detected (e.g., tap isolation, amplifier directionality, etc.). Step 1350 may include identifying each network segment (e.g., S1, S2, and S3) that connects access devices in the group of access devices that exhibit a particular standing wave, and identifying each network segment that connects access devices in the group of access devices that do not exhibit the standing wave. For example, referring to FIG. 2B, assuming the frequency data from AD1-AD3 and AD5 exhibited a standing wave having the same period, and the frequency data from AD4 and AD6 did not exhibit the standing wave, segments S1-S6 would be identified as possibly including the faults causing the standing wave, and segments S7-S11 would be excluded from those segments possibly including the fault.

Step 1350 may further include identifying network components (e.g., taps, amplifiers, filters), that would prevent the standing wave from propagating from one segment to another in the frequency range in which the standing wave is detected. For example, referring to FIG. 4F, the standing wave is shown in the range of approximately 100 MHZ to 460 MHZ. According to the component data in table 9E, for example, the amplifiers A1 and A2 exhibit high attenuation (−60 dB) in the upstream direction for signals in that frequency range, and thus, any standing wave signal would not propagate past an amplifier in the upstream direction. As another example, splitters and taps T1-T5 exhibit 20 dB of tap isolation (e.g., −20 attenuation from tap to tap), which may effectively prevent a standing wave signal from propagating from one tap to another tap. Continuing with the example above, amplifier A1 would prevent the standing wave from propagating from the group of segments S1-S6 to the segments S7-S10, This would confirm that the fault is within segments S1-S6. In other examples, where both faults between which the standing wave reflects lie between two amplifiers, the standing wave may be prevented from propagating in one direction (e.g., past the upstream, amplifier), but may propagate in the opposite direction (e.g. past the downstream amplifier).

In the example above, the segments on which the faults exist may further be narrowed based on the tap to tap isolation of T2, which would effectively prevent a standing wave generated on S4 to propagate to S1-S3, and likewise prevent a standing wave generated on S1-S3 from propagating to S4. Because in the example above, the frequency data of AD1, AD2, and AD3 exhibit the standing wave equally, the faults that generate the standing wave may be located within S6 and S5. These are the only segments from which the standing wave would propagate to segments S3 and S4 equally.

For each identified standing wave, step 1360 includes calculating a distance between the faults creating the standing wave based on the period of the standing wave, and based on the velocity of propagation of the signals on the segments of the network identified in step 1350. As previously indicated, the period T of a standing wave is representative of the time a signal takes to propagate from a first impedance mismatch to a second impedance mismatch and reflect back to the first impedance mismatch. Electromagnetic waves travel in free space at a known rate of 983,571,056 feet per second (ft/sec), but in a different medium, the waves propagate only at a faction of the free space velocity of propagation. A coaxial cable may carry RF signals, for example, at 87% of the velocity of propagation in free space. As another example, a single mode optical fiber carrying a light pulse at 1310 nm wavelength may have a characteristic velocity of propagation of 68% of the free space velocity of propagation.

For each of the possible propagation paths identified in step 1350, a velocity of propagation is determined in step 1360. The velocity of propagation will depend on the components in the network through which the standing wave propagates. Values for a velocity of propagation for different components may be stored as predetermined values in a memory. For example, the component parameters illustrated in FIG. 9E may include additional velocity of propagation values stored for particular components (e.g., RG6 and RG11 cables). Based on a velocity of propagation of the possible paths of the standing wave signal as determined in step 1350 (e.g., S5 and S6), the distance between the faults may be determined by multiplying the velocity of propagation along the signal path by the standing wave period T to determine a round trip reflected signal distance, which may be divided by two to determine the distance between faults.

In step 1370, candidate locations of faults creating the standing wave are determined based on the candidate network segments that may include the standing wave, and based on the calculated distance between faults (e.g., impedance mismatches). In one example, one fault from which the standing wave is reflected is assumed to be a component in the network, such as an output of an amplifier. A location may then be identified as a fault location based on the calculated distance from the assumed component having the impedance mismatch.

For example, in FIG. 4F, the period T is shown to be approximately 41.7 nS (1/24 MHz). Assuming a velocity of propagation in segments S5 and S6 of 0.87 times the free space velocity of propagation, the distance between faults can be determined to be approximately 0.87*983,571,056 ft/sec,*41.7 nS/2=17.8 ft. In this example, the fault location would be identified as 17.8 ft from the location of amplifier 1 along S6. While in this example, the amplifier A1 was assumed to be the location of one fault, other devices may be assumed to be a fault location, e.g., taps, splitters, etc.

In some embodiments, more than one standing wave may be detected for a set of access devices. For example, performing an FFT on frequency data from an access device may exhibit two peaks, indicating two standing waves. In such a case, signals may be reflected in a first impedance cavity between a fault and an impedance mismatch at a first device (e.g., amplifier A1), and a second impedance cavity may be formed between the same fault and a second device (e.g., tap T3). In such a case, respective distances may be calculated using the process 1300 for each cavity. In variations where the distances add to the length between two components (e.g., amplifier A1 and tap T3), it can be determined that the fault lies between the two components at a first calculated distance from the first component and a second calculated distance from the second component. Step 1370 may be repeated for each different standing wave detected.

Step 1380 may include outputting the location(s) to a memory or on a display (e.g., on a displayed map output of FIG. 10 by analyzer 103 or other remote device). Step 1380 may be repeated for each different fault location.

FIG. 14 illustrates a process 1400 that may be performed in accordance with one or more embodiments to identify various other anomalies, such as signal roll off as illustrated in FIG. 4G, frequency notches as illustrated in FIG. 4H, excessive attenuation as illustrated in FIG. 4I, and incorrectly inserted band pass filters as illustrated in FIG. 4J.

Process 1400 describes a variation of process 500 from FIG. 5 as applied to the above faults.

The process begins at step 1410 in which a computing device, such as analyzer 103, obtains and, optionally, stores data that characterizes the communication paths between one or more of access devices AD1 through AD6 and the fiber node (or other termination device) at the beginning of the network branch. Step 1410 may include the retrieval steps described herein for steps 510 and 520 of FIG. 5, which may result in the data in table 150 illustrated in FIG. 6A. Analyzer 103 may repeat step 1410 to collect and store table 150 for multiple iterations in the same manner as described herein with respect to step 510 of FIG. 5.

In step 1420, analyzer 103 may retrieve the data stored in 1410 for one or more access devices AD1 through ADn, and analyze the data for indications of signal roll off, frequency notches, excessive attenuation, and band pass filters. For example, the collected data may be curve fit to polynomials indicative of each of the faults above.

If no faults are detected in step 1420, the process may return to 1410 through decision block 1425. If one of the faults is detected, the process may proceed through step 1425 to step 1430 to locate the fault. Steps 1410-1420 may be a specific example of steps 510-530 in FIG. 5 and step 1425 may be a specific example of step 540, in which the analysis method selected includes the remainder of the steps of FIG. 14, which are performed as a specific example of step 550.

In step 1430, the detected faults from step 1420 of multiple access devices may be compared to identify access devices having frequency data indicative of the same faults.

In step 1440, access devices on a common network branch are sorted into two different groups: 1) access devices with frequency data that includes the same fault, and 2) access devices with frequency data that does not include the same fault. Step 1440 may be repeated for each different fault.

For each identified fault, step 1450 evaluates the topology of the network to identify candidate portions of the network on which the fault(s) may exist. Identifying the candidate network portions may be based on one or more factors, including the groups of access devices that do/do not exhibit the fault, and based on the transmission and isolation properties of the network components for signals in the frequency range in which the fault is detected (e.g., tap isolation, amplifier directionality, etc.). Step 1450 may include identifying each network segment (e.g., S1, S2, and S3) that connects access devices in the group of access devices that exhibits a particular fault, and identifying each network segment that connects access devices in the group of access devices that do not exhibit the fault. For example, referring to FIG. 2B, assuming the frequency data from AD1-AD3 and AD5 exhibited the same fault, and the frequency data from AD4 and AD6 did not exhibit the fault, segments S1-S6 would be identified as possibly including the fault, and segments S7-S11 would be excluded from those segments possibly including the fault.

Step 1450 may further include identifying network components (e.g., taps, amplifiers, filters), that would prevent the fault from propagating from one segment to another in the frequency range in which the fault is detected. For example, referring to FIGS. 4G, 4H, 4I, and 4J the faults are shown in the range of approximately 100 MHZ to 460 MHZ. According to the component data in the table in FIG. 9E, for example, the amplifiers A1 and A2 exhibit high attenuation (−60 dB) in the upstream direction for signals in that frequency range, and thus, any fault signal would not propagate past an amplifier in the upstream direction. As another example, splitters and taps T1-T5 exhibit 20 db of tap isolation (e.g., −20 attenuation from tap to tap), which may effectively prevent a fault signal from propagating from one tap to another tap. Continuing with the example above, amplifier A1 would prevent the fault from propagating from the group of segments S1-S6 to the segments S7-S10, and thus indicate that the fault is within segments S1-S6. In other examples, where the fault is between two amplifiers, the fault may be prevented from propagating in one direction (e.g., past the upstream, amplifier), but may propagate in the opposite direction (e.g. past the downstream amplifier).

In the example above, the segments on which the faults exist may further be narrowed based on the tap to tap isolation of T2, which would effectively prevent a fault generated on S4 to propagate to S1-S3, and likewise prevent a fault generated on S1-S3 from propagating to S4. Because in the example above, the frequency data of AD1, AD2, and AD3 exhibit the fault equally, the components that generate the fault may be located within S6 and S5. These are the only segments from which the fault would propagate to segments S3 and S4 equally.

Step 1460 may include outputting the components on which the fault may exist to a memory or on a display (e.g., on a displayed map output by analyzer 103). Step 1460 may be repeated for each different fault location. In some embodiments, a display that represents the spectral analysis data for one or more ADs may be generated. For example, analyzer 103 may generate such a display. FIG. 3A illustrates an example display representing spectral analysis data received from a single AD. The plot illustrated in FIG. 3A shows an amplitude (measured in dB on the y-axis) of a signal received at the AD at various frequencies (measured in Mhz on the x-axis). The plot may be generated based on a single iteration of frequency spectrum data received from an AD or may be based on an average of a plurality of iterations of spectral analysis data received from the AD.

In some embodiments, a display that represents spectral analysis data received from a plurality of ADs may be generated. For example, FIG. 3B illustrates a plot similar to FIG. 3A where the plot shows the amplitude (y-axis) of signals received at a plurality of ADs at various frequencies (x-axis). In an example, the plot may be color coded such that each AD has a particular color that indicates the depicted spectral analysis data in that color represents the signal received at that particular AD. In some embodiments, the display includes a zoom feature that enables a portion of the plot to be zoomed. For example, FIG. 3C illustrates a plot of spectral analysis data received from a plurality of ADs zoomed over a frequency range between 320 Mhz and 366 Mhz.

In some embodiments, the frequency spectrum data from one or more ADs displayed, for instance, in a plot, may be selected based on one or more parameters. For example, the ADs may be selected based on a geographic proximity (e.g., located on the same street, within a predetermined radius of a geographical location, within predetermined geographical boundaries, etc.). The ADs may also be selected based on their location on a network. For example, AD1-AD6 may be selected based on one or more of the ADs sharing a common network path from a data processing facility, the AD's sharing a common optical node, the ADs experiencing a common signal distortion, a combination of these, or any other suitable network architecture commonality.

Figure 15:
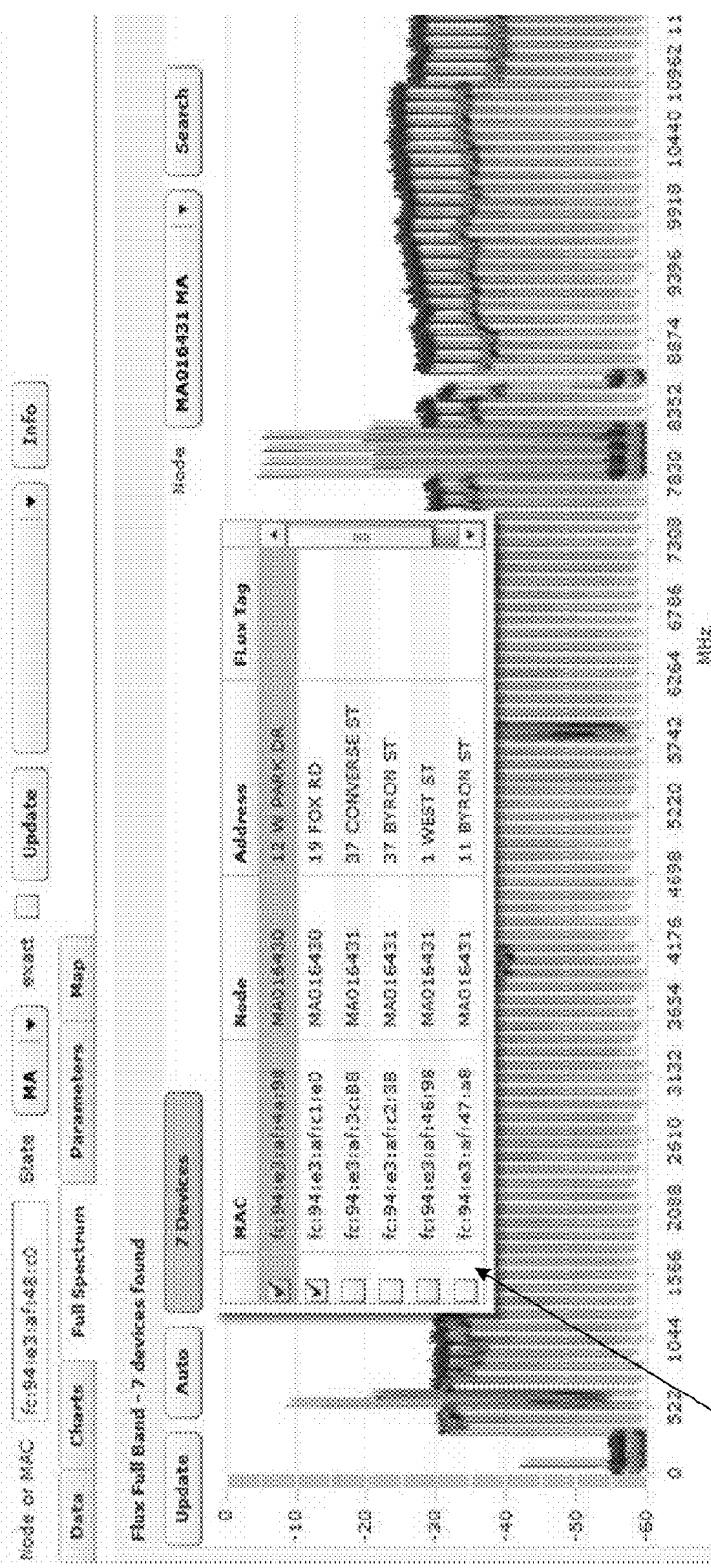
FIG. 15 illustrates a user interface in accordance with one or more embodiments.

As an example, FIG. 15 illustrates a graphical user interface display where one or more ADs may be selected and subsequently displayed on a plot, such as a plot similar to that illustrated in FIG. 3B. The ADs may be selected using a dialog box such as box 1501. The dialog box may be populated with ADs by performing a search based on one or more of a geographic location, a network path, a combination of these, or any other suitable parameter, as described above. The ADs may then be selected for display from dialog box 1501. Which ADs are displayed in the dialog box may be based on the ADs connection to a common node (e.g., an optical node), a MAC address for the AD, a location (e.g., street address) for the AD, or other suitable criteria.

In some embodiments, the analyzer may identify one or more signal distortions experienced at one or more ADs based on the displayed spectral analysis data. For example, an analyzer may generate a display such as the plots illustrated in FIGS. 4A-4L which exhibit one or more signal distortions (e.g., noise ingress, wideband interference, resonant peaking, RF suckout, tilt, high-end roll-off, a standing wave, a notch, attenuation beyond a threshold, weather related distortion, a band-pass filter, etc.) based on the display. In some embodiments, one or more ADs may be selected autonomously for display based on the ADs experiencing a common signal distortion (e.g., a notch), which is detected in the frequency data of each of the displayed access devices. For example, the steps of 1120, 1220, 1320, and 1420 may each identify access devices having frequency data that exhibits a fault, and the user interface may automatically display the frequency data for just those access devices on the user interface. In other aspects, the analyzer may automatically identify (e.g., highlight, label, draw a box, etc.) the specific network characteristic (e.g., tilt, peaking, etc.) that is detected.

Figure 16:
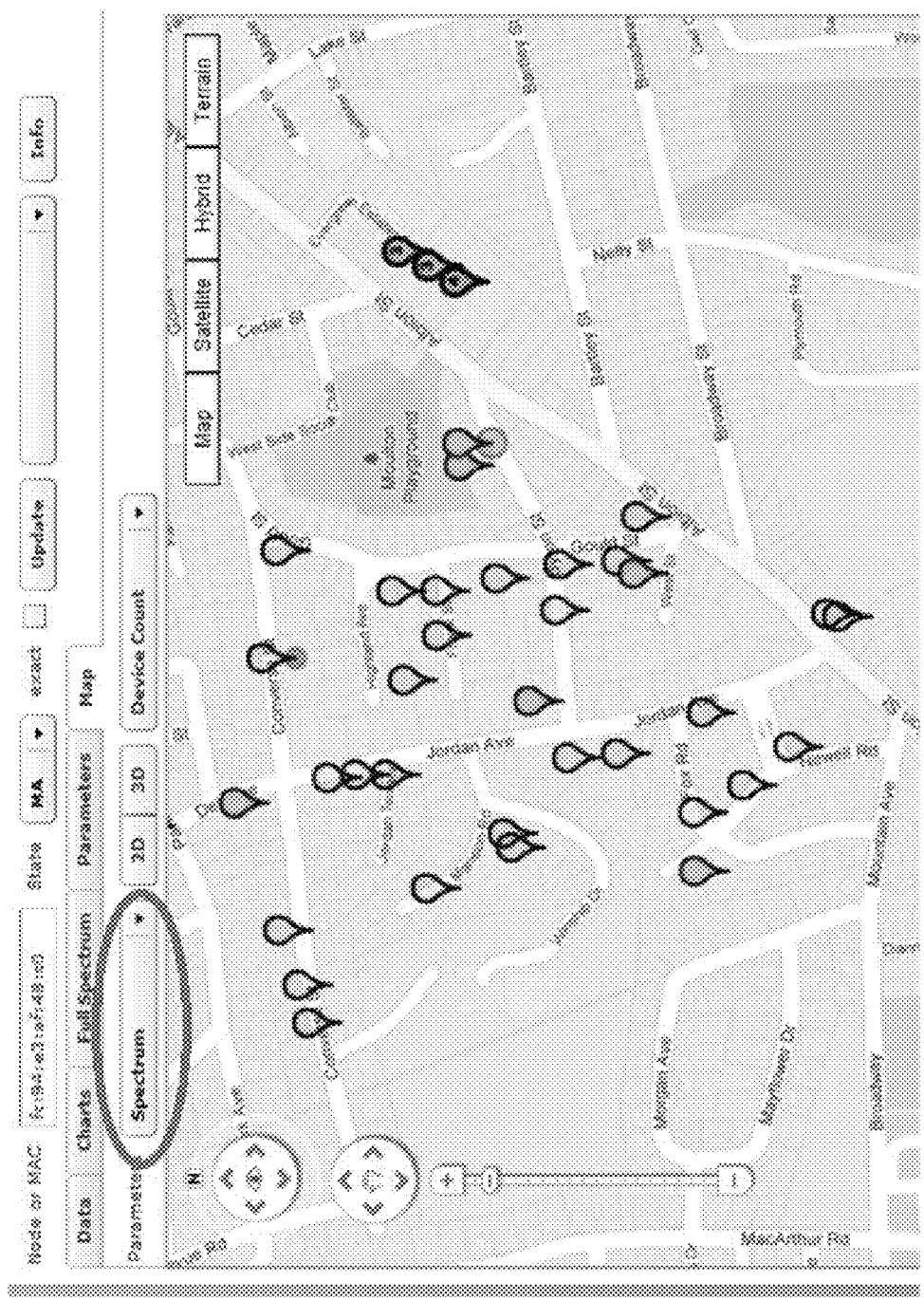
FIG. 16 illustrates an interactive geospatial map user interface according to one or more embodiments.

In some embodiments, the ADs may also be displayed on a geographic map. For example, FIG. 16 illustrates a display where a plurality of selected ADs is displayed on a geographic map. The map may be a street map, as illustrated, or any other geographical map. For instance, a street map may be displayed and the selected ADs may be displayed as an overlay over the street map based on a location (e.g., street address) associated with the ADs. In some embodiments, a user may locate one or more signal distortions experienced at the one or more ADs based on the displayed geographical map. For instance, a geospatial area may be delineated as containing a fault, based on a group of access devices on the map being determined to have frequency data exhibiting the fault.

Figures 17, 18:
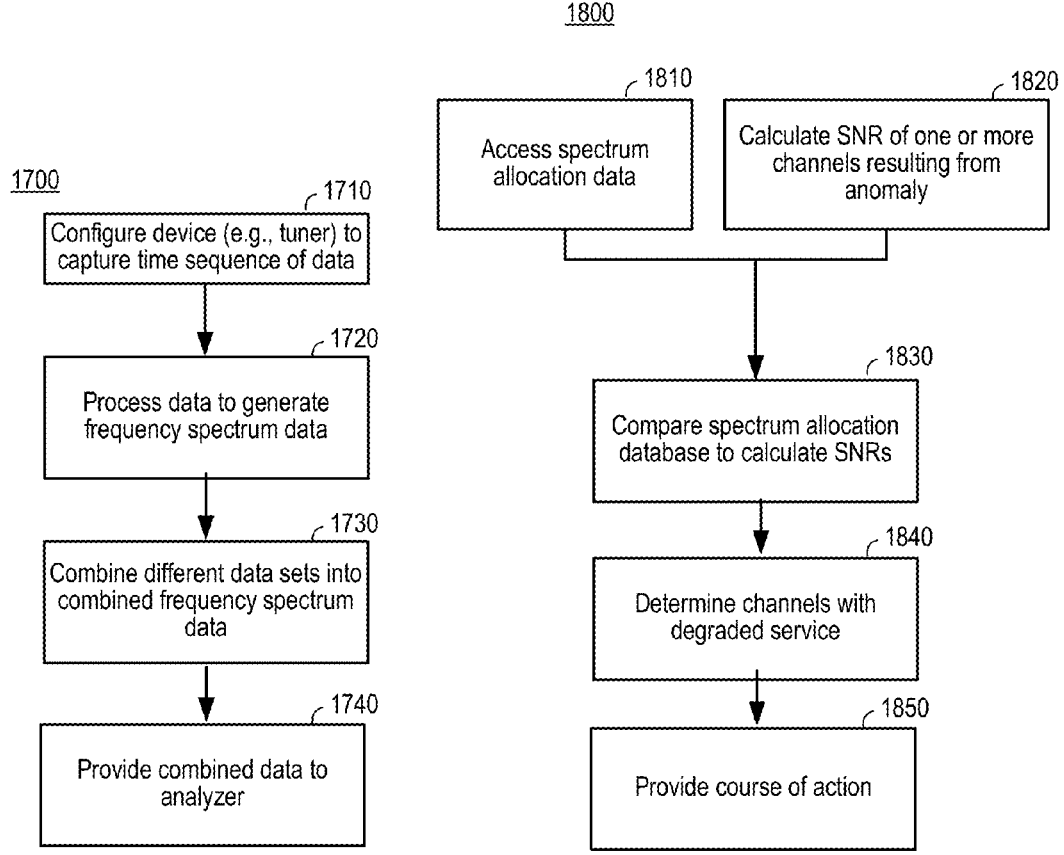
FIGS. 17-18 illustrate operations in flow charts that may be performed in accordance with one or more embodiments.

FIG. 17 illustrates a process 1700 that may be performed in accordance with one or more embodiments to generate the frequency spectrum data that is retrieved in for example, steps 510, 810, 1110, 1210, 1310, and 1410. Process 1700 may be performed by an access device entirely or with the analyzer 103. In step 1710, access device may configure a tuner to capture frequency data over a predetermined window of time, and in step 1720, the captured data is processed (e.g., with an FFT) to generate a frequency spectrum of the captured data.

In some aspects, the tuner is a wideband tuner that samples the network at a high rate (e.g., the Nyquist rate) sufficient to capture a frequency band that includes several channels. For example, the tuner may sample at the Nyquist rate for an entire allocated bandwidth of the network (e.g., 0-750 MHz). Processing of this data in step 1720 results in a full spectrum as shown, for example in FIGS. 4A-4L that can be used in the processes described herein to detect faults.

In other aspects, the tuner is capable of only tuning to a single channel (e.g., a 6 MHz bandwidth), which is downconverted and then time sampled. In such a case, only a limited window of frequency data about the center frequency of the channel may be calculated. For example, in some variations, only the signal-to-noise ratio (SNR) of the channel may be determined by the access device. The SNR of a single channel may be treated as a single 6 MHz wide frequency bin. The tuner may then be tuned to multiple different channels, with the SNR retrieved for each channel. The SNRs may then be ordered sequentially by frequency to represent a low-resolution frequency spectrum data that can be used in the processes disclosed herein for detecting and locating faults.

In other variations, pre-equalization coefficients of an access device may be used to derive the in-channel frequency response (ICFR) of the network over a single channel. Various access devices, for example, will include a pre-equalizer and/or post equalizer that will pre and post equalize signals transmitted from and received at the access device, respectively. The equalization coefficients of the equalizers may be adaptive and set in response to the frequency response of the channel to which the tuner is tuned. That is, the equalizers are configured to cancel out distortions induced by the network. By taking the inverse of the equalizer coefficients, the in-channel frequency response of the channel is obtained. The tuner can be tuned to multiple channels to obtain the in-channel frequency response of multiple channels.

In step 1730, the frequency data from the multiple different methods of capture for an access device may be combined to provide a higher resolution spectrum. For example, the in-channel frequency response for each channel can be combined with other frequency data to provide a higher resolution spectrum. For example, the in-channel frequency response of a particular channel can be overlayed/combined with the same frequency band of data obtained in the full spectrum capture to provide higher resolution information within that band. For example, if the full spectrum frequency data exhibits a standing wave, and a minimum of the standing wave falls within a channel, in-channel frequency response of that channel may be overlayed with the frequency data of the full spectrum data within the channel bandwidth to provide a higher resolution image of that bandwidth. Likewise, the SNR data of each channel, when viewed in frequency sequential order, may show a course representation of a standing wave. The in-channel frequency response of each channel may be normalized to the SNR of that channel and sequenced together to provide a higher resolution picture of the standing wave.

In step 1740, the combined frequency spectrum data is provided to the analyzer 103. In some embodiments, the different spectrum data is provided to analyzer 103 separately, and then combined by analyzer 103. Before and after data capture, the tuner may be utilized by the user to tune to video or data services.

Once an anomaly is detected and located, FIG. 5 includes steps 560 and 570 for determining the impact of the anomaly on services (e.g., video and data services) provided over the network. FIG. 18 illustrates a process 1800 for performing these steps in more detail. In step 1810, a spectrum allocation of services (e.g., video, audio, DOCSIS, MOCA, etc.) to channels is retrieved from a database. In step 1820, a SNR is derived for one or more channels based on the detected anomaly and frequency spectrum data. For example, if a standing wave is detected, the channels where the standing wave minimums are located may be determined, and the SNR of those channels may be calculated based on the frequency spectrum data in those channel bandwidths. In step 1830, the spectrum allocation database is compared to the calculated SNRs to identify those channels that may potentially be impacted by a reduced SNR. In step 1840, the calculated SNRs of the potentially impacted channels are compared to predetermined threshold SNRs that may indicate a SNR level below which results in a degraded service (e.g., pixelated video). The threshold SNR may be different for different types of service. For example, a DOCSIS data service may be impacted to a greater extent than video for the same SNR. Channels having an SNR below their respective thresholds for the type of service they carry are identified as impacted channels. In step 1850, a course of action is determined for the impacted channels. For example, if a standing wave was detected and located within a customer's premises, but no channels in the customer's premises were impacted, analyzer 103 may determine that no course of action should be taken. As another example, the customer may have a channel that is degraded, but it may be a service to which the customer does not subscribe. In such a case, the analyzer 103 may still determine not to take action. In another example, if the customer's subscribed services were impacted, analyzer 103 may provide the location of the fault causing the standing wave to a technician or to the customer with suggested directions of correcting the fault (e.g., tighten connection at drop line to premises, remove splitter, remove filter, etc.).

Figure 19:
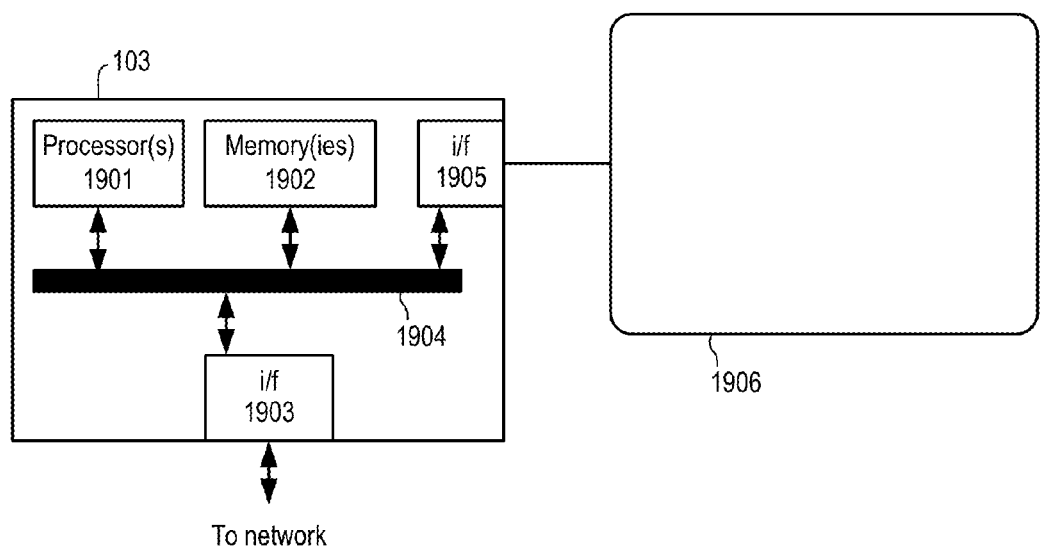
FIG. 19 includes a diagram showing elements of an illustrative computer device in which some embodiments may be practiced

FIG. 19 is a block diagram of an illustrative analyzer 103 according to some embodiments. In at least some embodiments, analyzer 103 can be implemented as (or as part of) a server or other computer platform. Such a computer platform could be dedicated to performing analyzer 103 operations described herein, or could additionally perform other operations. Analyzer 103 may communicate with hub 102 and/or other network elements over one or more network interfaces (i/f) 1903. Interface 1903 could be, e.g., a Gigabit Ethernet card, 802.11 wireless interface, etc. Analyzer 103 may further include memory 1902 for storing machine-readable instructions and data and a processor 1901 for executing the instructions and controlling operations of analyzer 103 to perform the various functions described herein. Although a single block is shown for memory 1902 and a single block is shown for processor 1901, data/instruction storage and computational operations of analyzer 103 could respectively be distributed across multiple memory devices and multiple processors located within analyzer 103 or spread across multiple platforms (e.g., multiple computers, servers, mainframes, etc.). Memory 1902 may include volatile and non-volatile memory and can include any of various types of storage technology, including but not limited to read only memory (ROM) modules, random access memory (RAM) modules, magnetic tape, magnetic discs (e.g., a fixed hard disk drive or a removable floppy disk), optical disk (e.g., a CD-ROM disc, a CD-RW disc, a DVD disc), flash memory, and EEPROM memory, or other devices with equivalent capabilities. Processor 1901 may be implemented with any of numerous types of devices, including but not limited to one or more microprocessors, microcontrollers, digital signal processors, embedded processors, application specific integrated circuits, field programmable gate arrays, and combinations thereof. In at least some embodiments, processor 1901 carries out operations of analyzer 103 described herein according to machine-readable instructions (e.g., software) stored in memory 1902 and/or stored as hardwired logic gates within processor 1901. Processor 1901 may communicate with and control memory 1902 and interface 1903 over one or more buses 1904.

Analyzer 103 may output data to a display 1906 using video interface (i/f) 1905. Although not shown, analyzer 103 may also receive user input via a keyboard, mouse, finger or other user input device. In some embodiments, analyzer 103 may communicate with other computers and devices over network interface 1903. For example, a user having a remote computer (e.g., a laptop computer, PDA, smartphone, etc.) could establish a communication session with analyzer 103 over one or more network links. The user could provide instructions, submit queries, or otherwise interact with analyzer 103 by sending communications over the network links via the remote computer. Analyzer 103 could then provide data outputs to the user's remote computer over those same or other links, which data could then be output on a display of the user's computer (e.g., a web server).

The foregoing description of embodiments has been presented for purposes of illustration and description. The foregoing description is not intended to be exhaustive or to limit embodiments to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. All embodiments need not necessarily achieve all objects or advantages identified above. Any and all permutations of various features described herein are within the scope of the invention. For example, while in FIGS. 3A-3B, 4A-4L, and 15 the horizontal axis is in MHz and the vertical axis is in dBmV, other variations may use other scales for displaying the data. As another example, all steps in the processes of FIGS. 5, 8A-8B, and 11-14 may not be performed, and the steps may be performed in a different order than how is illustrated and described. For example, in some embodiments, one or more of steps 810-840, 1110-1120, 1210-1220, 1310-1320, and 1410-1420 may be performed together resulting in the detection of one or more of the faults illustrated in FIGS. 4A-4L. The decision block 845, 1125, 1225, 1325, and 1425 may then be combined (e.g., as in step 540) to compare the detected faults to a library of known pre-characterized fault types to select which of the analyses of FIGS. 8, 11, 12, 13, and 14 to continue to determine the location of the fault(s).

What is claimed is:

1. A method comprising:
   accessing, by a computing device, a plurality of frequency characteristics of signals on a network, wherein the plurality of frequency characteristics correspond to the signals at a respective plurality of access devices connected to the network;
   comparing, by the computing device, the plurality of frequency characteristics to a plurality of different pre-characterized fault types by:
      accessing frequency signatures for each of the plurality of access devices;
      determining, based on a comparison of the plurality of frequency characteristics to the frequency signatures, a difference approximation associated with a first access device of the plurality of access devices; and
      comparing the difference approximation to the plurality of different pre-characterized fault types; and
   determining, by the computing device, that a particular type of fault exists based on the comparing the plurality of frequency characteristics to the plurality of different pre-characterized fault types, wherein the particular type of fault is associated with the first access device.

2. The method of claim 1, wherein the determining the difference approximation is further based on detecting, by curve fitting, a slope value that satisfies a predetermined slope threshold.

3. A method comprising:
collecting, by a computing device, a first set of frequency spectrum data corresponding to a plurality of access devices on a network;
collecting, by the computing device, a second set of frequency spectrum data corresponding to the plurality of access devices on the network;
determining, by the computing device, a noise reception value based on the first set of frequency spectrum data and the second set of frequency spectrum data;
comparing, by the computing device, the noise reception value to a threshold value; and
determining, based on the comparing, a signal fault type associated with the network.

4. The method of claim 3, wherein the second set of frequency spectrum data comprises frequency data in a bandwidth above an allocated bandwidth for communication channels in the network.

5. The method of claim 3, wherein the collecting the first set of frequency spectrum data comprises:
analyzing data associated with the plurality of access devices over two or more signal channels, wherein the first set of frequency spectrum data is collected during a different time period from a time period in which the second set of frequency spectrum data was collected.

6. The method of claim 3, further comprising:
comparing the first set of frequency spectrum data and the second set of frequency spectrum data in order to generate difference values; and
determining a root-mean-square of the difference values, wherein the comparing the noise reception value to the threshold value comprises:
comparing the root-mean-square of the difference values to the threshold value.

7. The method of claim 3, further comprising:
collecting a third set of frequency spectrum data corresponding to the plurality of access devices;
collecting a fourth set of frequency spectrum data corresponding to the plurality of access devices;
analyzing two or more of the first set, second set, third set, or fourth set of frequency spectrum data in order to determine an average noise reception value; and
causing, based on the average noise reception value, dynamic adjustment of the threshold value.

8. The method of claim 3, further comprising:
analyzing the first set of frequency spectrum data over a plurality of signal channels corresponding to the plurality of access devices; and
generating, based on the analyzing, a first set of frequency characteristics for the first set of frequency spectrum data.

9. The method of claim 8, further comprising:
analyzing the second set of frequency spectrum data over the plurality of signal channels corresponding to the plurality of access devices; and
generating, based on the analyzing, a second set of frequency characteristics for the second set of frequency spectrum data.

10. The method of claim 9, further comprising:
determining, based on a comparison of the first set of frequency characteristics and the second set of frequency characteristics, a difference approximation; and
comparing the difference approximation to a plurality of different pre-characterized fault types.

11. An apparatus comprising:
one or more processors; and
memory storing instructions that, when executed by the one or more processors, cause the apparatus to:
collect a first set of frequency spectrum data corresponding to a plurality of access devices on a network;
collect a second set of frequency spectrum data corresponding to the plurality of access devices on the network;
determine a noise reception value based on the first set of frequency spectrum data and the second set of frequency spectrum data; and
determine, based on a comparison of the noise reception value to a threshold value, a signal fault type associated with the network.

12. The apparatus of claim 11, wherein the second set of frequency spectrum data comprises frequency data in a bandwidth above an allocated bandwidth for communication channels in the network.

13. The apparatus of claim 11, wherein the instructions, when executed by the one or more processors, further cause the apparatus to:
collect the first set of frequency spectrum data by:
analyzing data associated with the plurality of access devices over two or more signal channels, wherein the first set of frequency spectrum data and second frequency spectrum data are collected at different times.

14. The apparatus of claim 11, wherein the instructions, when executed by the one or more processors, further cause the apparatus to:
compare the first set of frequency spectrum data and the second set of frequency spectrum data in order to generate difference values; and
determine a root-mean-square of the difference values, wherein the determining, based on a comparison of the noise reception value to a threshold value, a signal fault type associated with the network comprises:
determining, based on the comparison of the root-mean-square of the difference values to the threshold value, the signal fault type associated with the network.

15. The apparatus of claim 11, wherein the instructions, when executed by the one or more processors, further cause the apparatus to:
collect a third set of frequency spectrum data corresponding to the plurality of access devices;
collect a fourth set of frequency spectrum data corresponding to the plurality of access devices;
analyze two or more of the first set, second set, third set, or fourth set of frequency spectrum data in order to determine an average noise reception value; and
cause, based on the average noise reception value, dynamic adjustment of the threshold value.

16. The apparatus of claim 11, wherein the instructions, when executed by the one or more processors, further cause the apparatus to:
analyze the first set of frequency spectrum data over a plurality of signal channels corresponding to the plurality of access devices; and
generate, based on the analyzing, a first set of frequency characteristics for the first set of frequency spectrum data.

17. The apparatus of claim 16, wherein the instructions, when executed by the one or more processors, further cause the apparatus to:
    analyze the second set of frequency spectrum data over the plurality of signal channels; and
    generate, based on the analyzing, a second set of frequency characteristics for the second set of frequency spectrum data.

18. The apparatus of claim 17, wherein the instructions, when executed by the one or more processors, further cause the apparatus to:
    determine, based on a comparison of the first set of frequency characteristics and the second set of frequency characteristics, a difference approximation; and
    compare the difference approximation to a plurality of different pre-characterized fault types.

19. A system comprising:
    an apparatus comprising:
        one or more processors; and
        memory storing instructions that, when executed by the one or more processors, cause the apparatus to:
            collect a first set of frequency spectrum data corresponding to a plurality of access devices on a network;
            collect a second set of frequency spectrum data corresponding to the plurality of access devices on the network;
            determine a noise reception value based on the first set of frequency spectrum data and the second set of frequency spectrum data; and
            determine, based on a comparison of the noise reception value to a threshold value, as signal fault type associated with the network; and
    one of the plurality of access devices comprising:
        one or more processors; and
        memory storing instructions that, when executed by the one or more processors of the one of the plurality of the access devices, cause the one of the plurality of the access devices to transmit at least a portion of the first set of frequency spectrum data.

20. The system of claim 19, wherein the instructions in the memory of the apparatus, when executed by the one or more processors of the apparatus, further cause the apparatus to:
    compare the first set of frequency spectrum data and the second set of frequency spectrum data in order to generate difference values; and
    determine a root-mean-square of the difference values,
    wherein the determining, bases on the comparison of the noise reception value to the threshold value, as signal fault type associated with the network comprises:
        determining, based on the comparison of the root-mean-square of the difference values to the threshold value.

21. The system of claim 19, wherein the instructions in the memory of the apparatus, when executed by the one or more processors of the apparatus, further cause the apparatus to:
    analyze the first set of frequency spectrum data over a plurality of signal channels corresponding to the plurality of access devices; and
    generate, based on the analyzing, a first set of frequency characteristics for the first set of frequency spectrum data.

22. The system of claim 21, wherein the instructions in the memory of the apparatus, when executed by the one or more processors of the apparatus, further cause the apparatus to:
    analyze the second set of frequency spectrum data over the plurality of signal channels; and
    generate, based on the analyzing, a second set of frequency characteristics for the second set of frequency spectrum data.

23. The system of claim 22, wherein the instructions in the memory of the apparatus, when executed by the one or more processors of the apparatus, further cause the apparatus to:
    determine, based on a comparison of the first set of frequency characteristics and the second set of frequency characteristics, a difference approximation; and
    compare the difference approximation to a plurality of different pre-characterized fault types.

24. An apparatus comprising:
    one or more processors; and
    memory storing instructions that, when executed by the one or more processors, cause the apparatus to:
        access a plurality of frequency characteristics of signals on a network, wherein the plurality of frequency characteristics correspond to the signals at a respective plurality of access devices connected to the network;
        compare the plurality of frequency characteristics to a plurality of different pre-characterized fault types by:
            accessing frequency signatures for each of the plurality of access devices;
            determining, based on a comparison of the plurality of frequency characteristics to the frequency signatures, a difference approximation associated with a first access device of the plurality of access devices; and
            comparing the difference approximation to the plurality of different pre-characterized fault types; and
        determine that a particular type of fault exists based on the comparing the plurality of frequency characteristics to the plurality of different pre-characterized fault types, wherein the particular type of fault is associated with the first access device.

25. The apparatus of claim 24, wherein the determining the difference approximation is further based on detecting, by curve fitting, a slope value that satisfies a predetermined slope threshold.

26. A system comprising:
    an apparatus comprising:
        one or more processors; and
        memory storing instructions that, when executed by the one or more processors, cause the apparatus to:
            access a plurality of frequency characteristics of signals on a network, wherein the plurality of frequency characteristics correspond to the signals at a respective plurality of access devices connected to the network;
            compare the plurality of frequency characteristics to a plurality of different pre-characterized fault types by:
                accessing frequency signatures for each of the plurality of access devices of the plurality of access devices;
                determining, based on a comparison of the plurality of frequency characteristics to the frequency signatures, a difference approximation associated with a first access device; and
                comparing the difference approximation to the plurality of different pre-characterized fault types; and
            determine that a particular type of fault exists based on the comparing the plurality of frequency characteristics to the plurality of different pre-characterized fault types, wherein the particular type of fault is associated with the first access device; and one of the plurality of access devices comprising:
    one or more processors; and
    memory storing instructions that, when executed by the one or more processors of the one of the plurality of the access devices, cause the one of the plurality of access devices to transmit the signals.

27. The system of claim 26, wherein the determining the difference approximation is further based on detecting, by curve fitting, a slope value that satisfies a predetermined slope threshold.

* * * * *

UNITED STATES PATENT AND TRADEMARK OFFICE
CERTIFICATE OF CORRECTION

| | |
|---|---|
| PATENT NO. | : 9,826,424 B2 |
| APPLICATION NO. | : 15/167349 |
| DATED | : November 21, 2017 |
| INVENTOR(S) | : Wolcott et al. |

It is certified that error appears in the above-identified patent and that said Letters Patent is hereby corrected as shown below:

In the Specification

Column 2, Brief Description of the Drawings, Line 39:
Delete "practiced" and insert --practiced.--

Column 8, Detailed Description, Line 60:
Delete "4G-4J" and insert --4G-4J.--

Column 13, Detailed Description, Line 45:
Delete "176" and insert --176.--

Signed and Sealed this
Twenty-ninth Day of January, 2019

Andrei Iancu
*Director of the United States Patent and Trademark Office*